United States Patent
Choi et al.

(10) Patent No.: US 7,283,508 B2
(45) Date of Patent: Oct. 16, 2007

(54) APPARATUS AND METHOD FOR TRANSMITTING/RECEIVING SERVING HS-SCCH SET INFORMATION IN AN HSDPA COMMUNICATION SYSTEM

(75) Inventors: Sung-Ho Choi, Songnam-shi (KR); Ju-Ho Lee, Suwon-shi (KR); Sung-Hoon Kim, Seoul (KR); Jin-Weon Chang, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 1017 days.

(21) Appl. No.: 10/359,449

(22) Filed: Feb. 6, 2003

(65) Prior Publication Data

US 2003/0147371 A1 Aug. 7, 2003

(30) Foreign Application Priority Data

Feb. 7, 2002 (KR) ...................... 10-2002-0007194

(51) Int. Cl.
*H04Q 7/28* (2006.01)
(52) U.S. Cl. .................. 370/341; 370/338; 370/342; 370/349; 370/335; 370/348; 370/328; 455/450; 455/452.1; 455/522
(58) Field of Classification Search ................ 370/341, 370/338, 335, 345, 349, 328, 342, 278, 318, 370/469
See application file for complete search history.

(56) References Cited

U.S. PATENT DOCUMENTS 4,573,206 A 2/1986 Grauel et al.

6,643,272 B1 * 11/2003 Moon et al. ................. 370/311

(Continued)

FOREIGN PATENT DOCUMENTS

DE 19856834 6/2000

(Continued)

OTHER PUBLICATIONS

British Combined Search and Examination Report dated Jul. 10, 2003 issued in a counterpart application, namely, Appln. No. GB 0302695.2.

*Primary Examiner*—Marceau Milord
(74) *Attorney, Agent, or Firm*—The Farrell Law Firm, P.C.

(57) ABSTRACT

A communication system includes a shared channel occupied by a plurality of user equipments (UEs) and spread with a plurality of channelization codes to transmit user data, and a plurality of control channels for transmitting control information related to the shared channel in order to enable the UEs to receive the shared channel signal. The system generates a plurality of control channel sets by classifying the control channels into a predetermined number of control channels, and assigns the control channel sets so that each of the UEs monitors a particular control channel set among the control channel sets. Upon detecting necessity to modify a control channel set to be assigned to a particular UE among the UEs, a Node B determines to modify a control channel set assigned into the UE to a new control channel set at a predetermined point of time to come. After determining to modify the control channel set, the Node B transmits an indicator indicating expected modification of the control channel set and information on the control channel set to be modified to the UE over a downlink.

39 Claims, 37 Drawing Sheets

U.S. PATENT DOCUMENTS

| | | | |
|---|---|---|---|
| 6,654,922 B1 * | 11/2003 | Numminen et al. | 714/748 |
| 6,697,347 B2 * | 2/2004 | Ostman et al. | 370/335 |
| 6,731,623 B2 * | 5/2004 | Lee et al. | 370/349 |
| 6,925,561 B1 * | 8/2005 | Hunt et al. | 713/169 |
| 7,020,126 B2 * | 3/2006 | Choi et al. | 370/342 |
| 2002/0159410 A1 * | 10/2002 | Odenwalder et al. | 370/329 |

FOREIGN PATENT DOCUMENTS

| | | |
|---|---|---|
| EP | 0 917 305 A2 | 5/1999 |
| GB | 2 377 343 | 8/2003 |
| WO | WO 01/76165 | 10/2001 |
| WO | WO 01-99313 | 12/2001 |
| WO | WO 02/096143 | 11/2002 |

\* cited by examiner

SF = 128

Part 1 : MS(1bit), code info(7bits)

Part 2 : TBS(6bits), New Data Indicator(1bit), RV(2bits), HARQ channel number(3bits)

SF = 128

MS : Modulation Scheme, dummy data

MAC-hs CONTROL PAYLOAD FORMAT : SERVING HS-SCCH SET MODIFY TYPE #1

MAC-hs CONTROL PAYLOAD FORMAT : SERVING HS-SCCH SET MODIFY TYPE #2

APPARATUS AND METHOD FOR TRANSMITTING/RECEIVING SERVING HS-SCCH SET INFORMATION IN AN HSDPA COMMUNICATION SYSTEM

PRIORITY

This application claims priority under 35 U.S.C. § 119 to an application entitled "Apparatus and Method for Transmitting/Receiving Serving HS-SCCH Set Information in an HSDPA Communication System" filed in the Korean Industrial Property Office on Feb. 7, 2002 and assigned Serial No. 2002-7194, the contents of which are incorporated herein by reference.

BACKGROUND OF THE INVENTION

1. Field of the Invention

The present invention relates generally to a mobile communication system, and in particular, to an apparatus and method for transmitting and receiving serving high speed shared control channel (HS-SCCH) set information in a mobile communication system supporting a high speed downlink packet access (HSDPA) scheme.

2. Description of the Related Art

FIG. 1 schematically illustrates a structure of a general mobile communication system. Illustrated in FIG. 1 is a universal mobile terrestrial system (UMTS) mobile communication system, which is comprised of a core network (CN) 100, a plurality of radio network subsystems (RNSs) 110 and 120, and a user equipment (UE) 130. Each of the RNS 110 and RNS 120 is comprised of a radio network controller (RNC) and a plurality of Node Bs. For example, the RNS 110 is comprised of an RNC 111, a Node B 113 and a Node B 115, and the RNS 120 is comprised of an RNC 112, a Node B 114 and a Node B 116. Further, the RNC is classified into a serving RNC (SRNC), a drift RNC (DRNC) and a controlling RNC (CRNC) according to its operation. The SRNC refers to an RNC that manages information on each UE and controls data communication with the CN 100, and the DRNC refers to a drift RNC through which data from a UE is transmitted to the SRNC. The CRNC refers to an RNC which controls each of Node Bs. In FIG. 1, if information on the UE 130 is managed by the RNC 111, the RNC 111 serves as an SRNC for the UE 130, and if data of the UE 130 is transmitted and received through the RNC 112 as the UE 130 moves toward the RNC 112, the RNC 112 becomes a DRNC for the UE 130. Further, the RNC 111 that controls the Node B 113 in communication with the UE 130 becomes a CRNC of the Node B 113.

So far, a brief description of a UMTS mobile communication system has been made with reference to FIG. 1. Next, a mobile communication system supporting an HSDPA scheme (hereinafter, referred to as an "HSDPA mobile communication system") will be described below.

Generally, the HSDPA scheme refers to a data transmission scheme including a high speed downlink shared channel (HS-DSCH), which is a downlink data channel for supporting high-speed transmission of downlink packet data in a UMTS mobile communication system, and its associated control channels. In order to support the HSDPA scheme, there have been proposed adaptive modulation and coding (AMC), and hybrid automatic retransmission request (HARQ). Commonly, in the HSDPA mobile communication system, the maximum number of orthogonal variable spreading factor (OVSF) codes that can be assigned to one UE is 15, and the system adaptively selects a modulation scheme of quadrature phase shift keying (QPSK), 16-ary quadrature amplitude modulation (16QAM) or 64-ary quadrature amplitude modulation (64QAM) according to channel conditions. The HSDPA mobile communication system performs retransmission on defective data between a UE and a Node B, and soft-combines the retransmitted data thereby improving entire communication efficiency. That is, a scheme for soft-combining the retransmitted data for the defective data is the HARQ scheme. Herein, a description will be made of an n-channel SAW (Stop And Wait) HARQ scheme, by way of example.

In a general automatic retransmission request (ARQ) scheme, acknowledgement (ACK) signals and retransmission packet data are exchanged between a UE and an RNC. However, in order to increase transmission efficiency of the ARQ scheme, the HARQ scheme proposes the following two plans. First, the HARQ scheme performs retransmission request and response between an UE and a Node B. Second, the HARQ scheme temporarily stores (buffers) defective data and then combines it with retransmission data of the corresponding data before transmission. Further, in the HARQ scheme, an ACK signal and retransmission packet data are exchanged between the UE and a medium access control (MAC) HS-DSCH of the Node B. In addition, the HSDPA scheme has introduced the n-channel SAW HARQ scheme that forms n logical channels to transmit several packet data blocks even though an ACK signal is not yet received . Unlike this, the existing SAW ARQ scheme transmits the next packet data only after receiving an ACK signal.

However, in some cases, the SAW ARQ scheme, since it transmits the next packet data only after receipt of an ACK signal, must undesirably wait for the ACK signal although it currently has the ability to transmit the next packet data. In contrast, the n-channel SAW HARQ continuously transmits a plurality of packet data blocks even before receipt of an ACK signal for the previous packet data, thereby increasing channel efficiency. That is, if n logical channels are set up between a UE and a Node B and the n logical channels can be identified by time or channel numbers, the UE receiving packet data can determine a channel over which packet data received at a certain time has been transmitted, and rearrange the received packet data blocks in right reception order or soft-combine corresponding packet data blocks.

In order to increase its efficiency compared with that of the SAW ARQ scheme, the n-channel SAW HARQ scheme has introduced the following two schemes.

In a first scheme, a receiver temporarily stores defective data and then soft-combines it with retransmission data of the corresponding data, thereby decreasing an error rate. The soft combining scheme includes a chase combining (CC) scheme and an incremental redundancy (IR) scheme. In the CC scheme, a transmitter uses the same format at both initial transmission and retransmission. If m symbols were transmitted over one coded block at initial transmission, m symbols are transmitted over one coded block even at retransmission. That is, the same coding rate is applied to both initial transmission and retransmission during data transmission. Therefore, the receiver combines an initially transmitted coded block with a retransmitted coded block, and performs a cyclic redundancy check (CRC) operation on the combined coded block, to determine whether the combined coded block is defective.

Next, the IR scheme uses different formats at initial transmission and retransmission. For example, if n-bit user data is generated into m symbols through channel coding, a transmitter transmits only some of the m symbols at initial transmission, and then sequentially transmits the remaining symbols at retransmission. That is, a coding rate for initial transmission is different from a coding rate for retransmission during data transmission. Therefore, a receiver forms a coded block with a high coding rate by adding retransmitted coded blocks to the remaining blocks of the initially transmitted coded block, and then performs error correction on the formed coded block. In the IR scheme, the initially transmitted coded blocks and the retransmitted coded blocks are identified by redundancy versions (RVs). For example, an initially transmitted coded block is identified by RV#1, a first retransmitted coded block by RV#2, and a second retransmitted coded block by RV#3, and the receiver can correctly combine the initially transmitted coded block with the retransmitted coded blocks, using the RV information.

A second scheme introduced to increase efficiency of the general SAW ARQ scheme will be described below. Although the general SAW ARQ scheme can transmit the next packet only after receipt of an ACK signal for a previous packet, the n-channel SAW HARQ scheme continuously transmits a plurality of packets even before receipt of an ACK signal, thereby increasing utilization efficiency of a radio link. In the n-channel SAW HARQ scheme, if n logical channels are set up between a UE and a Node B and the logical channels are identified by specified channel numbers, the UE being a receiver can determine a channel to which a packet received at a certain time belongs, and rearrange received packets in right reception order or soft-combine corresponding packets.

An operation of the n-channel SAW HARQ scheme will now be described in detail with reference to FIG. 1. It will be assumed herein that a 4-channel SAW HARQ scheme is performed between a UE 130 and a Node B 115 and respective channels are assigned logical identifiers of #1 to #4. Further, physical layers of the UE 130 and Node B 115 have HARQ processors associated with the corresponding channels. The Node B 115 assigns a channel identifier #1 to an initially transmitted coded block and transmits it to the UE 130. The "coded block" means user data transmitted for one transmission time interval (TTI). If an error is generated in a corresponding coded block, the UE 130 transmits the coded block to an HARQ processor #1 associated with a channel #1 based on the channel identifier, and transmits a negative acknowledgement (NACK) signal for the channel #1 to the Node B 115. The Node B 115 then can transmit the next coded block over a channel #2 regardless of arrival of an ACK signal for the coded block on the channel #1. If an error is generated even in the next coded block, the UE 130 transmits the coded block as well to a corresponding HARQ processor. Upon receiving a NACK signal for the coded block on the channel #1 from the UE 130, the Node B 115 retransmits the corresponding coded block over the channel #1, and the UE 130 transmits the coded block to the HARQ processor #1 based on a channel identifier of the coded block. The HARQ processor #1 soft-combines the retransmitted coded block with the previously stored coded block. In this manner, the n-channel SAW HARQ scheme matches channel identifiers with HARQ processors on a one-to-one basis in order to properly match initially transmitted coded blocks with retransmitted coded blocks without delaying transmission of user data until receipt of an ACK signal.

Further, in the HSDPA communication system, a plurality of UEs can simultaneously use a plurality of available OVSF codes at a certain time. That is, in the HSDPA communication system, OVSF code multiplexing can be simultaneously performed between a plurality of UEs at a certain time. The OVSF code multiplexing will be described with reference to FIG. 2.

FIG. 2 illustrates an example of a method for assigning OVSF codes in a general HSDPA communication system. The OVSF code assignment method of FIG. 2 will be described with reference to a case where a spreading factor (SF) is 16 (SF=16).

Referring to FIG. 2, OVSF codes are represented by C(i,j) according to positions in a code tree. In the C(i,j), a parameter 'i' represents the SF value, and a parameter 'j' represents a position of an OVSF code starting from the leftmost side of the OVSF code tree. For example, C(16,0) represents an OVSF code with SF=16 located in a first position starting from the leftmost side of the OVSF code tree. FIG. 2 illustrates a method of assigning to the HSDPA communication system 16 OVSF codes of C(16,0) to C(16, 15), i.e., the $0^{th}$ to $15^{th}$ OVSF codes in the OVSF code tree for the SF=16. The 16 OVSF codes can be multiplexed to a plurality of UEs in a manner illustrated in Table 1 by way of example.

TABLE 1

| | A | B | C |
|---|---|---|---|
| t0 | C(16, 0)~C(16, 5) | C(16, 6)~C(16, 10) | C(16, 11)~C(16, 14) |
| t1 | C(16, 0)~C(16, 3) | C(16, 4)~C(16, 14) | — |
| t2 | C(16, 0)~C(16, 3) | C(16, 4)~C(16, 5) | C(16, 6)~C(16, 14) |

In Table 1, A, B and C represent users or UEs using the HSDPA communication system. As illustrated in Table 1, at certain time points t0, t1 and t2, the users A, B and C are code-multiplexed using OVSF codes assigned to the HSDPA communication system. The number of OVSF codes assigned to the UEs and positions of the OVSF codes in the OVSF code tree are determined by a Node B considering an amount of user data of each UE stored in the Node B and conditions of channels set up between the Node B and the UEs.

That is, in the HSDPA communication system, control information exchanged between a UE and a Node B includes the number of OVSF codes to be used by a particular UE, code information designating positions of the OVSF codes in the code tree, channel quality information necessary for adaptively determining a modulation scheme according to channel conditions, an MCS level (or modulation scheme information), channel number information necessary for supporting the n-channel SAW HARQ scheme, and ACK/NACK information. A description will now be made of control information transmitted and received in the HSDPA communication system, and channels used to transmit actual user data.

First, channels used in the HSDPA communication system are divided into a downlink (DL) channel and an uplink (UL) channel as follows. The downlink channel includes a high speed shared control channel (HS-SCCH), an associated dedicated physical channel (DPCH) and a high speed physical downlink shared channel (HS-PDSCH), and the uplink channel includes a secondary DPCH.

A relationship between the downlink channels and the uplink channel will be described with reference to FIG. 3.

FIG. 3 illustrates downlink and uplink channels in a general HSDPA communication system. Referring to FIG. 3, a UE first measures channel quality between the UE itself and a Node B using a primary common pilot channel (PCPICH) signal (not shown), and reports the measured channel quality to the Node B through a channel quality report (CQR). The CQR is transmitted over a secondary DPCH. Since a method of transmitting CQR from the UE to the Node B is not directly related to the present invention, a detailed description thereof will not be provided.

Upon receiving CQR from the UE, the Node B performs scheduling based on the received CQR. The "scheduling" means selecting a UE expected to receive actual data at the next TTI among a plurality of UEs, and then determining a modulation scheme to be used for transmission of the data and the number of codes to be assigned to the UE. After selecting a UE expected to transmit data at the next TTI through the scheduling, the Node B transmits an HS-DSCH indicator (HI) over an associated DPCH set up between the selected UE and the Node B. The HI indicates a UE to which data transmitted over HS-PDSCH will be transmitted, and includes an identifier indicating the HS-SCCH for transmitting actual control information necessary for receiving the data. For example, in the case where 4 HS-SCCHs are set up to the Node B and the HI is comprised of 2 bits, the 4 HS-SCCHs are indicated by HI of 00, 01, 10 and 11. If no information is transmitted through the HI, it means that no data will be transmitted to a corresponding UE at the next TTI. A set of HS-SCCHs assigned to a particular UE will be defined as a "serving HS-SCCH set". The serving HS-SCCH set can be individually set for each of the UEs, and a detailed description thereof will be made later.

Further, while transmitting the HI, the Node B transmits control information necessary for receiving corresponding data at a corresponding UE, over a corresponding HS-SCCH. The control information transmitted over the HS-SCCH will now be described with reference to FIG. 4.

FIG. 4 illustrates an HS-SCCH structure in a general HSDPA communication system. Referring to FIG. 4, a slot format of the HS-SCCH is comprised of a part#1 field 411, a CRC#1 field 413, a part#2 field 415, and a CRC#2 field 417. Further, control information transmitted over the HS-SCCH includes:

1) HS-DSCH channelization code information (hereinafter, referred to as "code_info")
2) modulation scheme (MS) information
3) transport block size (TBS) information
4) transport channel identifier (TrCH ID) information
5) UE specific CRC information
6) HARQ channel number information
7) new data indicator (NDI) information
8) RV information Among the control information transmitted over the HS-SCCH, the MS information, TBS information, and code_info information will be referred to as "transport format and resource related information (TFRI)," and the HARQ channel number information, RV information, and NDI information will be referred to as "HARQ information." Further, when the HS-SCCH is transmitted using an OVSF code with SF=128, each of the control information assigns 1 bit for the MS information, 7 bits for the code_info information, 6 bits for the TBS information, 1 bit for the NDI information, 2 bits for RV information, and 3 bits for the HARQ channel number information, as illustrated in FIG. 4.

Referring to FIG. 4, the part#1 field 411 includes the code_info information and the MS information representing positions and the number of OVSF codes in a code tree, to be used by a corresponding UE, and the CRC#1 field 413 includes the information included in the part#1 field 411 and CRC operation results for a UE identifier (UE ID). It is expected that 10 bits will be assigned for the UE identifier.

Although the UE identifier is not actually transmitted, a transmitter calculates the UE identifier while calculating CRC#1, and a receiver also calculates the UE identifier while calculating CRC#1. By calculating CRC#1 using the UE identifier in this way, a UE can determine whether control information included in a particular HS-SCCH is control information corresponding to the UE itself. For example, when transmitting control information to a first UE over HS-SCCH, a Node B calculates CRC#1 based on information included in the part#1 field 411 and an UE identifier of the first UE. Therefore, the first UE determines, as control information for the first UE itself, control information included in particular HS-SCCH of which CRC#1 has no error when its UE identifier and information included in the part#1 field 411 are calculated together, among HS-SCCHs belonging to its serving HS-SCCH set. In addition, the part#2 field 415 includes the TBS information which indicates a size of data transmitted over HS-PDSCH, the HARQ channel number information, the NDI information indicating whether data transmitted over the HS-PDSCH is new data or retransmission data, and the RV information representing a version number of the corresponding data in the IR scheme. Further, CRC operation results for information included in the part#2 field 415 is transmitted through the CRC#2 field 417.

The code_info information will now be described with reference to FIG. 5.

FIG. 5 schematically illustrates a method of matching code_info of HS-DSCH to logical identifiers in an HSDPA communication system. Referring to FIG. 5, as stated above, when HS-SCCH signal is transmitted using an SF=128 OVSF code, 7 bits are assigned for code_info. Therefore, the logical identifiers are assigned by separating the 7 bits into a first 3 bits and a remaining 4 bits. For example, a logical identifier for which the first 3 bits of the code_info is 6 (110) and the remaining 4 bits is 4 (0011) is [m=7, SP(Start Point)=4]. That is, a logical identifier '110 0011' means 7 OVSF codes starting from a $4^{th}$ OVSF code in an OVSF code tree, i.e., OVSF codes of C(16,3) to C(16,9). As illustrated in FIG. 5, when 7 bits are assigned to the code_info, 8 logical identifiers of "111 0000", "111 0001", "111 0010", "111 0011", "111 0100", "111 0101", "111 0110", and "111 1111" are not used.

Now, a process of actually receiving data by a UE based on the control information transmitted over the HS-SCCH will be described below.

A UE receives data transmitted over HS-PDSCH and demodulates the received data based on control information received over HS-SCCH. The UE determines an OVSF code with which it will receive and demodulate HS-PDSCH, based on the code_info, and determines a modulation scheme based on the MS information. Thereafter, the UE determines whether the received data has an error, through a CRC operation. As a result of the determination, if no error has occurred in the receive data, the UE transmits an ACK signal, and if a error has occurred, the UE transmits a NACK signal. Actual user data transmitted over the HS-PDSCH will be defined as a "medium access control-high speed (MAC-hs) protocol data unit (PDU)".

A structure of the MAC-hs will now be described below with reference to FIG. 6.

FIG. 6 illustrates a structure of MAC-hs PDU transmitted over HS-PDSCH. Referring to FIG. 6, the MAC-hs PDU is comprised of a MAC-hs header field 611, a MAC-bs service data unit (SDU) field 613, and a CRC field 615. The MAC-hs header 611 includes such information as:

(1) Priority: this is a priority queue identifier of MAC-hs SDU 613, and 3 bits are assigned thereto.

(2) TSN (Transmission Sequence Number): this is a sequence number used when MAC-hs SDU 613 is reordered in a priority queue, and 5 or 6 bits are assigned thereto.

(3) SID_x: this represents a size of MAC-dedicated (MAC-d) PDUs belonging to an $x^{th}$ MAC-d PDU set among sets of PDUs constituting MAC-hs SDU 613, and 2 or 3 bits are assigned thereto.

(4) N_x: this represents the number of MAC-d PDUs belonging to an $x^{th}$ MAC-d PDU set, and 7 bits are assigned thereto.

(5) F (Flag): when F is set to 1, it means that the next field is a MAC-hs SDU field, and when F is set to 0, it means that the next field is an SID field. 1 bit is assigned thereto.

(6) MAC-d PDU_Nx: this represents MAC-d PDUs constituting an $x^{th}$ MAC-d PDU set.

As illustrated in FIG. 6, one MAC-hs SDU is comprised of several kinds of MAC-d PDUs. Before a description of the TSN, priority queue, and MAC-d PDU, a protocol stack of the HSDPA communication system will be described with reference to FIG. 7.

FIG. 7 illustrates a structure of a MAC layer in a general HSDPA communication system. Referring to FIG. 7, the MAC layer is comprised of a MAC-d layer and a MAC-hs layer, and as illustrated, a MAC layer of a UE includes a MAC-d- layer 711 and a MAC-hs layer 710, a Node B includes a MAC-hs layer 707, and an SRNC includes a MAC-d layer 702. The MAC-d layer, a MAC entity for dedicated channels, performs a MAC function on dedicated logical channels such as a dedicated control channel (DCCH) and a dedicated traffic channel (DTCH). Further, the MAC-hs layer, a layer additionally realized to support HSDPA, has a major function of supporting an HARQ scheme on HS-DSCH in order to support the HSDPA scheme.

In FIG. 7, if actual user data is transmitted from an upper layer 701 to a MAC-d layer 702 of an SRNC, the MAC-d layer 702 generates the user data delivered from the upper layer 701 into MAC-d PDUs, and delivers the generated MAC-d PDUs to a frame protocol (FP) layer 703. The MAC-d PDU is user data delivered from the upper layer 701, to which a MAC-d header is added, and the MAC-d header includes multiplexing-related information indicating an upper layer to which a receiver should transmit MAC-d PDUs. The FP layer 703 generates the MAC-d PDUs delivered from the MAC-d layer 702 into FP PDUs, and delivers the generated FP PDUs to a transport bearer layer 704. The FP layer 703 concatenates a plurality of MAC-d PDUs into one FP PDU, and the FP PDU includes priority information of the concatenated MAC-d PDUs. The transport bearer layer 704 assigns a transport bearer to the FP PDUs delivered from the FP layer 703, and interfaces the FP PDUs between the transport bearer layer 704 and a transport bearer layer 705 of a Node B through a Iub interface, an interface between the SRNC and the Node B, through the assigned transport bearer. In addition, the transport bearer layer 704 is a part for controlling actual data transmission between the SRNC and the Node B, and can consist of AAL2 (Adaptive ATM Layer 2)/ATM (Asynchronous Transfer Mode).

Upon receiving the FP PDU from the SRNC transport bearer layer 704, the transport bearer layer 705 of the Node B delivers the received FP PDU to an FP layer 706, and the FP layer 706 delivers the FP PDU delivered from the transport bearer layer 705 to a MAC-hs layer 707. The MAC-hs layer 707 stores received MAC-d PDUs in a corresponding priority queue by consulting priority information included in the FP PDU delivered from the FP layer 706.

A structure of the MAC-hs layer for the Node B will now be described with reference to FIG. 8.

FIG. 8 illustrates a structure of a MAC-hs layer for a Node B in a general HSDPA communication system. Referring to FIG. 8, the Node B MAC-hs layer 707 has a function of processing a data block through HS-DSCH, and manages physical channel resources for the HSDPA data. That is, the MAC-hs layer 707 is comprised of a scheduling/priority handling part 805, a HARQ process part 803, and a TFRC selection part 804. The scheduling/priority handling part 805 performs scheduling and priority management on HS-DSCH, the HARQ process part 803 performs hybrid retransmission on received data blocks, and the TFRC selection part 804 selects a transport format resource combination (TFRC) for a shared transport channel. The TFRC selector 804 selects a proper modulation scheme by consulting the quality of a channel transmitted by a UE over a secondary DPCH, and delivers the selected modulation scheme information to a physical layer 708. The scheduling/priority handing part 805 has two priority queue distributors 801 and a plurality of priority queues 802 distributed by the priority queue distributor 801, per MAC-d flow.

The priority queue distributor 801 delivers the MAC-d PDUs delivered from the upper layer to a corresponding priority queue 802, based on priority information of the FP PDU delivered from the FP layer 706. One or more MAC-d multiplexers may exist between a UE and an SRNC, and one MAC-d flow is generated per MAC-d multiplexer. A detailed description of the MAC-d flow will be made later with reference to FIG. 10. MAC-d PDUs stored in the priority queue 802 are delivered to the HARQ processor 803 in response to a command from the scheduling/priority handling part 805. The HARQ processor 803 concatenates MAC-d PDUs delivered from the priority queue 802, generates a MAC-hs PDU by inserting a MAC-hs header 611 and a CRC 615 described in conjunction with FIG. 6 into the concatenated MAC-d PDUs, performs an n-channel SAW HARQ operation on the generated MAC-hs PDU, and then delivers the MAC-hs PDU to the physical layer 708. Further, the Node B MAC-hs layer 707 is directly connected to the physical layer 708, and has associated uplink/downlink signaling radio control channels for transmitting and receiving HSDPA-related control information to/from a UE through the physical layer 708.

Up to the present, a structure of the Node B MAC-hs layer 707 has been described. Next, a structure of the UE MAC-hs layer 710 will be described with reference to FIG. 9.

FIG. 9 illustrates a structure of a UE MAC-hs layer in a general HSDPA communication system. Referring to FIG. 9, the UE MAC-hs layer 710 also has a major function of supporting an HARQ scheme on HS-DSCH in order to support HSDPA. The MAC-hs layer 710 checks an error of a data block received from the Node B physical layer (PHY) 708, i.e., a radio channel. As a result of the error check, upon failure to detect an error generated for the received data block, or received packet data, the MAC-hs layer 710 transmits an ACK signal to the Node B physical layer 708. However, upon detecting an error for the data block, the MAC-hs layer 710 generates a NACK signal for requesting retransmission of the defective data block and transmits the generated NACK signal to the Node B physical layer 708. In addition, the MAC-hs layer 710 has radio control channels for associated uplink/downlink signaling in order to transmit and receive HSDPA-related control information to/from a UMTS terrestrial radio access network (UTRAN).

As illustrated in FIG. 9, the MAC-hs layer 710 is comprised of an HARQ processor 901, two reordering queue distributors 902, a reordering queue 903 and a de-assembler 904. The MAC-hs layer 710 can control an operation of a physical layer 709 depending on HARQ-related information on HS-SCCH, and a MAC-hs PDU is delivered from the reordering queue distributor 902 to a proper reordering queue 903. The reordering queue distributor 902 uses priority included in a priority field of a MAC-hs header in the received MAC-hs PDU. The ordering queue 903 reorders the order of received MAC-hs SDUs based on a value included in a TSN field of the MAC-hs PDU header, and delivers the reordered MAC-hs SDUs to the de-assembler 904. The de-assembler 904 de-assembles MAC-hs SDU into MAC-hs PDUs depending on SID_x field and N_x field of the MAC-hs header, and delivers the de-assembled MAC-hs PDUs to an upper layer 712.

Next, a structure of the above stated MAC-d multiplexer will be described with reference to FIG. 10.

FIG. 10 schematically illustrates a structure of a MAC-d multiplexer in a general HSDPA communication system. Referring to FIG. 10, a plurality of logical channels delivered from the upper layer 701 are multiplexed by one MAC-d multiplexer. The logical channel means a channel formed between a radio link control (RLC) layer, being an upper layer of a MAC layer, and the MAC layer, and one or two logical channels can be formed per RLC layer entity. The RLC layer entity matches data delivered from the upper layer to a predetermined size, and adds a header with a sequence number to the size-matched data. Since the RLC layer entity is not closely related to the present invention, a detailed description thereof will not be provided.

It is assumed in FIG. 10 that the MAC-d layer 702 includes 3 MAC-d multiplexer 1003, 1004 and 1005, and the MAC-hs layer 707 includes one MAC-d multiplexer 1006. For the convenience of explanation, a description will be made of only the MAC-d multiplexer 1003 among the MAC-d multiplexers 1003, 1004 and 1005. The MAC-d multiplexer 1003 multiplexes a plurality of logical channels in such a manner that identifiers of logical channels are inserted in a C/T field (not shown) of a MAC-d header. The C/T field, information inserted in a header of a MAC-d PDU, is information used to identify logical channels multiplexed to one MAC-d. For example, assuming that an identifier of a logical channel 1001 is 0 and an identifier of a logical channel 1002 is 1, the MAC-d multiplexer 1003 inserts 0 and 1 in the C/T fields of MAC-d PDUs delivered by the corresponding logical channels so that a receiver can deliver the MAC-d PDUs over corresponding logical channels.

As described in conjunction with FIG. 10, since there exist a plurality of MAC-d multiplexers, logical channels having the same identifier, associated with different MAC-d multiplexers, are different logical channels, although they have the same logical channel identifier. For example, a logical channel with a logical channel identifier 0, connected to the MAC-d multiplexer 1003, and a logical channel with a logical channel identifier 0, connected to the MAC-d multiplexer 1004, are different logical channels, since they are connected to the different MAC-d multiplexers although they have the same logical channel identifier 0. Meanwhile, MAC-d PDUs multiplexed by the same MAC-d multiplexer constitute one MAC-d flow, and the MAC-d flow is delivered to the MAC-hs layer 707 via a Iub interface.

Now, a detailed description of the serving HS-SCCH set will be made below.

The serving HS-SCCH set, as described above, means a set of HS-SCCHs that must be continuously monitored by a particular UE, and in the HSDPA communication system, the serving HS-SCCH set may include a maximum of 4 HS-SCCHs. That is, a plurality of HS-SCCHs are set up to one Node B, and a serving HS-SCCH set for a particular UE is comprised of some of the HS-SCCHs. For example, if a total of 8 OVSF codes of C(128,0) to C(128,7) are assigned to HS-SCCHs in a Node B#1, UEs receiving an HSDPA service within the Node B#1 will be assigned some of the HS-SCCHs as its serving HS-SCCH set. A signaling flow currently considered to inform a UE of the serving HS-SCCH set will now be described with reference to FIG. 11.

FIG. 11 is a signaling flow diagram illustrating a process of transmitting a serving HS-SCCH set in a general HSDPA communication system. Specifically, FIG. 11 illustrates a signaling flow for setting up an HSDPA call among UE, Node B, RNC and CN. In FIG. 11, ellipses mean protocol entities for transmitting and receiving messages. The types of information that must be included in the messages are illustrated in Table 2 below. For the sake of convenience, Table 2 illustrates only the information elements (IEs) that should be newly added or modified for the HSDPA. In addition, Reference of Table 2 represents reference documents where a full list of the corresponding IE can be acquired.

TABLE 2

| Message | Reference |
|---|---|
| 501 RRC CONNECTION REQUEST | 3GPP TS 25.331. v4.1.0 ch 10.2.40 |
| 502 RRC CONNECTION SETUP | 3GPP TS 25.331. v4.1.0 ch 10.2.41 |
| 503 RRC CONNECTION SETUP COMPLETE | 3GPP TS 25.331. v4.1.0 ch 10.2.42 |
| 504 INITIAL DIRECT TRANSFER | 3GPP TS 25.331. v4.1.0 ch 10.2.12 |
| 505 INITIAL UE MESSAGE | 3GPP TS 25.413. v4.1.0 ch 9.1.33 |
| 506 RAB ASSIGNMENT REQUEST | 3GPP TS 25.413. v4.1.0 ch 9.1.3 |
| 507 RADIO LINK SETUP REQUEST | 3GPP TS 25.433. v4.1.0 ch 9.1.36 |
| 508 RADIO LINK SETUP RESPONSE | 3GPP TS 25.433. v4.1.0 ch 9.1.37 |
| 509 RADIO BEARER SETUP | 3GPP TS 25.331. v4.1.0 ch 10.2.31 |
| 510 RADIO BEARER SETUP COMPLETE | 3GPP TS 25.331. v4.1.0 ch 10.2.32 |
| 511 RAB ASSIGNMENT RESPONSE | 3GPP TS 25.413. v4.1.0 ch 9.1.4 |

Now, a process of transmitting the serving HS-SCCH set by the UE after setting an HSDPA call will be described with reference to FIG. 11 and Table 2.

A UE, as it enters a region of a Node B, acquires necessary system information (SI) through a cell selection process, and then transmits a radio resource control (RRC) Connection Request message to an RNC (Step 1101). The cell selection process means a process of matching synchronization to a corresponding cell using a common pilot channel (CPICH) and a primary common control channel (PCCPCH), and then acquiring random access channel (RACH) information. The RRC Connection Request message has a UE identity IE inserted therein so that the RNC can determine whether to set up RRC connection to a corresponding UE. The RRC connection means signaling connection through which the UE can initially access the system and transmit necessary information to a network. However, in some cases, a dedicated channel (DCH) for transmitting user data is included in the RRC connection. It will be assumed in FIG. 11 that the RRC Connection Request message requests only signaling connection setup.

Upon receiving the RRC Connection Request message, the RNC determines whether to approve RRC connection to the corresponding UE, using a UE identify IE, and transmits an RRC Connection Setup message with several RRC connection-related IEs to the UE if it has determined to permit RRC connection (Step 1102). The RRC Connection Setup message includes a UE identifier that the UE will use in common channels such as RACH and forward access channel (FACH). Upon receiving the RRC Connection Setup message, the UE transmits an RRC Connection Setup Complete message to the RNC along with a UE radio access capability IE (Step 1103). Commonly, the UE radio access capability IE includes a physical channel capability IE and an a physical channel capability IE representing whether a corresponding UE supports turbo coding. In the present invention, the UE radio access capability IE includes information indicating whether a corresponding UE supports HS-PDSCH reception. In addition, the RRC Connection Setup Complete message includes information indicating whether the UE supports a handover between different frequencies, i.e., "inter-frequency handover (HO)." Upon receiving the RRC Connection Setup Complete message, the RNC stores the UE-related information.

After setting up RRC connection as described above, the UE transmits, when necessary, an Initial Direct Transfer message for requesting new call setup to the RNC (Step 1104). The Initial Direct Transfer message used by the UE to transmit a new call setup request to the CN is included in a NAS (Non-Access Stratum) message IE of an RRC message. The NAS message may include information needed by the CN to process a corresponding call, e.g., call quality information. Therefore, as the UE transmits an Initial Direct Transfer message to the RNC, the RNC modifies the Initial Direct Transfer message into a RANAP message, called an "Initial UE message," and transmits the Initial UE message to the CN (Step 1105). Upon receiving the Initial UE message, the CN determines a radio access bearer (RAB) parameter based on quality-related information of the NAS message IE included in the received Initial UE message. The RAB parameter includes a maximum bit rate of a corresponding call, a guaranteed bit rate, and a traffic class indicating a type of the call. The traffic class includes a conversational class, a streaming class, an interactive class and a background class. The conversational class and the streaming class have a real time feature, and typically correspond to a multimedia service including voice communication, and the interactive class and the background class have a non-real time feature and typically correspond to a data service. Therefore, if a call requested by the UE in Steps 1104 and 1105 is a data service, the CN will employ the interactive or background class to the RAB parameter, and if the call is a voice service, the CN will employ the conversation class to the RAB parameter. After determining the RAB parameter, the CN transmits a RAB Assignment Request message to the RNC (Step 1106). The RNC then determines a channel to be set up to the corresponding UE based on the RAB parameter included in the received RAB Assignment Request message. If the RAB parameter indicates that a call to be set up is a high-speed data service, i.e., a traffic class of the RAB parameter is an interactive or background class with a maximum bit rate, the RNC can set up the call as an HSDPA call.

Upon receiving the RAB Assignment Request message, the RNC transmits a Radio Link Setup Request message to a Node B that controls the corresponding cell (Step 1107). In the present invention, an HS-DSCH info IE is newly defined in the Radio Link Setup Request message, and the HS-DSCH info IE includes a UE identifier and other UE-related information. In addition, the Radio Link Setup Request message must include the associated DPCH and secondary DPCH-related information as well. The DPCH-related information may become an OVSF code, and may include activation point-related information indicating when the DPCHs will be activated. Upon receiving the Radio Link Setup Request message, the Node B stores a UE identifier included in the received Radio Link Setup Request message, assigns a buffer for servicing a corresponding UE, and forms a MAC-hs entity. Further, the Node B determines a serving HS-SCCH set of the corresponding UE. After completion of forming the DPCHs, the Node B transmits a Radio Link Setup Response message to the RNC (Step 1108). Upon receiving the Radio Link Setup Response message, the RNC transmits a Radio Bearer Setup message to the UE (Step 1109). The Radio Bearer Setup message includes the DPCH-related information and information that the UE must recognize in relation to HSDPA, i.e., the number of HARQ processors and serving HS-SCCH set-related information. Upon receiving the Radio Bearer Setup message, the UE transmits a Radio Bearer Setup Complete message to the RNC after forming DPCHs, in order to inform that it is ready to receive HS-PDSCH (Step 1110). The RNC then transmits a RAB Assignment Response message to the CN in order to inform completion of call setup (Step 1111).

The serving HS-SCCH set can be adaptively established by the Node B according to conditions of UEs receiving an HSDPA service. For example, if the number of UEs receiving an HSDPA service within one Node B is increased, it is possible to assign new OVSF codes to HS-SCCH, and as the new OVSF codes are assigned to the HS-SCCH, a serving HS-SCCH set of the UEs is reset. However, since the serving HS-SCCH set is information corresponding to each of the UEs and is information shared by a Node B and a UE, it is inefficient to transmit and receive the serving HS-SCCH set through an upper layer, i.e., SRNC. Accordingly, there have been demands for a method of resetting a serving HS-SCCH set for the UE for which the serving HS-SCCH set was initially established.

SUMMARY OF THE INVENTION

It is, therefore, an object of the present invention to provide an apparatus and method for efficiently transmitting serving HS-SCCH set information in an HSDPA communication system.

It is another object of the present invention to provide an apparatus and method for directly exchanging serving HS-SCCH set information between a Node B and a UE in an HSDPA communication system.

It is yet another object of the present invention to provide an apparatus and method for resetting serving HS-SCCH set information in an HSDPA communication system.

It is still another object of the present invention to provide an apparatus and method for directly resetting serving HS-DSCH set information between a Node B and a UE in an HSDPA communication system.

It is still another object of the present invention to provide a serving HS-SCCH set information resetting apparatus and method for efficiently managing channelization code resources assigned to HS-SCCHs in an HSDPA communication system.

It is still another object of the present invention to provide an apparatus and method for efficiently managing status of a buffer used for initial transmission and retransmission by using a MAC-hs message in an HSDPA communication system.

To achieve the above and other objects, the present invention provides a method for transmitting control channel set information in a communication system including a shared channel occupied by a plurality of user equipments (UEs) and spread with a plurality of channelization codes to transmit user data, and a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets. The method comprises the steps of: upon detecting necessity to modify a control channel set to be assigned to a particular UE among the UEs, determining to modify a control channel set assigned into the UE to a new control channel set at a predetermined point of time to come; and after determining to modify the control channel set, transmitting an indicator indicating expected modification of the control channel set and information on the control channel set to be modified to the UE over a downlink.

To achieve the above and other objects, the present invention provides an apparatus for transmitting control channel set information in a communication system including a shared channel occupied by a plurality of user equipments (UEs) and spread with a plurality of channelization codes to transmit user data, and a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets. The apparatus comprises a controller for, upon detecting necessity to modify a control channel set to be assigned to a particular UE among the UEs, determining to modify a control channel set assigned into the UE to a new control channel set at a predetermined point of time to come; and a transmitter for transmitting an indicator indicating expected modification of the control channel set and information on the control channel set to be modified to the UE over a downlink under the control of the controller.

To achieve the above and other objects, the present invention provides a method for receiving control channel set information in a communication system including a shared channel occupied by a plurality of user equipments (UEs) and spread with a plurality of channelization codes to transmit user data, and a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets. The method comprises receiving an indicator indicating that currently assigned control channel set information is to be modified into new control channel set information, and control channel set information including the new control channel set information, over a downlink; and monitoring a control channel set by applying the new control channel set information at a predetermined point of time following a point of time where the control channel set information is detected.

To achieve the above and other objects, the present invention provides an apparatus for receiving control channel set information in a communication system including a shared channel occupied by a plurality of user equipments (UEs) and spread with a plurality of channelization codes to transmit user data, and a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets. The apparatus comprises a receiver for receiving an indicator indicating that currently assigned control channel set information is to be modified into new control channel set information, and control channel set information including the new control channel set information, over a downlink; and a controller for monitoring a control channel set by applying the new control channel set information at a predetermined point of time following a point of time where the control channel set information is detected.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
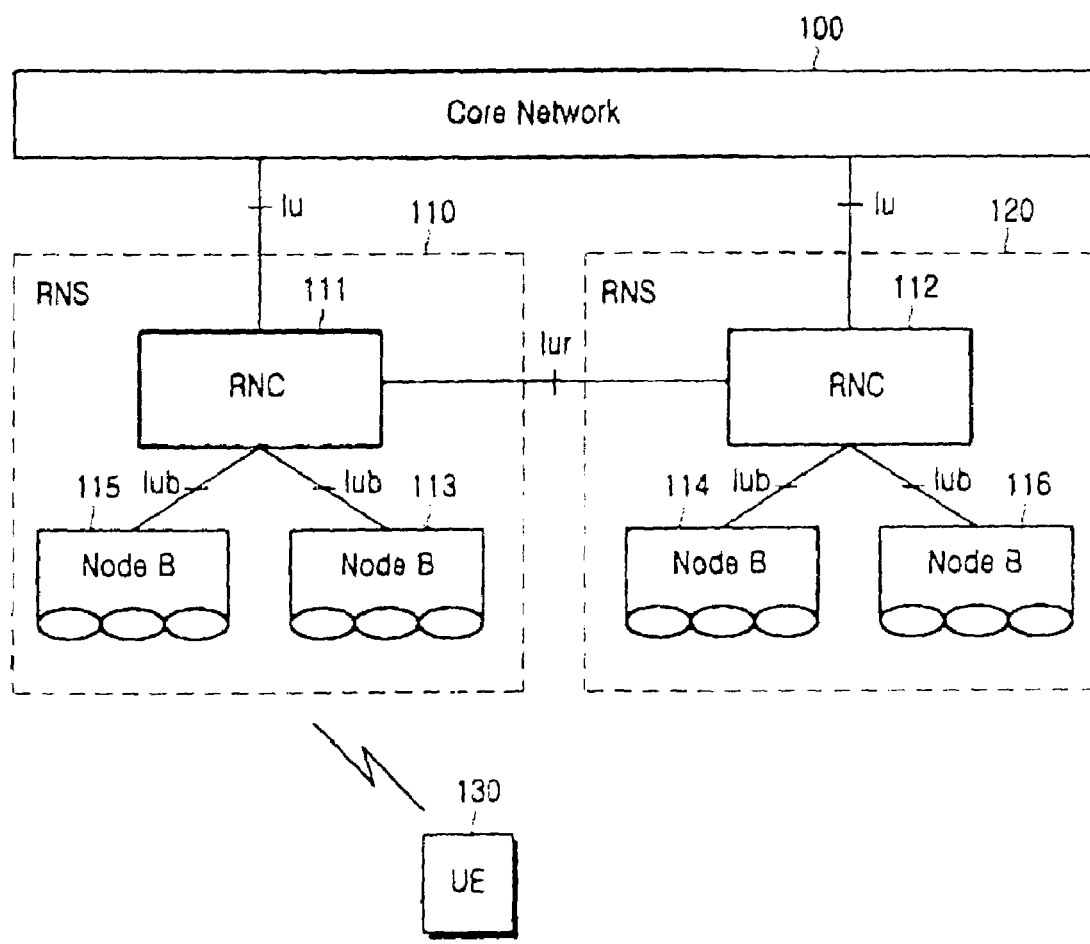
FIG. 1 schematically illustrates a structure of a general mobile communication system.
Figure 2:
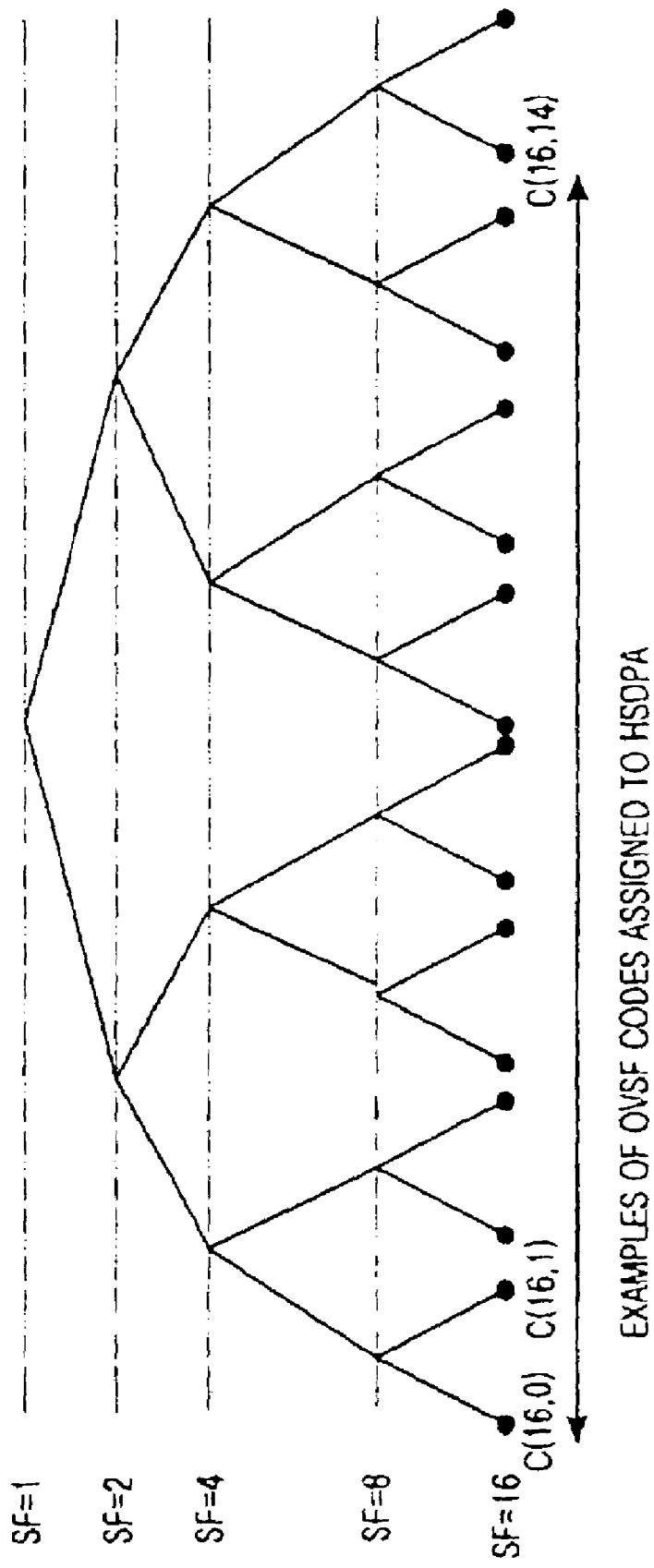
FIG. 2 illustrates an example of a method for assigning OVSF codes in a general HSDPA communication system.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention proposes a method for directly transmitting and receiving a serving high speed shared control channel (HS-SCCH) set between a Node B and a UE when resetting the serving HS-SCCH set. The method for directly transmission and receiving the serving HS-SCCH set between a Node B and a user equipment (UE) provides a first embodiment in which the serving HS-SCCH set is reset using an unused field in an HS-SCCH slot format, and a second embodiment in which the serving HS-SCCH set is reset using a medium access control-high speed (MAC-hs) protocol data unit (PDU).

Now, the first embodiment will be described below.

1. First Embodiment

Figure 3:
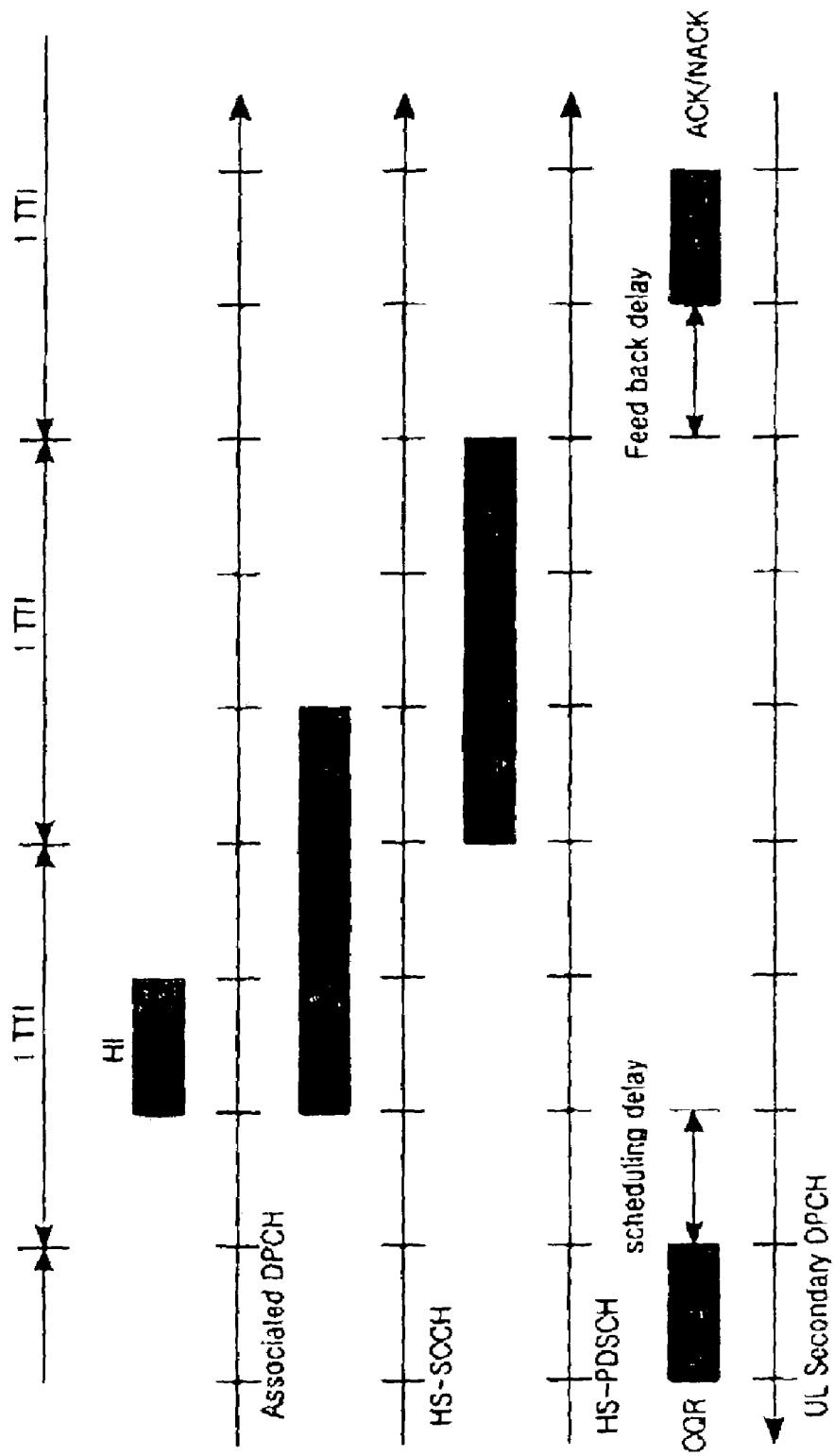
FIG. 3 illustrates downlink and uplink channels in a general HSDPA communication system.
Figure 11:
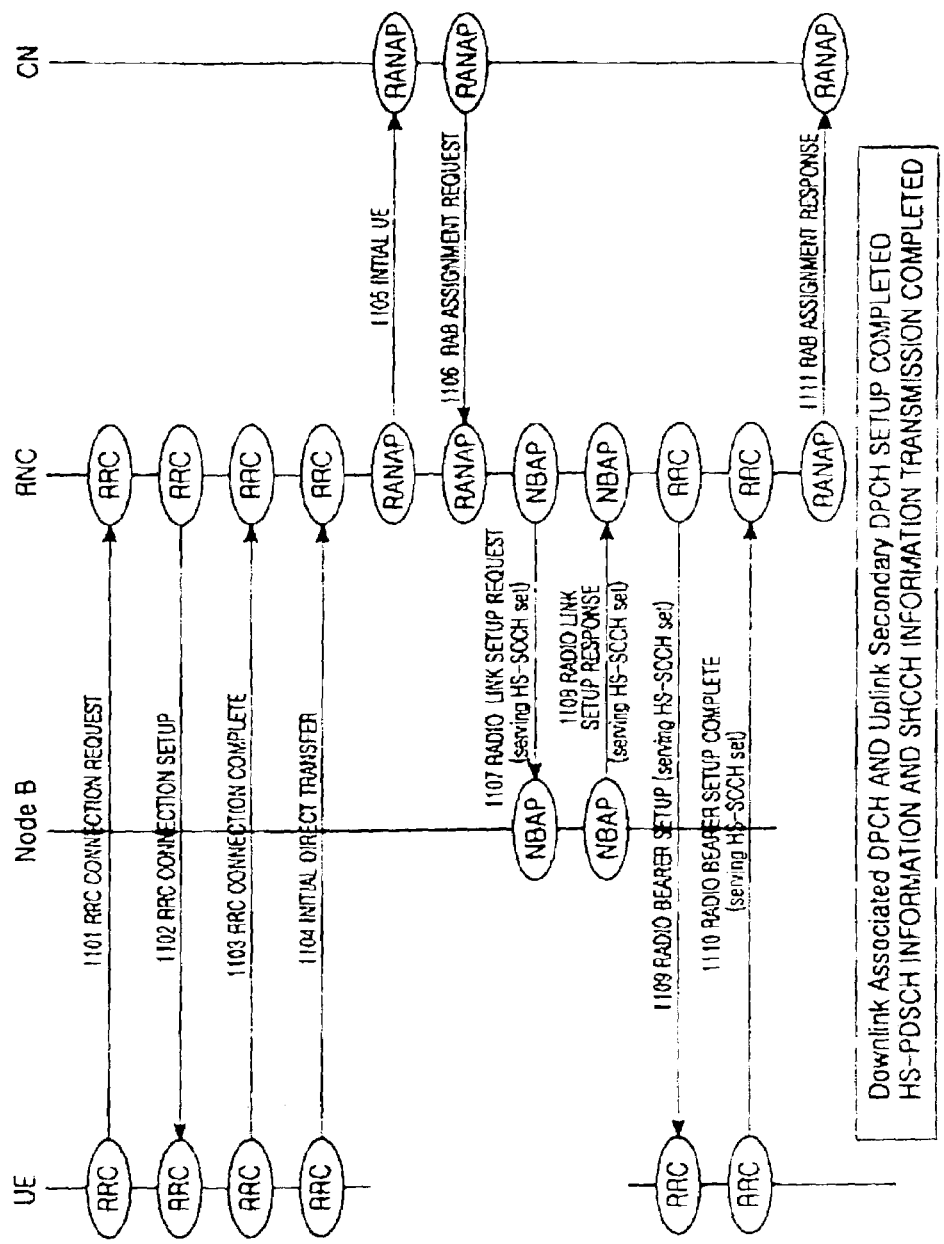
FIG. 11 is a signaling flow diagram illustrating a process of transmitting a serving HS-SCCH set in a general HSDPA communication system.

First, a structure of the serving HS-SCCH will be described. It will be assumed that the serving HS-SCCH set information is generated by matching orthogonal variable spreading factor (OVSF) codes to associated logical identifiers. For example, if OVSF codes of C(128,124), C(128, 125), C(128,126), and C(128,127) are assigned for a serving HS-SCCH set of a particular UE, then the OVSF codes can be previously matched to logical channels on a one-to-one basis in such a matter that C(128,124)=0, C(128,125)=1, C(128,126)=2, C(128,127)=3. Generally, in a high speed downlink packet access (HSDPA) communication system, a maximum of 4 HS-SCCHs are set up to one Node B, and a UE continuously monitors the 4 HS-SCCHs set up to the Node B. Therefore, as described in conjunction with FIG. 3, 4 OVSF codes corresponding to the 4 HS-SCCHs and 4 logical identifiers for identifying the 4 HS-SCCHs are assigned for the serving HS-SCCH set. Such a logical relationship among the 4 HS-SCCHs, logical identifiers and OVSF codes is, as described in conjunction with FIG. 11, determined for a corresponding UE by a Node B, transmitted from the Node B to a serving radio network controller (SRNC) using a Radio Link Setup Response message, and transmitted from the SRNC to the UE using a Radio Bearer Setup message. Therefore, a UE, receiving the serving HS-SCCH set information, can determine OVSF codes indicated by logical identifiers of HS-SCCHs transmitted through an associated dedicated physical channel (DPCH) and an HS-DSCH indicator (HI).

In addition, the SRNC can transmit a list of all HS-SCCH set information, formed in a particular Node B, i.e., a cell, except serving HS-SCCH set information to be used by a corresponding UE as the serving HS-SCCH set information, and designate particular serving HS-SCCH set information in the list of all HS-SCCH set information, as a serving HS-SCCH set for the UE. In this case, HS-SCCH-related information transmitted over the Radio Bearer Setup message will become all HS-SCCH sets and a serving HS-SCCH set. For example, if it is assumed that 3 HS-SCCH sets are formed in a particular Node B and an HS-SCCH set #2 is a serving HS-SCCH set for a particular UE, then the Radio Bearer Setup message includes:

HS-SCCH related information=HS-SCCH set 1=[C(128, 124)=0, C(128,125)=1, C(128,126)=2, C(128,127)=3],HS-SCCH set 2=[C(128,0)=0, C(128,1)=1, C(128,2)=2, C(128, 3)=3],HS-SCCH set 3=[C(128,4)=0, C(128,5)=1, C(128,6)=2, C(128,7)=3],Serving HS-SCCH set=HS-SCCH set 2]

A UE, receiving the Radio Bearer Setup message, continuously monitors OVSF codes belonging to the HS-SCCH set #2 until the serving HS-SCCH set is modified.

In the first embodiment of the present invention, in order to modify serving HS-SCCH set information for a particular UE, a Node B indicates transmission of a Serving HS-SCCH Set Modify message that is transmitted as the serving HS-SCCH set information is modified, using an unused logical identifier among logical identifiers indicating code_info transmitted through a part#1 field of HS-SCCH, and transmits the Serving HS-SCCH Set Modify message, using particular 4 bits of a part#2 field of the HS-SCCH. The Serving HS-SCCH Set Modify message is a message including information on the modified serving HS-SCCH set, and the information on the modified serving HS-SCCH set may become such information as an ID of serving HS-SCCH sets included in the HS-SCCH set and a list of corresponding OVSF codes, when a modified serving HS-SCCH set ID, OVSF codes corresponding to the modified serving HS-SCCH set ID, or HS-SCCH set is entirely reset in the Node B. When transmitting the list of the OVSF codes through the Serving HS-SCCH Set Modify message, it is necessary to transmit the OVSF code list trough the Serving HS-SCCH Set Modify message not only to a corresponding UE but also to an SRNC connected to the UE. In the first embodiment of the present invention, it will be assumed that a newly set serving HS-SCCH set ID is transmitted along with the Serving HS-SCCH Set Modify message. In addition, indications indicating transmission of the Serving HS-SCCH Set Modify message, i.e., logical identifiers transmitted through a code_info field, will be defined as a "Serving HS-SCCH Set Modify message indicator."

Figure 5:
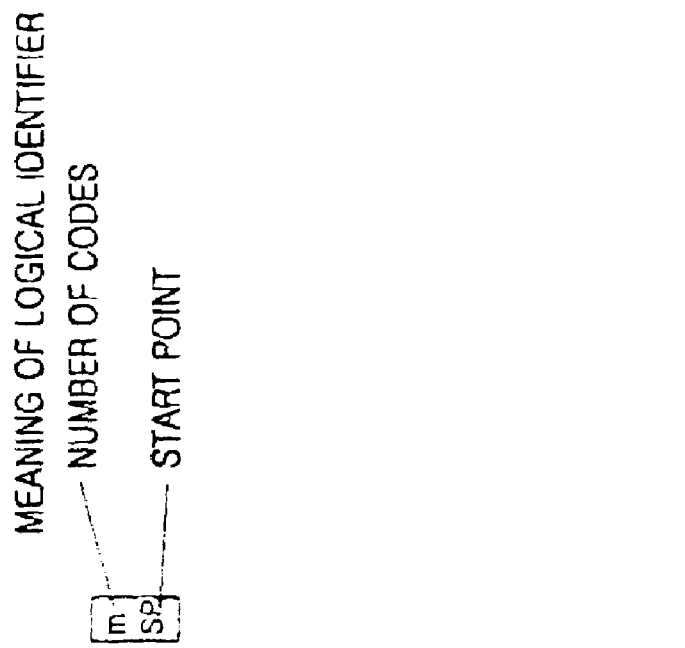
FIG. 5 schematically illustrates a method of matching channelization code information of HS-DSCH to logical identifiers in an HSDPA communication system.

As described in conjunction with FIG. 5, a logical identifier used to transmit the code_info is comprised of 7 bits. Of the 7 bits, the first 3 bits represent the number of OVSF codes used, and the remaining 4 bits represent a start point (SP) on an OVSF code tree. However, among 7-bit logical identifiers used to transmit the code_info, 8 logical identifiers of "111 0000", "111 0001", "111 0010", "111 0011", "111 0100", "111 0101", "111 0110", and "111 1111" are not used as described in conjunction with FIG. 5.

Therefore, in the first embodiment of the present invention, among the 7-bit logical identifiers used to represent the code_info, currently unused 8 logical identifiers are used as a Serving HS-SCCH Set Modify message indicator indicating transmission of a Serving HS-SCCH Set Modify message from a Node B to a UE. In the first embodiment, among the 8 unused code_info logical identifiers, a logical identifier "111 0000" is used as a Serving HS-SCCH Set Modify message indicator, by way of example. That is, the logical identifier "111 0000" is used to inform the UE of transmission of the Serving HS-SCCH Set Modify message. The Serving HS-SCCH Set Modify message indicator is illustrated in Table 3.

TABLE 3

| Used code_info identifier | Message type |
| --- | --- |
| 111 0000 | Serving HS-SCCH Set Modify message indicator |
| 111 0001 | Reserved |
| 111 0010 | Reserved |
| 111 0011 | Reserved |
| 111 0100 | Reserved |
| 111 0101 | Reserved |
| 111 0110 | Reserved |
| 111 0111 | Reserved |

Next, a structure of the serving HS-SCCH Set Modify message will be described with reference to FIG. 12.

Figure 4:
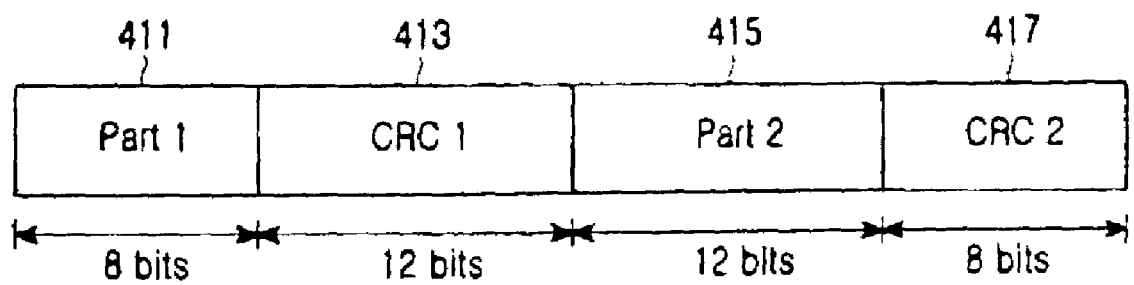
FIG. 4 illustrates an HS-SCCH structure in a general HSDPA communication system.
Figure 12:
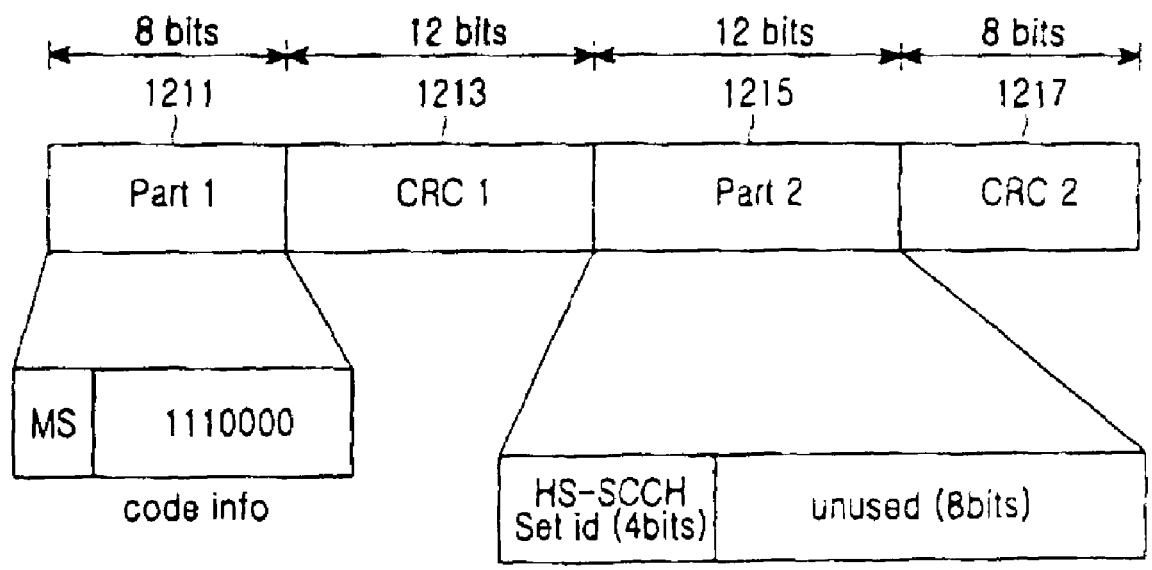
FIG. 12 illustrates an HS-SCCH structure for transmitting a Serving HS-SCCH Set Modify message in an HSDPA communication system according to a first embodiment of the present invention.

FIG. 12 illustrates an HS-SCCH structure for transmitting a Serving HS-SCCH Set Modify message in an HSDPA communication system according to a first embodiment of the present invention. Referring to FIG. 12, the HS-SCCH slot format is comprised of a part#1 field 1211, a CRC#1 field 1213, a part#2 field 1215, and a CRC#2 field 1217. As described in conjunction with FIG. 4, among control information transmitted over the HS-SCCH, modulation scheme (MS) information, HS-DSCH channelization code (hereinafter, referred to as "code info") information, transport block size (TBS) information will be referred to as "transport format and resource related information (TFRI)," and HARQ channel number information, redundancy version (RV) information, and new data indicator (NDI) information will be referred to as "HARQ information." Further, when the HS-SCCH is transmitted using an OVSF code with SF=128, 8 bits are assigned to the part™1 field 1211, 12 bits to the CRC™1 field 1213, 12 bits to the part™2 field 1215, and 8 bits to the CRC™2 field 1217, as illustrated in FIG. 12. The code_info is transmitted through the part™1 field 1211, and in the case where the code_info represents the identifier "111 0000," the code_info means a Serving HS-SCCH Set Modify message indicator. An HS-SCCH set ID, i.e., a Serving HS-SCCH Set Modify message, indicating an HS-SCCH set that a corresponding UE should monitor from the next transmission time interval (TTI) as its serving HS-SCCH set, is represented by the first 4 bits among the 12 bits of the part™2 field 1215. Since transmitting the Serving HS-SCCH Set Modify message means resetting a serving HS-SCCH set, an MS part of the part™1 field 1211 and the remaining 8 bits of the part™2 field 1215 are unused. However, for CRC™1 and CRC™2 operations, those should be set with preset data, for example, dummy bits. Of course, instead of using the dummy bits, it is also possible to repeat or puncture actual transmission data, for CRC operation. In addition, although the HS-SCCH slot format of FIG. 12 shows that the MS part precedes the code_info in the part™1 field 1211, the code_info part may precede the MS part.

Next, a structure of a MAC-hs controller will be described with reference to FIG. 13.

Figure 7:
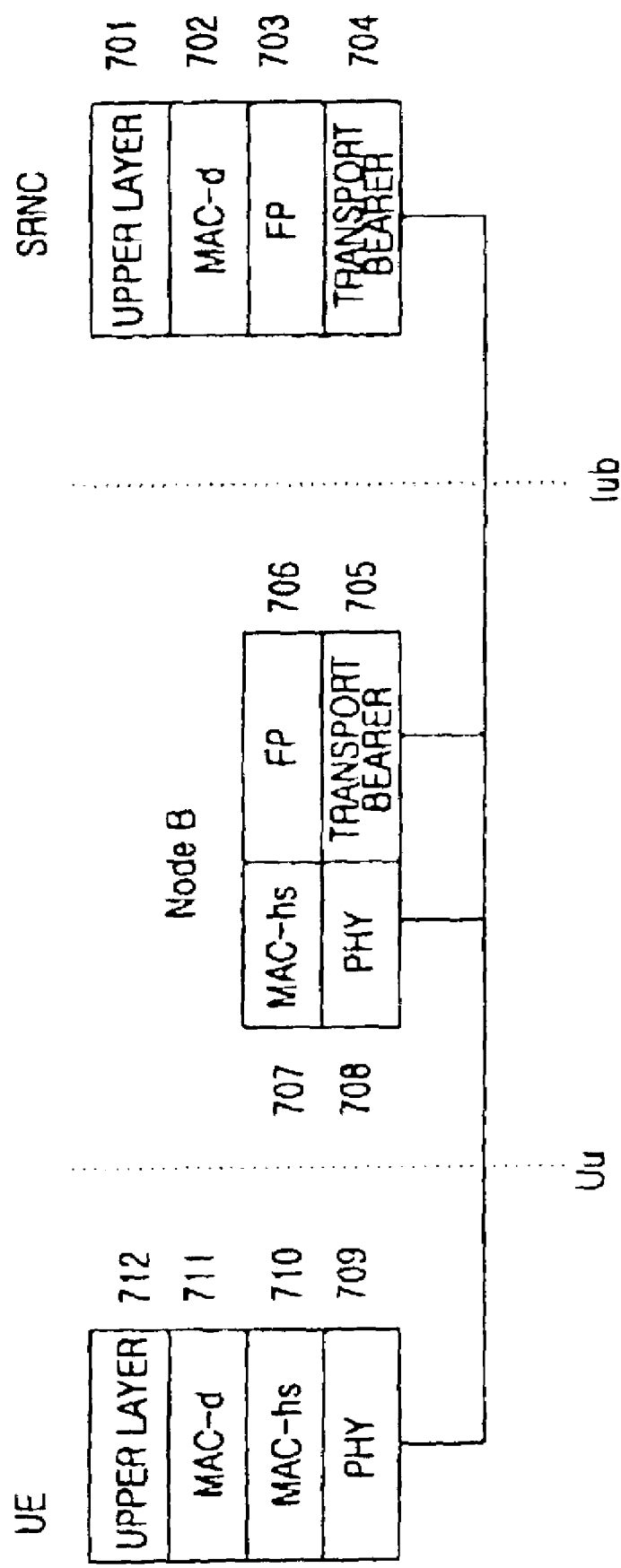
FIG. 7 illustrates a structure of a MAC layer in a general HSDPA communication system.
Figure 8:
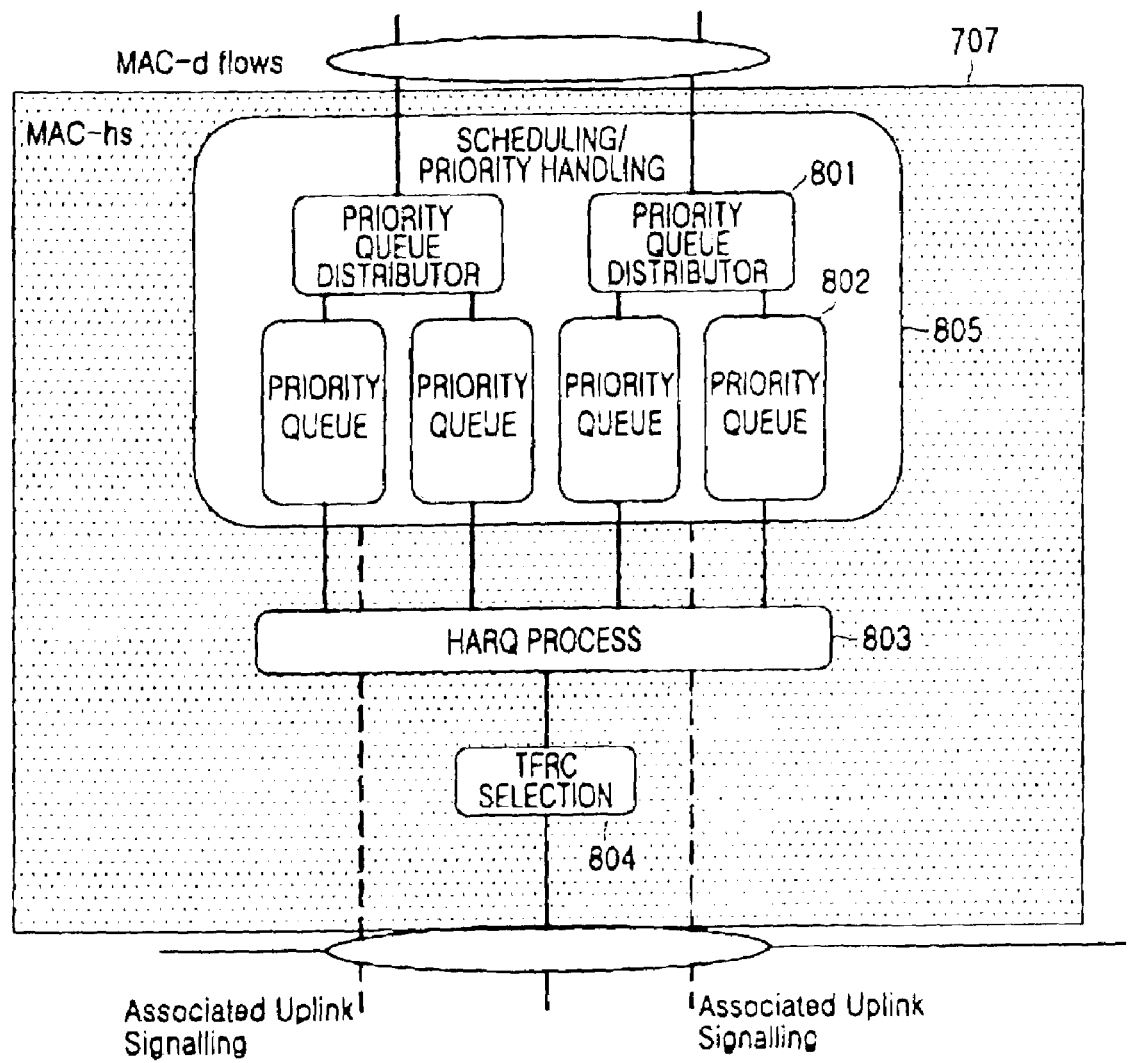
FIG. 8 illustrates a structure of a MAC-hs layer for a Node B in a general HSDPA communication system.
Figure 9:
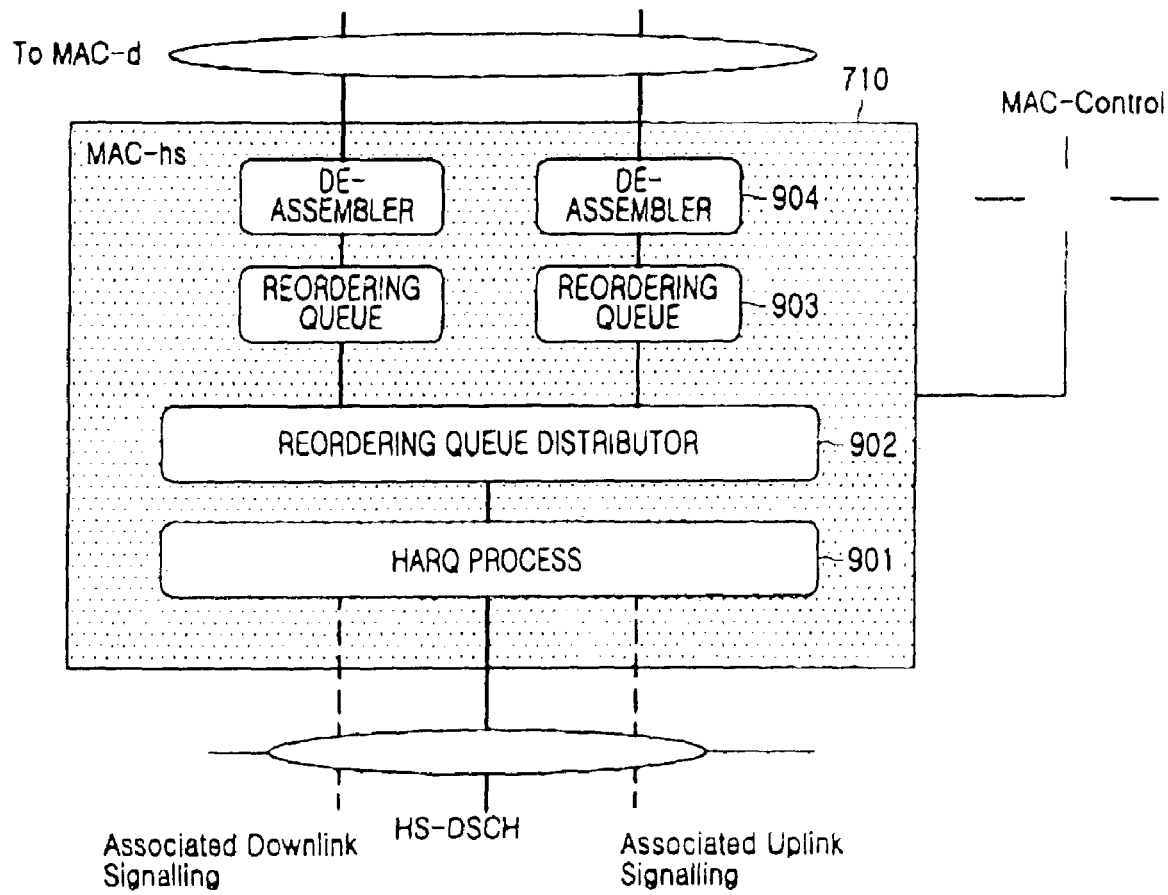
FIG. 9 illustrates a structure of a UE MAC-hs layer in a general HSDPA communication system.
Figure 10:
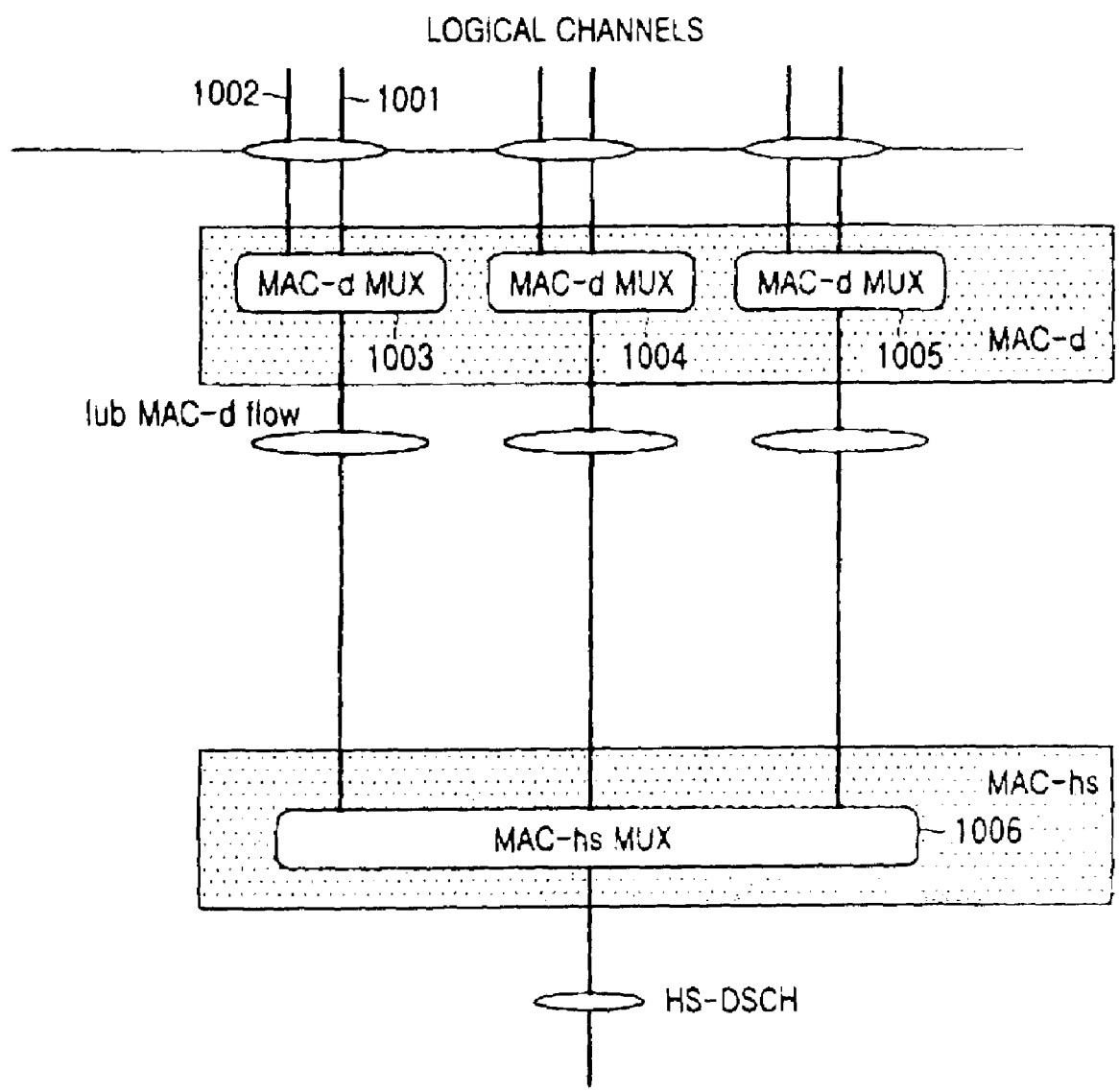
FIG. 10 schematically illustrates a structure of a MAC-d multiplexer in a general HSDPA communication system.
Figure 13:
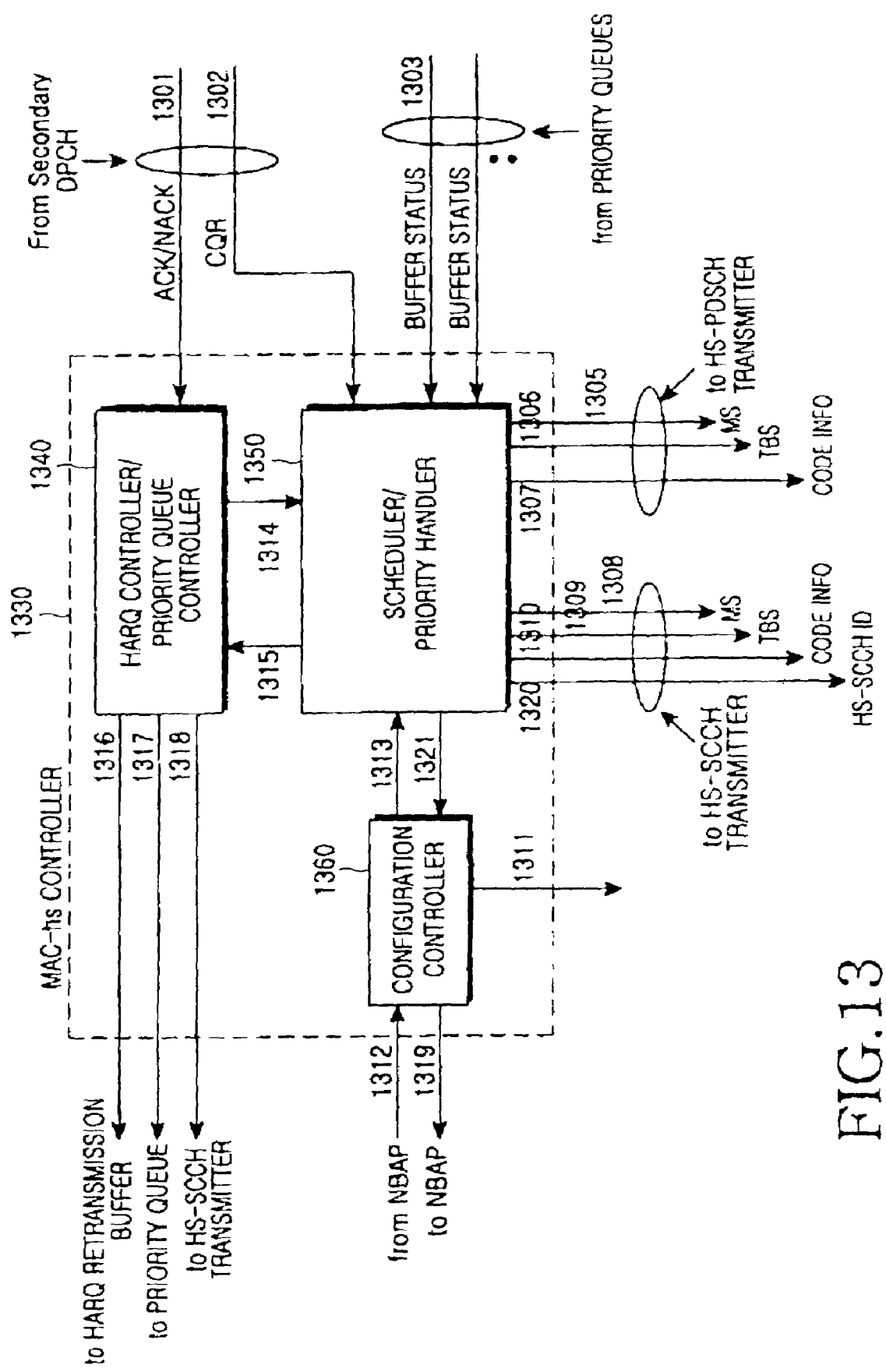
FIG. 13 illustrates a structure of a MAC-hs controller for a Node B according to a first embodiment of the present invention.

FIG. 13 illustrates a structure of a MAC-hs controller for a Node B according to a first embodiment of the present invention. Specifically, FIG. 13 illustrates a structure of a MAC-hs controller for a Node B MAC-hs layer. In an HSDPA communication system, a UE, a Node B and an SRNC have the structure described in conjunction with FIG. 7. The MAC-hs controller 1330 is comprised of an HARQ controller/priority queue controller (HPC) 1340, a scheduler/priority handler (SPH) 1350, and a configuration controller (CC) 1360.

Upon receiving an acknowledgement/negative acknowledgement (ACK/NACK) signal 1301 on a secondary DPCH transmitted by a UE, the HPC 1340 issues a command for refreshing a coded block stored in an HARQ retransmission buffer (not shown). That is, upon receiving an ACK signal for a particular channel x, the HPC 1340 issues a command for refreshing all coded blocks stored in an HARQ retransmission buffer for the channel x (see 1316). However, upon receiving a NACK signal for the channel x, the HPC 1340 provides the SPH 1350 with information indicating a fact that retransmission must be performed on the coded block transmitted over the channel x (see 1314). Further, in reply to an instruction (see 1315) from the SPH 1350, the HPC 1340 instructs the HARQ retransmission buffer or a priority queue to transmit corresponding user data (see 1316 and 1317), and transmits HARQ channel number information, RV information and NDI information, corresponding to the user data retransmitted, to an HS-SCCH transmitter (not shown; see 1318).

The SPH 1350 receives a channel quality report (CQR) 1302 transmitted over the secondary DPCH and buffer status (see 1303) from priority queues, and determines a priority queue that will transmits data over HS-PDSCH at the next TTI, based on information from the HPC 1340, indicating whether the corresponding user data is retransmitted or not. In addition, the SPH 1350 determines one of the MS to be used for transmission of the HS-PDSCH, the code_info to be used for transmission of the HS-PDSCH, an amount, i.e., TBS, of data to be transmitted over the HS-PDSCH, and the HS-SCCH set, as an HS-SCCH set for HS-SCCH for transmitting control information such as the MS to be used for transmission of the HS-PDSCH, the code_info to be used for transmission of the HS-PDSCH, the TBS indicating an amount of data to be transmitted over the HS-PDSCH. The SPH 1350 delivers the determined MS information, TBS information, code_info, a logical identifier of HS-SCCH, i.e., HS-SCCH ID, to the HS-SCCH transmitter (see 1308, 1309, 1310 and 1320). Further, the SPH 1350 delivers the determined MS information, TBS information, and code_info to an HS-PDSCH transmitter (not shown; see 1305, 1306 and 1307). In addition, the SPH 1350 delivers a priority queue for transmitting data or an identifier of an HARQ retransmission buffer, and TBS to the HPC 1340 (see 1315).

Next, the CC 1360 forms a MAC-hs layer and a physical layer by receiving configuration information from a Node B application part (NBAP; not shown; see 1312). The "configuration information" refers to information necessary for setting of an HARQ processor, assignment of an HARQ retransmission buffer, configuration of a priority queue, and setting of the serving HS-SCCH set. The CC 1360 determines the HS-SCCH set-related information and an identifier (ID) of a serving HS-SCCH set, and delivers the determined serving HS-SCCH set ID to the NBAP (see 1319) and the HS-SCCH transmitter (see 1311). In addition, the CC 1360 delivers a UE identifier in the configuration information received from the NBAP to the HS-SCCH transmitter (see 1311).

Meanwhile, when the Node B has determined to reset a serving HS-SCCH set for a particular UE, the CC 1360 determines one of the HS-SCCH sets stored therein as a new serving HS-SCCH set for the UE, and delivers the determined new serving HS-SCCH set ID to the HS-SCCH transmitter (see 1311). Further, the CC 1360 delivers a Serving HS-SCCH Set Modify message indicator and a Serving HS-SCCH Set Modify message, i.e., a new serving HS-SCCH set ID, to the SPH 1350 due to resetting of a serving HS-SCCH set for the UE (see 1313).

The SPH 1350 then delivers the Serving HS-SCCH Set Modify message indicator and a corresponding Serving HS-SCCH Set Modify message, i.e., a serving HS-SCCH set ID, to a corresponding UE at a point of time where there exists no urgent transmission data, and notifies the CC 1360 of transmission of the Serving HS-SCCH Set Modify message indicator and the Serving HS-SCCH Set Modify message to the corresponding UE (see 1321). In order to transmit the Serving HS-SCCH Set Modify message indicator, the SPH 1350 transmits to the HS-SCCH transmitter a logical identifier '111 0000' as the code_info (see 1310); a preset value, e.g., 1 or 0, as the MS since the MS has no transmission data (see 1308); and a Serving HS-SCCH Set Modify message, i.e., a preset value out of a 'serving HS-SCCH ID'+000 or 'serving HS-SCCH'+111, as the TBS (see 1309). Since there exists no data to be transmitted in the TBS, the "000" or "111" become a kind of dummy bits transmitted along with the serving HS-SCCH ID. At this point, the HPC 1340 must deliver a preset value out of the '00000' and '11111' to the HS-SCCH transmitter (see 1318). Further, upon receiving information indicating completed transmission of the Serving HS-SCCH Set Modify message indicator and a Serving HS-SCCH Set Modify message from the SPH 1350, the CC 1360 instructs the HS-SCCH transmitter to apply a serving HS-SCCH set corresponding to a new serving HS-SCCH set ID (see 1311).

Herein, a detailed description will be made of an operation of modifying actual serving HS-SCCH set information by the Node B CC 1360. The same operation can be applied even to a Node B CC 2160 of FIG. 21 according to a second embodiment of the present invention.

The CC 1360 can modify a serving HS-SCCH set for a particular UE. That is, the CC 1360 modifies the serving HS-SCCH set, if the number of UEs receiving an HSDPA service within one Node B is changed according to circumstances and the UEs are not uniformly distributed to serving HS-SCCH sets, i.e., if efficiency of OVSF code resources for the Node B is decreased. The CC 1360 can manage serving HS-SCCH set status illustrated in Table 4, in order to determine to modify a serving HS-SCCH set for the UEs.

TABLE 4

| Serving HS-SCCH set ID | UE ID |
|---|---|
| 1 | 1, 2, 3, 4 |
| 2 | 5, 6, 7 |
| ... | ... |
| n | 25, 26, 27, 28 |

In Table 4, as to the HS-SCCH set status, when a particular UE starts receiving an HSDPA service, i.e., when a Node B receives a Radio Link Setup Request message, the CC 1360 adds an ID of a UE corresponding to the Radio Link Setup Request message to a UE ID item of a serving HS-SCCH set ID item. Likewise, when the UE has completed the HSDPA service, i.e., when the Node B has received a Radio Link Deletion Request message, the CC 1360 deletes an UE ID item for a corresponding UE from the HS-SCCH set status. That is, if a particular serving HS-SCCH set is used by an excessively large or small number of UEs at a certain time as compared with other serving HS-SCCH sets, the CC 1360 can modify the serving HS-SCCH set for a corresponding UE, considering efficiency of resources. For example, if UE#25, UE#26 and UE#27 no longer receive the HSDPA service, since a serving HS-SCCH SET #n is assigned to only one UE, a serving HS-SCCH set for UEs using other serving HS-SCCH sets is modified into the serving HS-SCCH set #n, thereby increasing resource efficiency.

An operation process of the CC 1360 will now be described with reference to FIG. 28.

Figure 28:
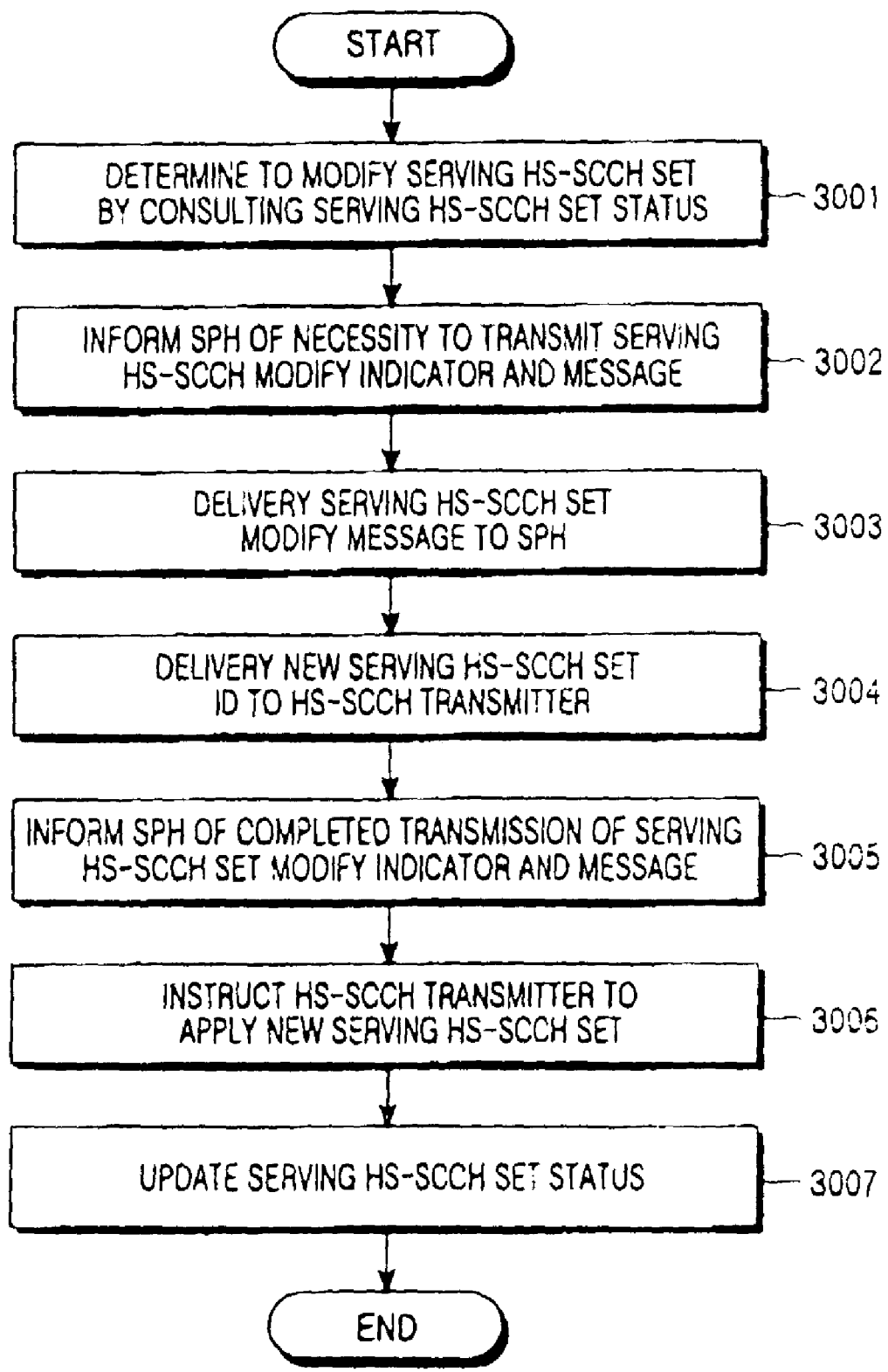
FIG. 28 is a signal flow diagram illustrating an operation process of a CC in FIG. 13.

FIG. 28 is a signal flow diagram illustrating an operation process of a CC 1360 in FIG. 13. Referring to FIG. 28, the CC 1360 determines to modify a serving HS-SCCH set for a particular UE among UEs receiving an HSDPA service within a Node B, by consulting serving HS-SCCH set status (Step 3001). Thereafter, the CC 1360 informs a fact that it is necessary to transmit a Serving HS-SCCH Set Modify message indicator and a Serving HS-SCCH Set Modify message to the SPH 1350 (Step 3002). Further, the CC 1360 delivers a Serving HS-SCCH Set Modify message indicator and a Serving HS-SCCH Set Modify message, i.e., a new serving HS-SCCH set ID, to the SPH 1350 (Step 3003). Thereafter, the CC 1360 delivers a new serving HS-SCCH set ID to a code selector 1424 that will be described in conjunction with FIG. 14, thereby to spread data with a reset code during data transmission over HS-SCCH (Step 3004). Information on codes mapped to each HS-SCCH set ID should be known to the code selector 1424 as well as a MAC-hs controller 1401 including a CC. That is, the MAC-hs controller 1401 selects a code corresponding to a reset HS-SCCH set ID and spreads data with the selected code. The HS-SCCH transmitter perceives OVSF codes corresponding to HS-SCCH sets through a Radio Bearer Setup process. As the CC 1360 transmits the Serving HS-SCCH Set Modify message indicator and the Serving HS-SCCH Set Modify message to the SPH 1350, the SPH 1350 delivers the Serving HS-SCCH Set Modify message indicator and the Serving HS-SCCH Set Modify message received from the CC 1360 to the HS-SCCH transmitter, and the HS-SCCH transmitter then transmits the Serving HS-SCCH Set Modify message indicator and the Serving HS-SCCH Set Modify message to a corresponding UE. In the first embodiment of the present invention, the Serving HS-SCCH Set Modify message indicator is transmitted through a field over which code_info is transmitted, and the Serving HS-SCCH Set Modify message is transmitted through 4 bits of the part™2 field 1215. When the Serving HS-SCCH Set Modify message indicator and the Serving HS-SCCH Set Modify message are transmitted to a corresponding UE over HS-SCCH in this manner, the SPH 1350 informs the CC 1360 of completed transmission of the Serving HS-SCCH Set Modify message indicator and the Serving HS-SCCH Set Modify message, and the CC 1360 then perceives completed transmission of the Serving HS-SCCH Set Modify message (Step 3005). Thereafter, the CC 1360 instructs the HS-SCCH transmitter to employ the modified new serving HS-SCCH set (Step 3006), and updates the managed serving HS-SCCH set status, thereby completing the serving HS-SCCH set modification process (Step 3007).

Next, a structure of the HS-SCCH transmitter will be described with reference to FIG. 14.

Figure 14:
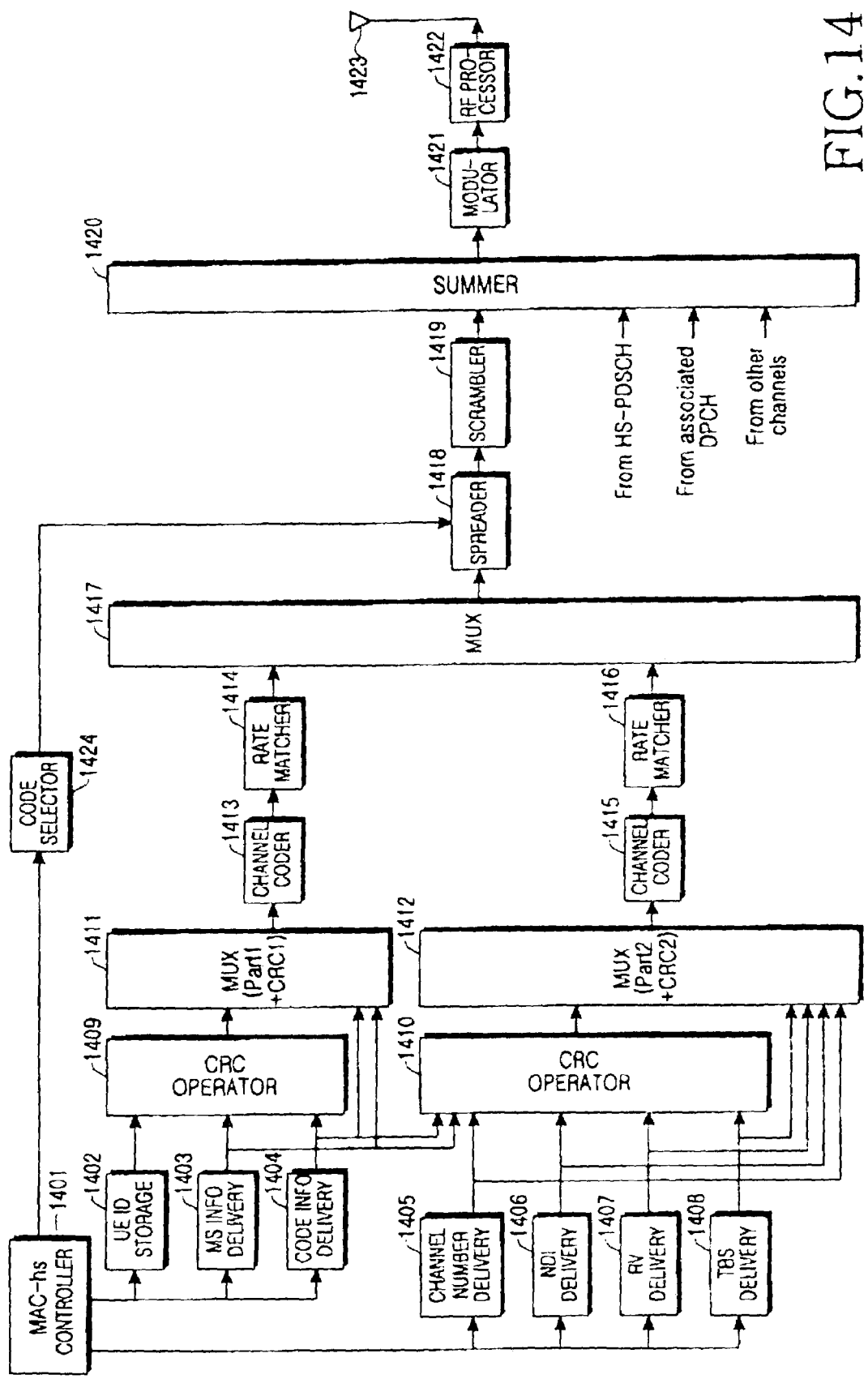
FIG. 14 illustrates a structure of an HS-SCCH transmitter according to a first embodiment of the present invention.

FIG. 14 illustrates a structure of an HS-SCCH transmitter according to a first embodiment of the present invention. Referring to FIG. 14, a MAC-hs controller 1401 (which is identical in structure to the MAC-hs controller 1330 of FIG. 13) provides a UE identifier (UE ID) to a UE ID storage 1402, MS information used for transmission of HS-SCCH to an MS information delivery part 1403, and code_info corresponding to HS-SCCH to a code information delivery part 1404. Particularly, in the first embodiment of the present invention, when resetting a serving HS-SCCH set, the MAC-hs controller 1401 provides the code information delivery part 1404 with a Serving HS-SCCH Set Modify message indicator indicating presence of a Serving HS-SCCH Set Modify message caused by resetting the serving HS-SCCH set, as code_info, i.e., "111 0000." Further, in the first embodiment of the present invention, in order to transmit a Serving HS-SCCH Set Modify message indicator and the Serving HS-SCCH Set Modify message, the MAC-hs controller 1401 provides corresponding information to a channel number delivery part 1405, an NDI delivery part 1406, an RV delivery part 1407, and a TBS delivery part 1408. The corresponding information, as described above, is information for transmitting a Serving HS-SCCH Set Modify message indicator and a Serving HS-SCCH Set Modify message, and when the Serving HS-SCCH Set Modify message is comprised of 4 bits, the 4-bit information is transmitted to the channel number delivery part 1405 and the NDI delivery part 1406, and predetermined padding bits are transmitted to the RV delivery part 1407 and the TBS delivery part 1408. Of course, the Serving HS-SCCH Set Modify message may be comprised of 4 or more bits. In addition, the MAC-hs controller 1401 provides an HS-SCCH ID to be transmitted to the code selector 1424, HARQ channel number information to the channel number delivery part 1405, NDI information to the NDI delivery part 1406, RV information to the RV delivery part 1407, and TBS information to the TBS delivery part 1408.

The code selector 1424 converts the HS-SCCH identifier into an actual OVSF code, using a serving HS-SCCH set ID and HS-SCCH set-related information previously received from the MAC-hs controller 1401 and stored therein, and provides the OVSF code to a spreader 1418. As described above, the MAC-hs controller 1401 and the code selector 1424 must include a mapping table for HS-SCCH set IDs and codes. A process of modifying the HS-SCCH ID into an actual OVSF code by the code selector 1424 will now be described below, by way of example.

Assuming that HS-SCCH set-related information stored in the code selector 1424 is as follows:

HS-SCCH related information=[HS-SCCH set 1=[C(128,124)=0, C(128,125)=1, C(128,126)=2, C(128,127)=3],HS-SCCH set 2=[C(128,0)=0, C(128,1)=1, C(2,126)=2, C(3,127)=3],HS-SCCH set 3=[C(128,4)=0, C(128,5)=1, C(128,6)=2, C(128,7)=3],Serving HS-SCCH set=HS-SCCH set 2],if an HS-SCCH ID output from the MAC-hs controller 1401 is '1', an actual OVSF code to be used for spreading of the HS-SCCH becomes C(128,1).

The UE ID storage 1402 stores a UE ID output from the MAC-hs controller 1401, and delivers a UE ID corresponding to a particular UE to a CRC operator 1409 each time HS-SCCH corresponding to the particular UE is transmitted, for CRC™1 operation on the HS-SCCH. The MS information delivery part 1403 delivers MS information used for HS-SCCH transmission, provided from the MAC-hs controller 1401, to the CRC operator 1409, a CRC operator 1410 and a multiplexer (MUX) 1411. In describing FIG. 14 herein below, the other delivery parts of the code information delivery part 1404, the channel number delivery part 1405, the NDI delivery part 1406, the RV delivery part 1407, and the TBS delivery part 1408, have a function of delivering information provided from the MAC-hs controller 1401 to the elements connected thereto.

The code information delivery part 1404 delivers code_info provided from the MAC-hs controller 1401 to the CRC operator 1409, the multiplexer 1411, and the CRC operator 1410. The CRC operator 1409 performs a CRC operation on the MS information and the code_info provided from the UE ID storage 1402, the MS information delivery part 1403 and the code information delivery part 1404, and provides the CRC operation result to the multiplexer 1411. The CRC operation result achieved by the CRC operator 1409 is a CRC bit transmitted through the CRC™1 field 413 described in conjunction with FIG. 4. Meanwhile, the multiplexer 1411 multiplexes the CRC operation result, i.e., CRC#1, provided from the CRC operator 1409, the MS information provided from the MS information delivery part 1403, and the code_info provided from the code information delivery part 1404 in accordance with the part™1 field 1211 and the CRC™1 field 1213 of the HS-SCCH slot format, and provides the multiplexed information to a channel coder 1413.

The channel coder 1413 channel-codes a bit stream received from the multiplexer 1411 by a predetermined channel coding method, and provides its output to a rate matcher 1414. It is assumed herein that the channel coder 1413 uses a convolutional coding technique as a channel coding technique. The rate matcher 1414 performs rate matching on a signal output from the channel coder 1413, and provides its output to a multiplexer 1417. The term "rate matching" means a process of matching an amount of the channel coded block to an amount of information that can be actually transmitted over a physical channel. For example, if the number of symbols generated through the channel coding is D5 and the number of symbols to be finally transmitted through the physical channel is D9, the number of symbols to be transmitted is matched through the rate matching. That is, if the D5 is larger than the D9, puncturing is performed, and if the D9 is larger than the D5, repetition is performed, thereby matching the D5 to the D9.

The channel number delivery part 1405 delivers the HARQ channel number provided from the MAC-hs controller 1401 to the CRC operator 1410 and a multiplexer 1412. The NDI delivery part 1406 delivers the NDI information provided from the MAC-hs controller 1401 to the CRC operator 1410 and the multiplexer 1412. The RV delivery part 1407 delivers the RV information provided from the MAC-hs controller 1401 to the CRC operator 1410 and the multiplexer 1412. The TBS delivery part 1408 delivers the TBS information provided from the MAC-hs controller 1401 to the CRC operator 1410 and the multiplexer 1412. The CRC operator 1410 performs a CRC operation on the MS information provided from the MS information delivery part 1403, the code_info provided from the code information delivery part 1404, the HARQ channel number provided from the channel number delivery part 1405, the NDI information provided from the NDI delivery part 1406, the RV information provided from the RV delivery part 1407, and the TBS information provided from the TBS delivery part 1408, and provides the CRC operation result to the multiplexer 1412. The CRC operation result achieved by the CRC operator 1410 is a CRC bit transmitted through the CRC™2 field 417 described in conjunction with FIG. 4. Meanwhile, the multiplexer 1412 multiplexes the CRC operation result, i.e., CRC#2, provided from the CRC operator 1410, the HARQ channel number provided from the channel number delivery part 1405, the NDI information provided from the NDI delivery part 1406, the RV information provided from the RV delivery part 1407, and the TBS information provided from the TBS delivery part 1408 in accordance with the part™2 field 1215 and the CRC™2 field 1217 of the HS-SCCH slot format, and provides the multiplexed information to a channel coder 1415.

The channel coder 1415 channel-codes a bit stream received from the multiplexer 1412 by a predetermined channel coding method, and provides its output to a rate matcher 1416. It is assumed herein that the channel coder 1415 uses a convolutional coding technique as a channel coding technique. The rate matcher 1416 performs rate matching on a signal output from the channel coder 1415, and provides its output to the multiplexer 1417. The multiplexer 1417 multiplexes signals output from the rate matchers 1414 and 1416 in accordance with the HS-SCCH slot format illustrated in FIG. 4, and provides the multiplexed signal to the spreader 1418.

The spreader 1418 spreads an output signal of the multiplexer 1417 with an OVSF code provided from the code selector 1424, and provides the spread signal to a scrambler 1419. The scrambler 1419 scrambles an output signal of the spreader 1418 with a preset scrambling code, and provides the scrambled signal to a summer 1420. The summer 1420 sums up an output signal of the scrambler 1419 and other channel signals such as a HS-PDSCH signal and an associated DPCH signal, and provides its output to a modulator 1421. The modulator 1421 modulates an output signal of the summer 1420 by a preset modulation scheme, and provides its output to a radio frequency (RF) processor 1422. The RF processor 1422 up-converts an output signal of the modulator 1421 into an RF band signal, and transmits the RF band signal over the air through an antenna 1423.

Next, a structure of the HS-PDSCH transmitter will be described with reference to FIG. 15.

Figure 15:
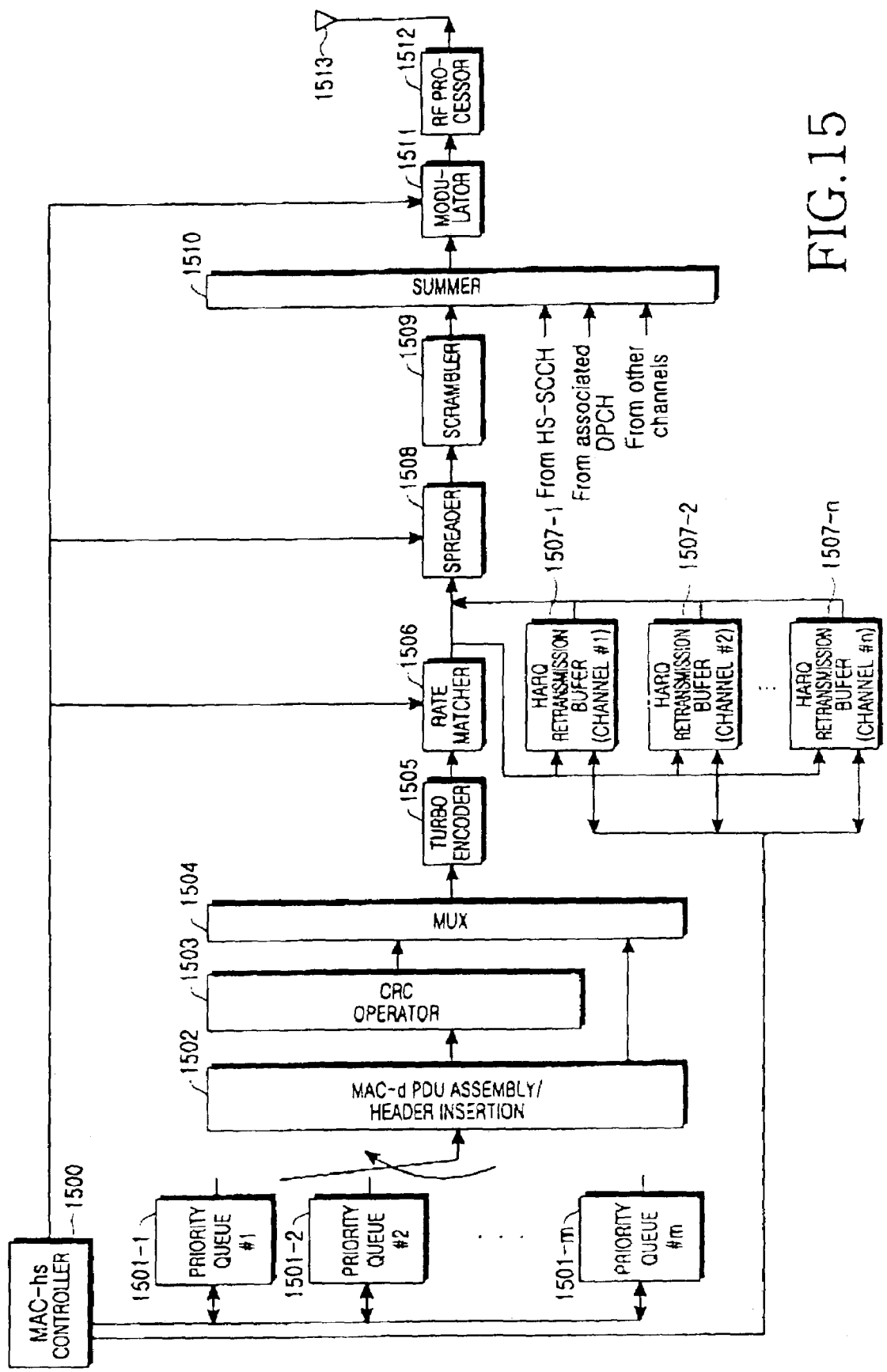
FIG. 15 illustrates a structure of an HS-PDSCH transmitter according to a first embodiment of the present invention.

FIG. 15 illustrates a structure of an HS-PDSCH transmitter according to a first embodiment of the present invention. Referring to FIG. 15, a MAC-hs controller 1500 (which is identical in structure to the MAC-hs controller 1330 of FIG. 13 and the MAC-hs controller 1401 of FIG. 14), as described in conjunction with FIG. 13, determines a priority queue or HARQ retransmission buffer for transmitting data at the next TTI based on CQRs of UEs, received over a secondary DPCH, an amount, i.e., TBS, of data stored in priority queues 1501-1 to 1501-m, and an amount of retransmission data, i.e., a size of HARQ retransmission buffers 1507-1 to 1507-n. After determining a priority queue or HARQ retransmission buffer for transmitting data at the next TTI, the MAC-hs controller 1500 informs the corresponding priority queue or HARQ retransmission buffer of an amount of data to be transmitted for the next TTI. In describing FIG. 15, it will be assumed that the MAC-hs controller 1500 has determined to transmit data stored in a particular priority queue for the next TTI.

The priority queues 1501-1 to 1501-m, informed by the MAC-hs controller 1500 of an amount of data to be transmitted for the next TTI, provide as many MAC-d PDUs as the amount of transmission data to a MAC-hs SDU assembly/MAC-hs header insertion part 1502. Control information provided from the priority queues 1501-1 to 1501-m to the MAC-hs SDU assembly/MAC-hs header insertion part 1502 along with the MAC-d PDUs includes:

(1) priority queue identifier: an identifier of a corresponding priority queue (2) transmission sequence number (TSN): a sequence number managed in a corresponding priority queue. This is increased by 1 at each transmission.

When concatenating MAC-d PDUs with different sizes into one MAC-hs SDU, a corresponding priority queue generating the MAC-d PDUs provides the following information per MAC-d PDU with the same size to the MAC-hs SDU assembly/MAC-hs header insertion part 1502.

(1) size index (SID): a logical identifier corresponding to a size of MAC-d PDU. When an HSDPA call is set up between a UE and a Node B, a size of a transmittable MAC-d PDU is limited by the type of the set call, and an SID corresponding to the size and type is assigned.

(2) N: the number of MAC-d PDUs

Figure 6:
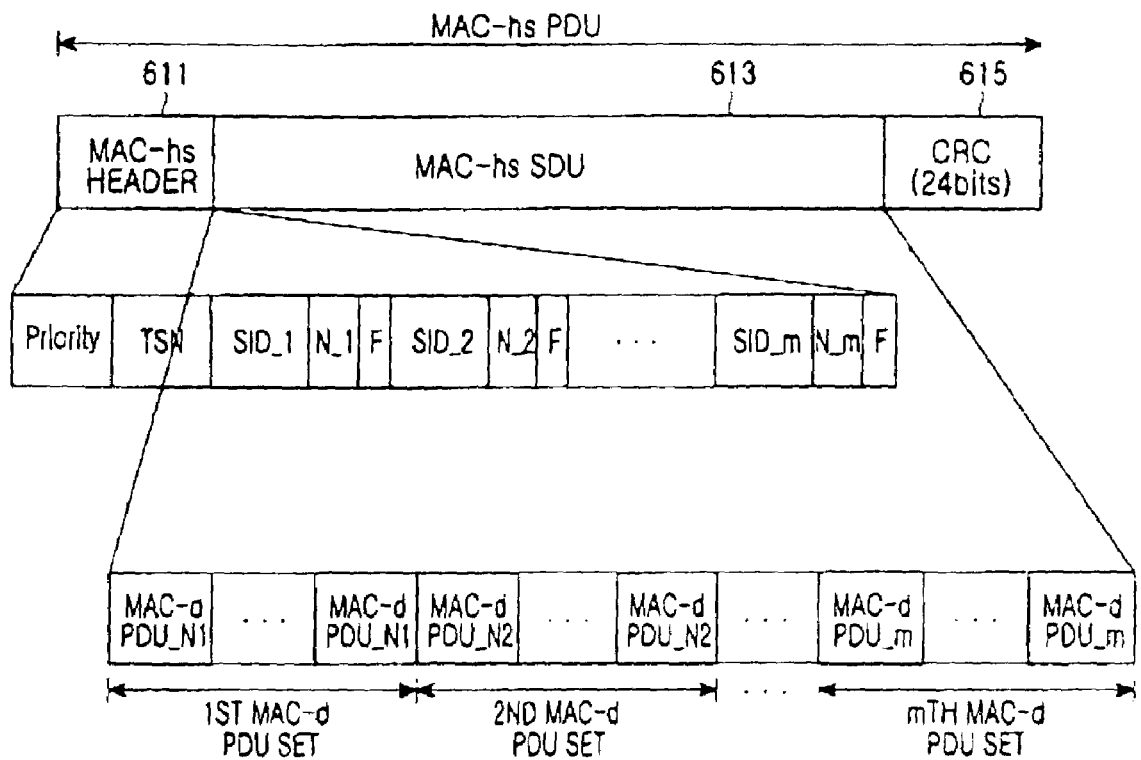
FIG. 6 illustrates a structure of MAC-hs PDU transmitted over HS-PDSCH.

The MAC-hs SDU assembly/MAC-hs header insertion part 1502, receiving the priority queue identifier, TSN, SID and N information from the MAC-hs controller 1500, inserts a MAC-hs header in MAC-hs SDU as described in conjunction with FIG. 6, and then provides its output to a CRC operator 1503 and a multiplexer 1504. The CRC operator 1503 performs a CRC operation on an output signal of the MAC-hs SDU assembly/MAC-hs header insertion part 1502, and provides the CRC operation result to the multiplexer 1504. The multiplexer 1504 generates a MAC-hs PDU by multiplexing the CRC operation result value output from the CRC operator 1503 and the MAC-hs header-inserted MAC-hs SDU output from the MAC-hs SDU assembly/MAC-hs header insertion part 1502, and provides the generated MAC-hs PDU to a turbo encoder 1505. The turbo encoder 1505 turbo-encodes the MAC-hs PDU output from the multiplexer 1504, and provides its output to a rate matcher 1506. The rate matcher 1506 performs rate matching on an output signal, i.e., a coded block, of the turbo encoder 1505 based on TBS information provided from the MAC-hs controller 1500, and provides the rate-matched signal to a spreader 1508 and an HARQ retransmission buffer corresponding to an HARQ channel number indicated by the MAC-hs controller 1500. For example, if an HARQ channel number indicated by the MAC-hs controller 1500 is 1, the rate matcher 1506 provides the rate-matched signal to an HARQ retransmission buffer 1507-1.

The spreader 1508 spreads an output signal of the rate matcher 1506 or the corresponding HARQ retransmission buffer depending on code_info provided from the MAC-hs controller 1500, and provides its output to a scrambler 1509. If the code_info output from the MAC-hs controller 1500 uses a plurality of OVSF codes, the spreader 1508 further has a function of segmenting an output signal of the rate matcher 1506 or the corresponding HARQ retransmission buffer in a size corresponding to a one-OVSF code length. The scrambler 1509 scrambles an outputs signal of the spreader 1508 with a preset scrambling code, and provides the scrambled signal to a summer 1510. The summer 1510 sums up an output signal of the scrambler 1509 and other channel signals such as an HS-SCCH signal and an associated DPCH signal, and provides its output to a modulator 1511. The modulator 1511 modulates an output signal of the summer 1510 by a preset modulation scheme, and provides the modulated signal to an RF processor 1512. The RF processor 1512 up-converts an output signal of the modulator 1511 into an RF band signal, and transmits the RF band signal over the air through an antenna 1513.

In FIG. 15, upon receiving an ACK signal for a corresponding HARQ channel, the HARQ retransmission buffers 1507-1 to 1507-n discard (or refresh) coded blocks stored therein in response to an instruction from the MAC-hs controller 1500. However, upon receiving a NACK signal for a corresponding HARQ channel, the HARQ retransmission buffers 1507-1 to 1507-n retransmit coded blocks stored therein in response to an instruction from the MAC-hs controller 1500. The retransmitted coded blocks are transmitted over the air through the same process as performed at initial transmission by the priority queues 1501-1 to 1501-m.

Next, a structure of a UE MAC-hs controller will be described with reference to FIG. 16.

Figure 16:
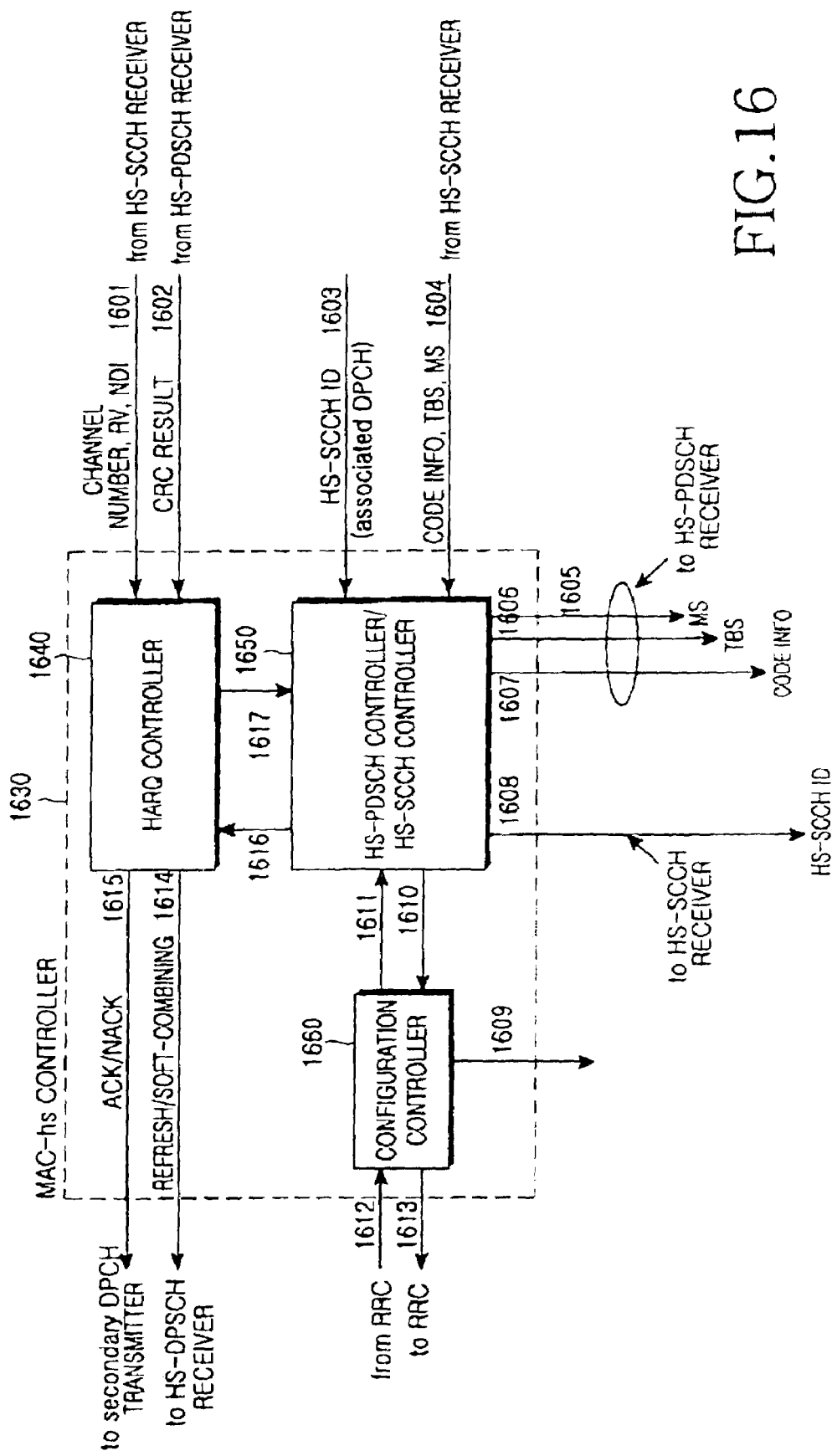
FIG. 16 illustrates a structure of a MAC-hs controller for a UE according to a first embodiment of the present invention.

FIG. 16 illustrates a structure of a MAC-hs controller for a UE according to a first embodiment of the present invention. Referring to FIG. 16, a UE MAC-hs controller 1630 is comprised of an HARQ controller (HC) 1640, an HS-PDSCH controller/HS-SCCH controller (DS/SC) 1650, and a configuration controller (CC) 1660. The HC 1640 controls an operation of an HARQ buffer based on HARQ channel number information, RV information and NDI information received from a Node B. That is, the HC 1640 refreshes or soft-combines combines coded blocks stored in a particular HARQ buffer. It will be assumed that the NDI information and the RV information have a format illustrated in Table 5.

TABLE 5

| NDI | | RV | |
|---|---|---|---|
| 0 | New coded block | 00 | Version 0 |
| | | 01 | Version 1 |
| 1 | Retransmitted coded block | 10 | Version 2 |
| | | 11 | Version 3 |

In Table 5, "Version" has the following meaning. In the case where an incremental redundancy (IR) scheme is used in an n-channel SAW HARQ scheme, the HS-PDSCH transmitter described in conjunction with FIG. 15 segments a coded block output from the turbo encoder 1505 into 4 coded blocks, and assigns a unique version number to each of the 4 segmented coded blocks as illustrated in Table 5. In the case where the HS-PDSCH transmitter transmits a coded block with version#0, upon detecting an error occurred in the transmitted coded block with version#0, an HS-PDSCH receiver stores the coded block with version#0 in the HARQ buffer, and transmits a NACK signal to the HS-PDSCH transmitter. The HS-PDSCH transmitter then transmits again a coded block with version#1, and the HS-PDSCH receiver soft-combines the coded block with version#0 and the coded block with version#1, and performs channel coding on the soft-combined coded block. Since the coded block generated by soft-combining the coded block with version#0 and the coded block with version™1 has a higher channel coding rate than the coded block with version#0, the soft-combined coded block has a high error correction rate. Since different versions are used at initial transmission and retransmission as stated above, the HS-PDSCH transmitter and the HS-PDSCH receiver must transmit and receive version information of the coded block over HS-SCCH.

An operation of the HC 1640 will now be described in more detail with respect to FIG. 16.

First, a description will be made of a case where no coded block is stored in an HARQ buffer corresponding to an HARQ channel number that the HC 1640 has received at a certain time. When the RV information and the NDI information indicate that a transmitted coded block is initially transmitted coded block, i.e., when both of the NDI information and the RV information are set to 0, the HC 1640 performs no operation. Also, when the NDI information indicates retransmission of a coded block and the RV information indicates initial transmission of a coded block, the HC 1640 performs no operation. However, when the RV information is 0 regardless of the NDI information, the HC 1640 instructs the HS-PDSCH receiver to refresh a coded block received over HS-PDSCH.

Second, a description will be made of a case where a coded block is stored in an HARQ buffer corresponding to an HARQ channel number that the HC 1640 has received at a certain time. If the NDI information is 1 and the RV information is one greater than the RV information stored in the HARQ buffer, the HC 1640 commands the HS-PDSCH receiver to soft-combine a currently received coded block with a previously stored coded block (see 1614). However, if the NDI information is 0, the HC 1640 commands the HS-PDSCH receiver to refresh the previously stored coded block (see 1614).

When the HS-PDSCH receiver generates a CRC operation result for a currently received coded block, the HC 1640 receives the CRC operation value (see 1602), and delivers an ACK/NACK signal for the received coded block to a secondary DPCH transmitter (see 1615) by analyzing the received CRC operation value.

The DS/SC 1650 receives code_info, TBS information, and MS information from an HS-SCCH receiver (see 1604), and controls transmission of HS-PDSCH based on the code_info, TBS information, and MS information received from the HS-SCCH receiver. That is, the DS/SC 1650 delivers the code_info to a despreader (not shown) of the HS-PDSCH receiver (see 1607) so that the despreader performs despreading on a received HS-PDSCH signal; delivers the TBS information to a rate matcher (not shown)

of the HS-PDSCH receiver (see 1606) so that the rate matcher performs rate matching on a received HS-PDSCH signal; and delivers the MS information to a demodulator (not shown) of the HS-PDSCH receiver (see 1605) so that the demodulator performs demodulation on a received HS-PDSCH signal. In addition, the DS/SC 1650 receives CRC™1 and CRC™2 operation result values from the HS-SCCH receiver and determines whether a corresponding HS-PDSCH signal is received. If it is determined that any one of the CRC™1 or CRC™2 has an error, the HS-PDSCH receiver may not receive an HS-PDSCH signal although it has received HI. The DS/SC 1650 controls reception of HS-SCCH based on an HS-SCCH identifier (ID) delivered from the associated DPCH receiver. That is, the DS/SC 1650 delivers to the HS-SCCH receiver a value, i.e., OVSF code, determined by matching an HI value received from the associated DPCH receiver to the HS-SCCH identifier so that the HS-SCCH receiver designates an OVSF code for HS-SCCH to be despread (see 1608).

The CC 1660 forms a MAC-hs layer and a physical layer based on configuration information delivered by a radio resource control (RRC) layer (see 1612). Forming the MAC-hs layer and the physical layer includes establishing an HARQ processor, assigning an HARQ retransmission buffer, and forming a priority queue, by way of example. Further, the CC 1660 controls establishment of a serving HS-SCCH set, and upon receiving HS-SCCH set-related information and an identifier of a serving HS-SCCH set from the RRC layer (see 1612), the CC 1660 delivers the received information to the HS-SCCH receiver (see 1609). The HS-SCCH receiver then stores the HS-SCCH set-related information and the identifier of the serving HS-SCCH set, delivered from the CC 1660, and thereafter, despreads HS-SCCH using the HS-SCCH ID delivered from the DS/SC 1650 and an OVSF code corresponding to the stored ID of the serving HS-SCCH set.

If a Node B has determined to reset a serving HS-SCCH set for a particular UE and transmitted a Serving HS-SCCH Set Modify message indicator and a Serving HS-SCCH Set Modify message through the code_info, the DS/SC 1650, since the received code_info is "111 0000", instructs the HC 1640 to deliver received HARQ channel number, RV information and NDI information, and to disregard previously received HARQ channel information, RV information and NDI information (see 1616). The HC 1640 then delivers to the DS/SC 1650 the HARQ channel number, RV information and NDI information due to resetting of the serving HS-SCCH set (see 1617). The DS/SC 1650 delivers a new serving HS-SCCH set ID to the CC 1660 based on the reset HARQ channel number, RV information and NDI information (see 1610). The CC 1660 delivers the serving HS-SCCH set ID received from the DS/SC 1650 to the HS-SCCH receiver, thereby newly setting a serving HS-SCCH set.

Now, an operation process of the CC 1660 will be described with reference to FIG. 29.

Figure 29:
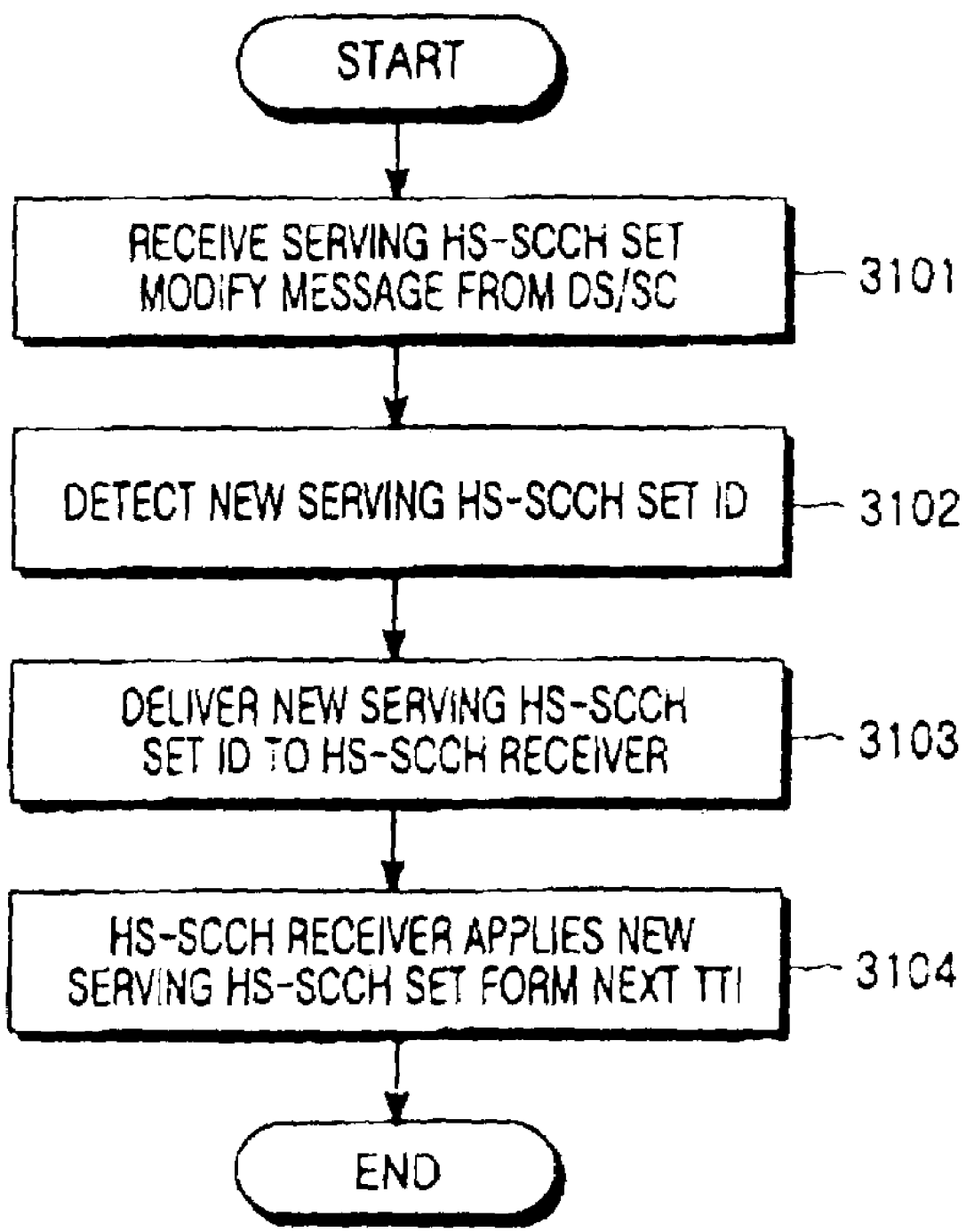
FIG. 29 is a signal flow diagram illustrating an operation process of a CC in FIG. 16.

FIG. 29 is a signal flow diagram illustrating an operation process of a CC 1660 in FIG. 16. Referring to FIG. 29, when code_info is delivered from the HS-SCCH receiver, the DS/SC 1650 analyzes the delivered code_info and determines whether a Serving HS-SCCH Set Modify message indicator is received. For example, if the code_info is a logical identifier "111 0000" indicating the Serving HS-SCCH Set Modify message indicator as illustrated in Table 3, the DS/SC 1650 determines that the Serving HS-SCCH Set Modify message indicator is received. In this case, since a Serving HS-SCCH Set Modify message is included in a part™2 field 1215 of the received HS-SCCH signal, the DS/SC 1650 delivers a Serving HS-SCCH Set Modify message included in the part™2 field 1215 to the CC 1660 (Step 3101). The CC 1660 detects a new serving HS-SCCH set ID by analyzing the Serving HS-SCCH Set Modify message delivered from the DS/SC 1650 (Step 3102), and delivers the detected new serving HS-SCCH set ID to an HS-SCCH receiver (Step 3103). The HS-SCCH receiver, as it receives the new serving HS-SCCH set ID delivered from the CC 1660, applies a serving HS-SCCH set corresponding to the new serving HS-SCCH set ID from the next TTI (Step 3104). If received data including the Serving HS-SCCH Set Modify message includes time information for a time point where a modified serving HS-SCCH set will be applied, the HS-SCCH receiver receives a modified HS-SCCH from that time point. That is, it is previously agreed in Step 3104 that a Node B and a UE apply a serving HS-SCCH set from the next TTI. Unlike this, however, a Node B may define a message including time information for a time point where an HS-SCCH set to be modified will be applied, while transmitting a message including HS-SCCH set information to be modified to a UE. In this case, the HS-SCCH receiver may receive the message including the time information from a time point corresponding to the time information. The HS-SCCH receiver has previously perceived OVSF codes corresponding to a new serving HS-SCCH set ID through an upper layer signaling flow, i.e., a Radio Bearer Setup process.

Next, a structure of the HS-SCCH receiver will be described with reference to FIG. 17.

Figure 17:
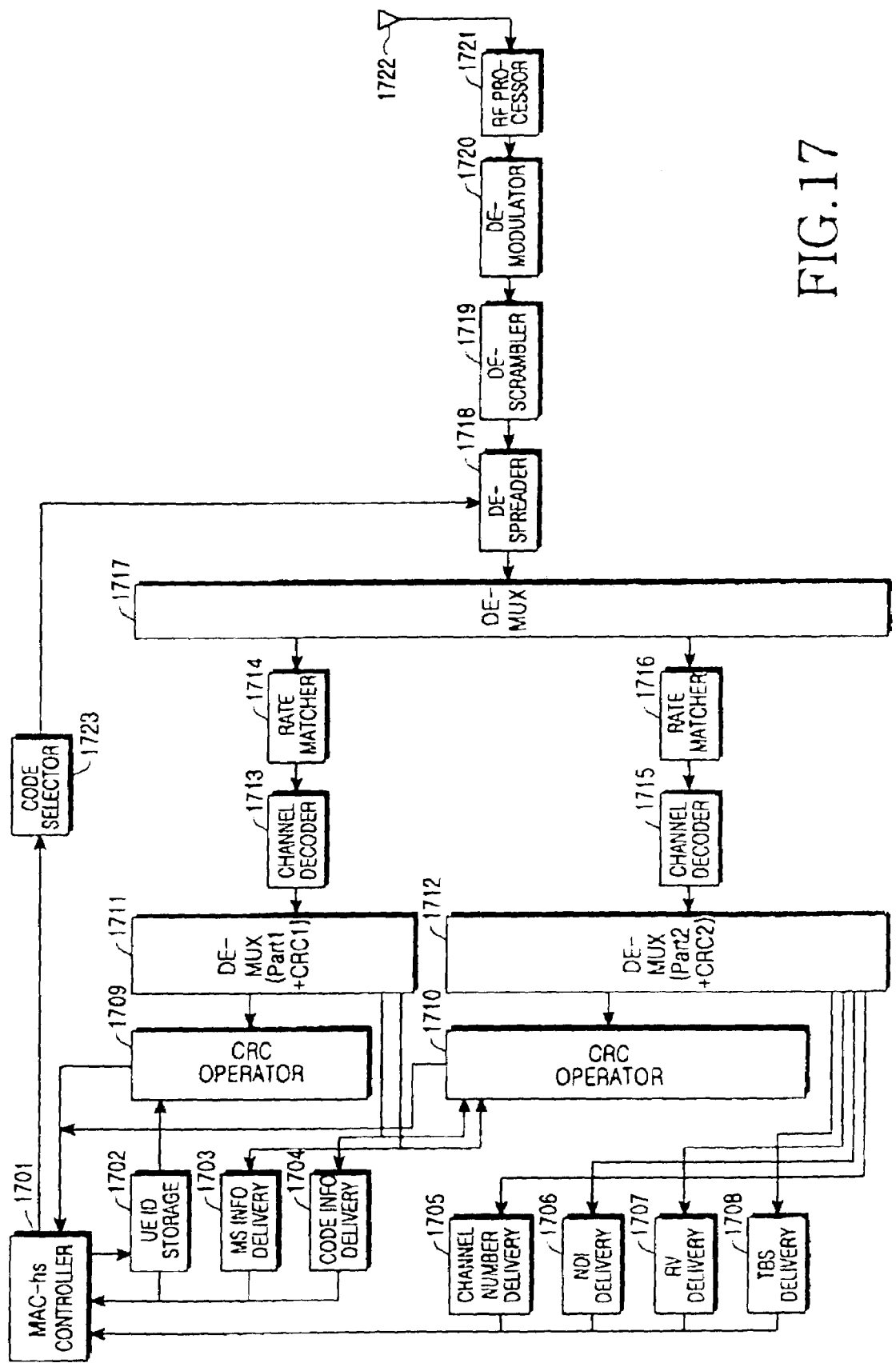
FIG. 17 illustrates a structure of an HS-SCCH receiver according to a first embodiment of the present invention.

FIG. 17 illustrates a structure of an HS-SCCH receiver according to a first embodiment of the present invention. Referring to FIG. 17, an RF band signal received over the air through an antenna 1722 is delivered to an RF processor 1721, and the RF processor 1721 down-converts the RF signal delivered from the antenna 1722 into a baseband signal, and provides the baseband signal to a demodulator 1720. The demodulator 1720 demodulates an output signal of the RF processor 1721 by a demodulation scheme corresponding to the modulation scheme used in a transmitter, or a Node B, and provides its output to a descrambler 1719. The descrambler 1719 descrambles an output signal of the demodulator 1720 with the same scrambling code as the scrambling code used in the Node B, and provides its output to a despreader 1718. The despreader 1718 despreads an output signal of the descrambler 1719 with the same spreading code as the spreading code used in the Node B, and provides its output to a demultiplexer (DEMUX) 1717. The despreader 1718 performs despreading with an OVSF code corresponding to a spreading code indicated by a code selector 1723. The code selector 1723 previously stores HS-SCCH set-related information delivered by a MAC-hs controller 1701 (which is identical in structure to the MAC-hs controller 1630 of FIG. 16) in an HSDPA call setup process, and upon acquiring an HI value received over an associated DPCH, detects an OVSF code for HS-SCCH corresponding to the HI from a serving HS-SCCH set and delivers the detected OVSF code to the despreader 1718.

The demultiplexer 1717 demultiplexes an output signal of the despreader 1718 into a part™1 field, a CRC™1 field, a part™2 field and a CRC™2 field, and provides the part™1 field and CRC™1 field signals to a rate matcher 1714 and the part™2 field and CRC™2 field signals to a rate matcher 1716. The rate matcher 1714 rate-matches the part™1 field and CRC™1 field signals provided from the demultiplexer 1717, and provides its output to a channel decoder 1713. The channel decoder 1713 channel-decodes an output signal of the rate matcher 1714 by a channel decoding scheme corresponding to the channel coding scheme used in the Node B, and provides its output to a demultiplexer 1711. The demultiplexer 1711 demultiplexes an output signal of the channel decoder 1713 into the part™1 field and CRC™1 field, and provides the part™1 field and CRC™1 field to a CRC operator 1709, MS information on the part™1 field to an MS information delivery part 1703 and a CRC operator 1710, and code_info on the part™1 field to a code information delivery part 1704 and the CRC operator 1710. The MS information delivery part 1703 delivers the MS information provided from the demultiplexer 1711 to the MAC-hs controller 1701, and the code information delivery part 1704 delivers the code_info provided from the demultiplexer 1711 to the MAC-hs controller 1701. Particularly, in the first embodiment of the present invention, when information not belonging to code_info delivered to the MAC-hs controller 1701, i.e., a logical identifier "111 0000" among logical identifiers representing code_info is received, the code information delivery part 1704 delivers this information to the MAC-hs controller 1701 so that the MAC-hs controller 1701 perceives that the received information is a Serving HS-SCCH Set Modify message. That the Serving HS-SCCH Set Modify message is received means that a Serving HS-SCCH Set Modify message is included in a part™2 field 1215 of a currently received HS-SCCH. A UE ID storage 1702 stores a UE identifier (UE ID) delivered from the MAC-hs controller 1701, and provides the stored UE identifier to the CRC operator 1709 each time the CRC operator 1709 performs a CRC operation so that the UE identifier is used for the CRC™1 operation.

Meanwhile, the rate matcher 1716 rate-matches the part™2 field and CRC™2 field signals provided from the demultiplexer 1717, and provides its output to a channel decoder 1715. The channel decoder 1715 channel-decodes an output signal of the rate matcher 1716 by a channel decoding scheme corresponding to the channel coding scheme used in the Node B, and provides its output to a demultiplexer 1712. The demultiplexer 1712 demultiplexes an output signal of the channel decoder 1715 into the part™2 field and CRC™2 field signals, and provides the part™2 field and CRC™2 field signals to the CRC operator 1710, an HARQ channel number of the part™2 field signal to a channel number delivery part 1705, NDI information of the part™2 field signal to an NDI delivery part 1706, RV information of the part™2 field signal to an RV delivery part 1707, and TBS information of the part™2 field signal to a TBS delivery part 1708. Particularly, in the first embodiment of the present invention, when the code_info output from the code information delivery part 1704 indicates a logical identifier "111 0000" among the logical identifiers, i.e., indicates a Serving HS-SCCH Set Modify message indicator, the MAC-hs controller 1701 perceives, as a Serving HS-SCCH Set Modify message, the information received from the channel number delivery part 1705, NDI delivery part 1706, RV delivery part 1707, and TBS delivery part 1708, thereby recognizing a new serving HS-SCCH set ID, and stores the new serving HS-SCCH set ID. The serving HS-SCCH set ID is applied immediately or a predetermined delay time after transmission of an ACK signal for a received HS-SCCH. The modified serving HS-SCCH set ID must be applied by synchronizing a Node B with a UE, and the application point becomes in principle the next TTI after an ACK signal is transmitted. Unlike this, when necessary, it is also possible to previously determine a delay time between the Node B and the UE, and apply the modified serving HS-SCCH set ID after a lapse of the delay time. The CRC operator 1710 performs a CRC™2 operation, using the part™2 field and CRC™2 field signals, the MS information provided from the MS information delivery part 1703, and the code_info provided from the code information delivery part 1704, and provides the CRC™2 operation result to the MAC-hs controller 1701. The channel number delivery part 1705 delivers the HARQ channel number provided from the demultiplexer 1712 to the MAC-hs controller 1701, and the RV delivery part 1707 delivers the RV information provided from the demultiplexer 1712 to the MAC-hs controller 1701. The NDI delivery part 1706 delivers the NDI information provided from the demultiplexer 1712 to the MAC-hs controller 1701, and the TBS delivery part 1708 delivers the TBS information provided from the demultiplexer 1712 to the MAC-hs controller 1701.

Next, a structure of the HS-PDSCH receiver will be described with reference to FIG. 18.

Figure 18:
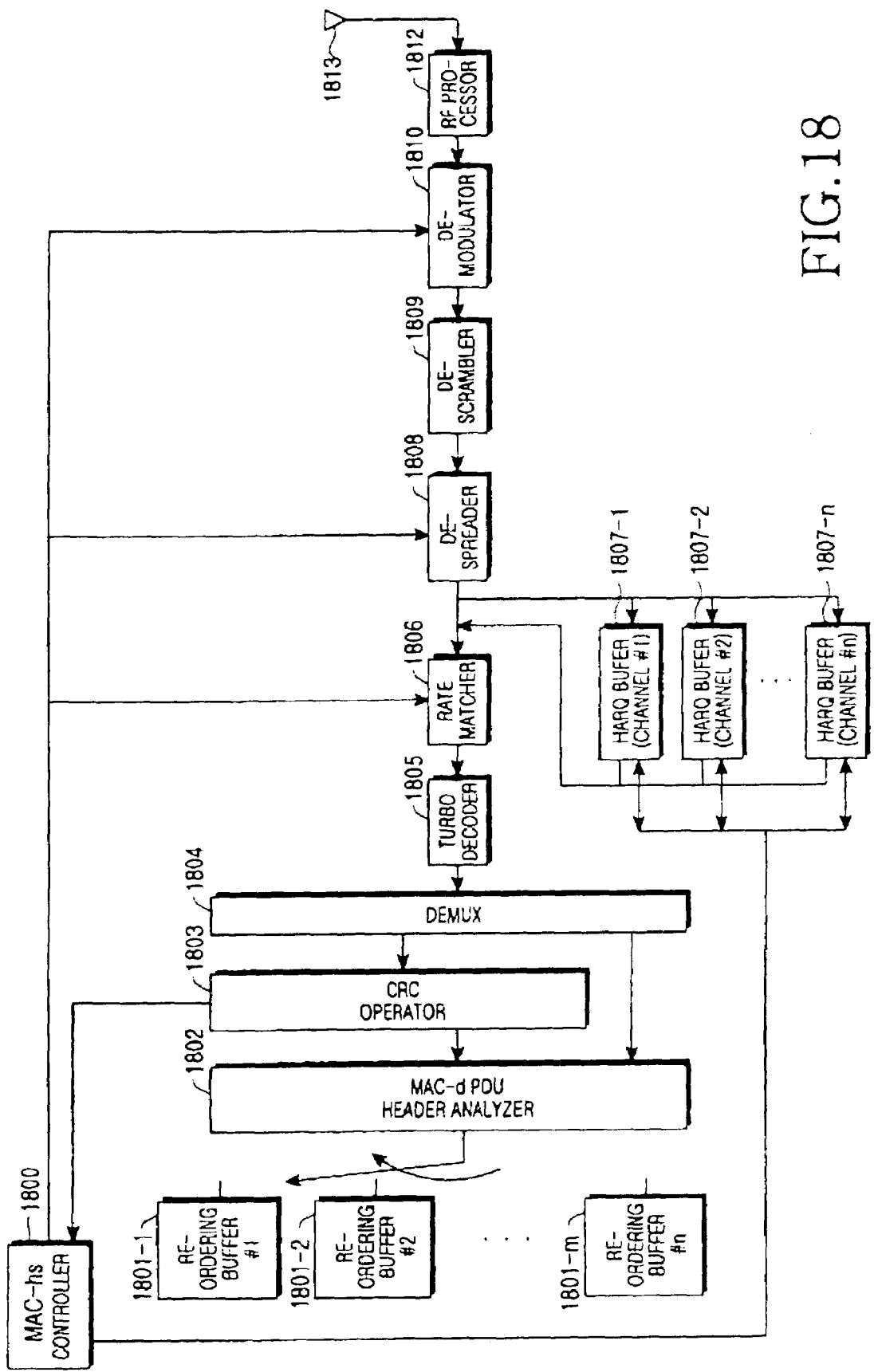
FIG. 18 illustrates a structure of an HS-PDSCH receiver according to a first embodiment of the present invention.

FIG. 18 illustrates a structure of an HS-PDSCH receiver according to a first embodiment of the present invention. Referring to FIG. 18, an RF band signal received over the air through an antenna 1813 is delivered to an RF processor 1812, and the RF processor 1812 down-converts the RF signal delivered from the antenna 1813 into a baseband signal, and provides the baseband signal to a demodulator 1810. The demodulator 1810 demodulates an output signal of the RF processor 1812 by a demodulation scheme corresponding to the modulation scheme used in a transmitter, or a Node B, and provides its output to a descrambler 1809. The descrambler 1809 descrambles an output signal of the demodulator 1810 with the same scrambling code as the scrambling code used in the Node B, and provides its output to a despreader 1808. The despreader 1808 despreads an output signal of the descrambler 1809 with the same spreading code as the spreading code used in the Node B. The demodulation scheme applied to the demodulator 1810 and the spreading code for despreading performed by the despreader 1808 are determined by a MAC-hs controller 1800 (which is identical in structure to the MAC-hs controller 1630 of FIG. 16 and the MAC-hs controller 1701 of FIG. 17).

The despreader 1808 provides the despread signal to a corresponding HARQ buffer among HARQ buffers 1807-1 to 1807-n, and a rate matcher 1806. The rate matcher 1806 rate-matches an output signal of the despreader 1808 based on TBS information provided from the MAC-hs controller 1800, and provides its output to a turbo decoder 1805. If an output signal of the despreader 1808 is a retransmitted coded block, a corresponding HARQ buffer among the HARQ buffers 1807-1 to 1807-n soft-combines the retransmitted coded block with a previously stored coded block under the control of the MAC-hs controller 1800, and provides its output to the rate matcher 1806. The turbo decoder 1805 turbo-decodes an output signal of the rate matcher 1806, and provides its output to a demultiplexer 1804. The demultiplexer 1804 demultiplexes an output signal of the turbo decoder 1805, and provides its output to a CRC operator 1803 and a MAC-hs header analyzer 1802.

The CRC operator 1803 performs a CRC operation on an output signal of the demultiplexer 1804, and provides the CRC operation result to the MAC-hs header analyzer 1802 and the MAC-hs controller 1800. If the CRC operation result from the CRC operator 1803 indicates that an error has occurred in the currently received coded block, the MAC-hs controller 1800 transmits a NACK signal to a Node B over a secondary DPCH, and then refreshes the currently received coded block. However, as a result of the CRC operation, if no error has occurred in the currently received coded block, the MAC-hs controller 1800 transmits an ACK signal to the Node B over the secondary DPCH, and then instructs a corresponding HARQ buffer to refresh a coded block stored therein. Further, the MAC-hs controller 1800 provides the received coded block to a corresponding reordering buffer among reordering buffers 1801-1 to 1801-m according to information on a priority field in a MAC-hs header of the received signal. The reordering buffers 1801-1 to 1801-m reorder the stored MAC-hs SDUs based on TSN in the MAC-hs header of the received MAC-hs PDU. The reordered MAC-hs SDUs are segmented into MAC-d PDUs according to SID and N values of each header, and then delivered to an upper layer.

Up to the present, a description has been made of the first embodiment in which a Serving HS-SCCH Set Modify message representing new serving HS-SCCH set-related information is transmitted using a part™2 field of HS-SCCH. Next, a description will be made of a second embodiment in which a Serving HS-SCCH Set Modify message representing new serving HS-SCCH set-related information is transmitted through MAC-hs PDU.

2. Second Embodiment

A second embodiment of the present invention provides a method of reordering a serving HS-SCCH set by transmitting a Serving HS-SCCH Set Modify message in the form of MAC-hs PDU. The MAC-hs PDU structure will be described with reference to FIGS. 19 and 27.

Figure 19:
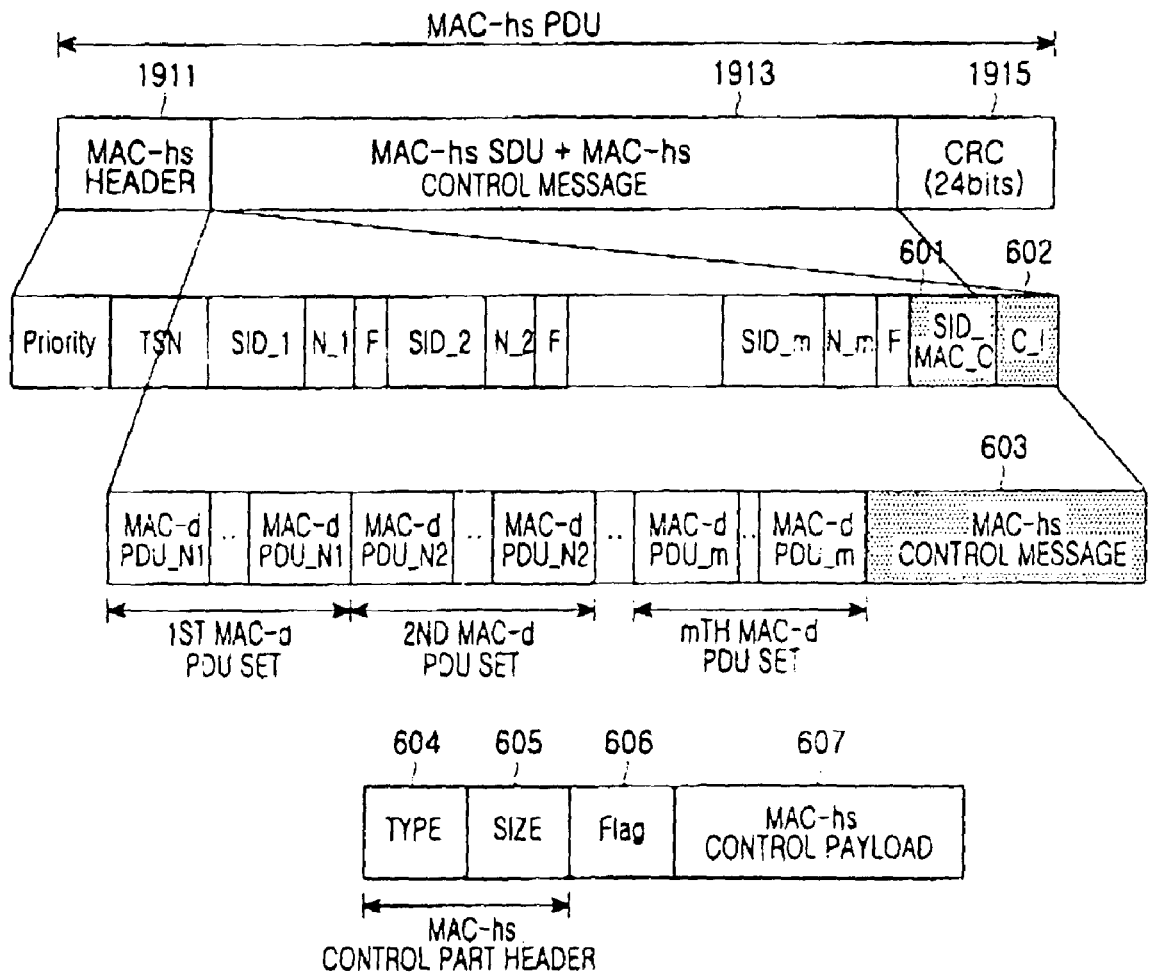
FIG. 19 illustrates a structure of MAC-hs PDU according to a second embodiment of the present invention.

FIG. 19 illustrates a structure of MAC-hs PDU according to a second embodiment of the present invention. Referring to FIG. 19, the MAC-hs PDU is comprised of a MAC-hs header 1911, a MAC-hs SDU+MAC-hs control message 1913, and a CRC 1915. Information included in the MAC-hs header 1911 is as follows:

(1) Priority: this is a priority queue identifier of the MAC-hs SDU 1913, and 3 bits are assigned thereto.

(2) TSN (Transmission Sequence Number): this is a sequence number used when MAC-hs SDU 1913 is reordered in a priority queue, and 5 or 6 bits are assigned thereto.

(3) SID_x: this represents a size of MAC-d PDUs belonging to an $x^{th}$ MAD-d PDU set among sets of PDUs constituting MAC-hs SDU 1913, and 2 or 3 bits are assigned thereto.

(4) N_x: this represents the number of MAC-d PDUs belonging to an $x^{th}$ MAC-d PDU set, and 7 bits are assigned thereto.

(5) F (Flag): when F is set to 1, it means that the next field is a MAC-hs SDU field, and when F is set to 0, it means that the next field is an SID field. 1 bit is assigned thereto.

(6) SID_MAC_C 601: this has the same size as SID_x and includes meaningless information. A transmitter and a receiver both disregard the SID_MAC_C value.

(7) C_I 602: this has the same size as the size determined by adding N_x and F, and indicates whether a MAC-hs control message exists in MAC-hs PDU. In the C_I 602, a part corresponding to N_x is usually coded into the same value with a value unused in the N_x. Upon receiving a value previously set in the last N_part of the MAC-hs header, a receiver determines that a MAC-hs control message is included in MAC-hs PDU. In the present invention, a value set in the last N_x part is fixed to '0000000'. Therefore, C_I is always set to '00000001'.

(8) MAC-hs control message: this is located after MAC-hs SDU, and is comprised of a MAC-hs control part header, a Flag 606, and a MAC-hs control payload 607. The MAC-hs control part header is comprised of a Type field 604 and a Size field 605. The Type field 604 represents a type of the MAC-hs control message, and is comprised of 3 bits. Further, the Type field 604 has the following meanings illustrated Table 6 below.

TABLE 6

| Type | Description |
| --- | --- |
| 000 | Serving HS-SCCH Set Modify Type #1 |
| 001 | Serving HS-SCCH Set Modify Type #2 |
| 010 | Reserved |
| 011 | Reserved |
| 100 | Reserved |
| 101 | Reserved |
| 110 | Reserved |
| 111 | Reserved |

The Size field 605 represents a size of a MAC-hs control message by the bit, and is assigned 13 bits. The Flag 606 represents whether there exists another MAC-hs control message after a corresponding MAC-hs control message. The MAC-hs control payload 607 is a part representing actual data, i.e., a Serving HS-SCCH Set Modify message, of the MAC-hs control message. In the second embodiment of th present invention, the number of transmission bits for a field through which the MAC-hs control payload, i.e., Serving HS-SCCH Set Modify message, is transmitted can be extended according to the actual capacity of a physical channel. Therefore, as described before, when a modified serving HS-SCCH set ID, or the modified serving HS-SCCH set ID and the corresponding OVSF codes, or an HS-SCCH set are entirely reset in the Node B, the modified serving HS-SCCH set-related information can include ID of serving HS-SCCH sets included in the HS-SCCH set and a list of the corresponding OVSF codes. Further, in the second embodiment of the present invention, it is necessary to transmit the list of the OVSF codes through MAC-hs PDU not only to a corresponding UE but also to an SRNC connected to the UE.

Another MAC-hs PDU structure determined by modifying the MAC-hs PDU structure of FIG. 19 will now be described with reference to FIG. 27.

Figure 27:
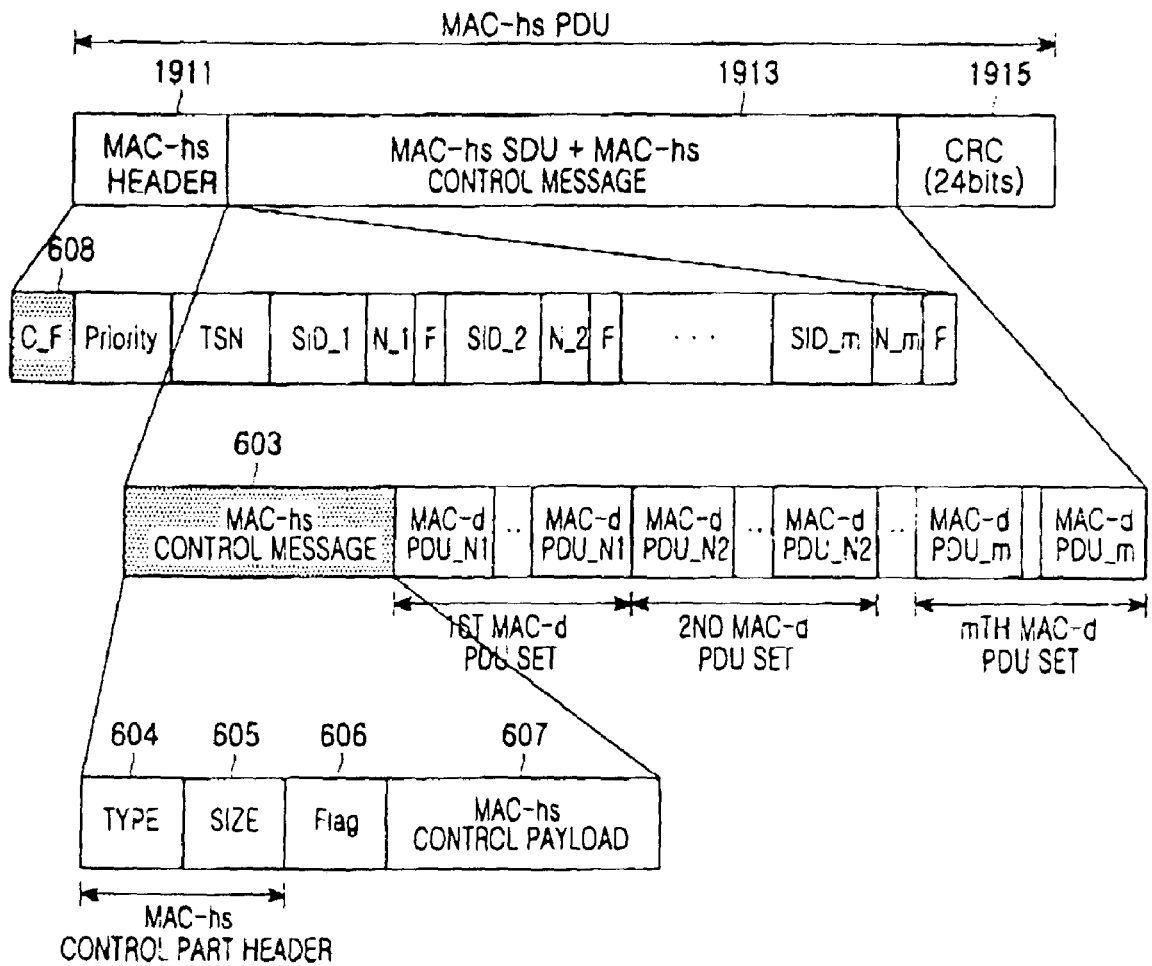
FIG. 27 illustrates another MAC-hs PDU structure according to a second embodiment of the present invention.

FIG. 27 illustrates another MAC-hs PDU structure according to a second embodiment of the present invention. Referring to FIG. 27, a C_F flag field 608 representing whether a MAC-hs control message exists in MAC-hs PDU transmitted without using SDI_MAC_C 601 and C_I 602 is newly set up. The C_F flag 608 is expressed with 1 bit, and can be located at the head of the MAC-hs header 1911 as illustrated in FIG. 27. Alternatively, the C_F flag 608 can be located immediately after the Priority field or the TSN field. When the C_F flag 608 indicates that the MAC-hs control message exists in the MAC-hs PDU, the MAC-hs control message is located either at the head of the MAC-hs SDU+MAC-hs control message 1913 as illustrated in FIG. 27, or at the end of the MAC-hs SDU+MAC-hs control message 1913 as illustrated in FIG. 19.

A format of the MAC-hs control payload 607 will now be described.

Figure 20A:
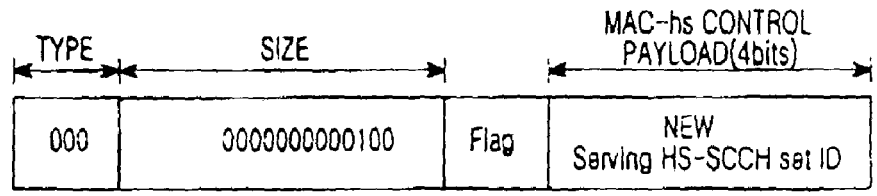
FIGS. 20A and 20B illustrate a MAC-hs control payload format according to a first embodiment of the present invention.
Figure 20B:
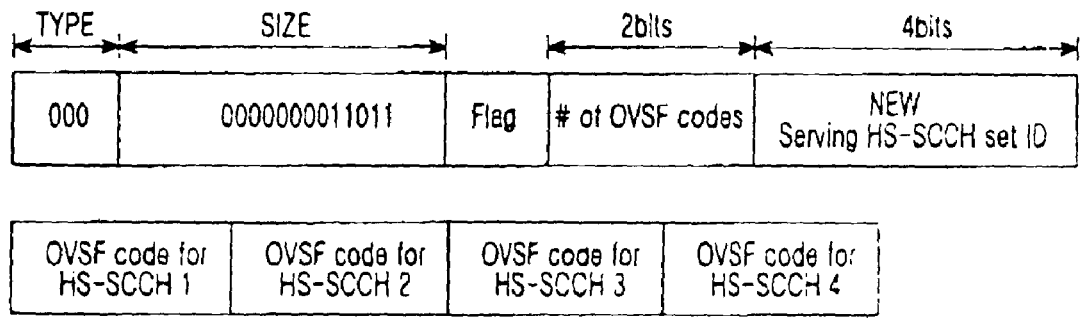

The MAC-hs control payload 607 is determined according to the type of the MAC-hs control message. A format of the MAC-hs control payload 607 is illustrated in FIGS. 20A and 20B, by way of examples. A format of the MAC-hs control payload 607 will be described with reference to FIGS. 20A and 20B.

FIGS. 20A and 20B illustrate a MAC-hs control payload format according to an embodiment of the present invention.

First, referring to FIG. 20A, a Type field of a Serving HS-SCCH Set Modify message is set to Serving HS-SCCH Set Modify Type #1, and the Serving HS-SCCH Set Modify Type ™1 is used for the same purpose as the Serving HS-SCCH Set Modify message described in conjunction with the first embodiment of the present invention. That is, in a state where a UE and a Node B share all HS-SCCH set information, the Node B, if it intends to modify a serving HS-SCCH set, transmits the Serving HS-SCCH Set Modify message to the UE along with serving HS-SCCH set ID information. A Size field is filled with '00000000000100' representing a 4-bit size of the MAC-hs control payload, and a Flag field is filled with a value representing whether a succeeding MAC-hs control message exists. In addition, the MAC-hs control payload part is filled with a new serving HS-SCCH set ID.

Next, referring to FIG. 20B, a Type field of a Serving HS-SCCH Set Modify message is set to Serving HS-SCCH Set Modify Type #2. As described above, when an HS-SCCH set is entirely reset in the Serving HS-SCCH Set Modify message, a Node B transmits the Serving HS-SCCH Set Modify message along with ID of serving HS-SCCH sets included in the HS-SCCH set and a list of the corresponding OVSF codes. For example, it will be assumed that at a certain time t0, the following HS-SCCH set-related information is formed between a particular Node B and a particular UE.

HS-SCCH related information=[HS-SCCH set 1=[C(128, 124)=0, C(128,125)=1, C(128,126)=2, C(128,127)=3],HS-SCCH set 2=[C(128,0)=0, C(128,1)=1, C(128, 2)=2, C(128, 3)=3],HS-SCCH set 3=[C(128,4)=0, C(128,5)=1, C(128,6)=2, C(128,7)=3],Serving HS-SCCH set=HS-SCCH set 2]

A Node B uses a Serving HS-SCCH Set Modify Type ™2 message, when it intends to modify a serving HS-SCCH set to HS-SCCH set 2=[C(128,0)=0, C(128,1)=1, C(128, 2)=2]. In the Serving HS-SCCH Set Modify Type ™2 message, a Type field and a Size field are coded in the same way as the Serving HS-SCCH Set Modify Type ™1 message. Further, a '# of OVSF codes' field illustrated in FIG. 20B represents how many OVSF codes are included in a new serving HS-SCCH set. As described above, since the serving HS-SCCH set can be comprised of a minimum of 1 OVSF code to a maximum of 4 OVSF codes, the number of OVSF codes constituting the serving HS-SCCH set is represented by the '# of OVSF codes' field.

When the HS-SCCH set-related information is set as shown above and the serving HS-SCCH set is modified to HS-SCCH set 2=[C(128,0 )=0, C(128,1)=1, C(128, 2)=2], the '# of OVSF codes' field is filled with 3. A 'New HS-SCCH set ID' field is filled with 2 which represents an identifier (ID) of the newly modified serving HS-SCCH set, i.e., a serving HS-SCCH set #2. Herein, positions of OVSF codes for each HS-SCCH in a code tree are sequentially inserted in the 'New HS-SCCH set ID' field. For example, 0, 1 and 2 are inserted.

Next, a structure of a MAC-hs controller for a Node B according to a second embodiment of the present invention will be described.

Figure 21:
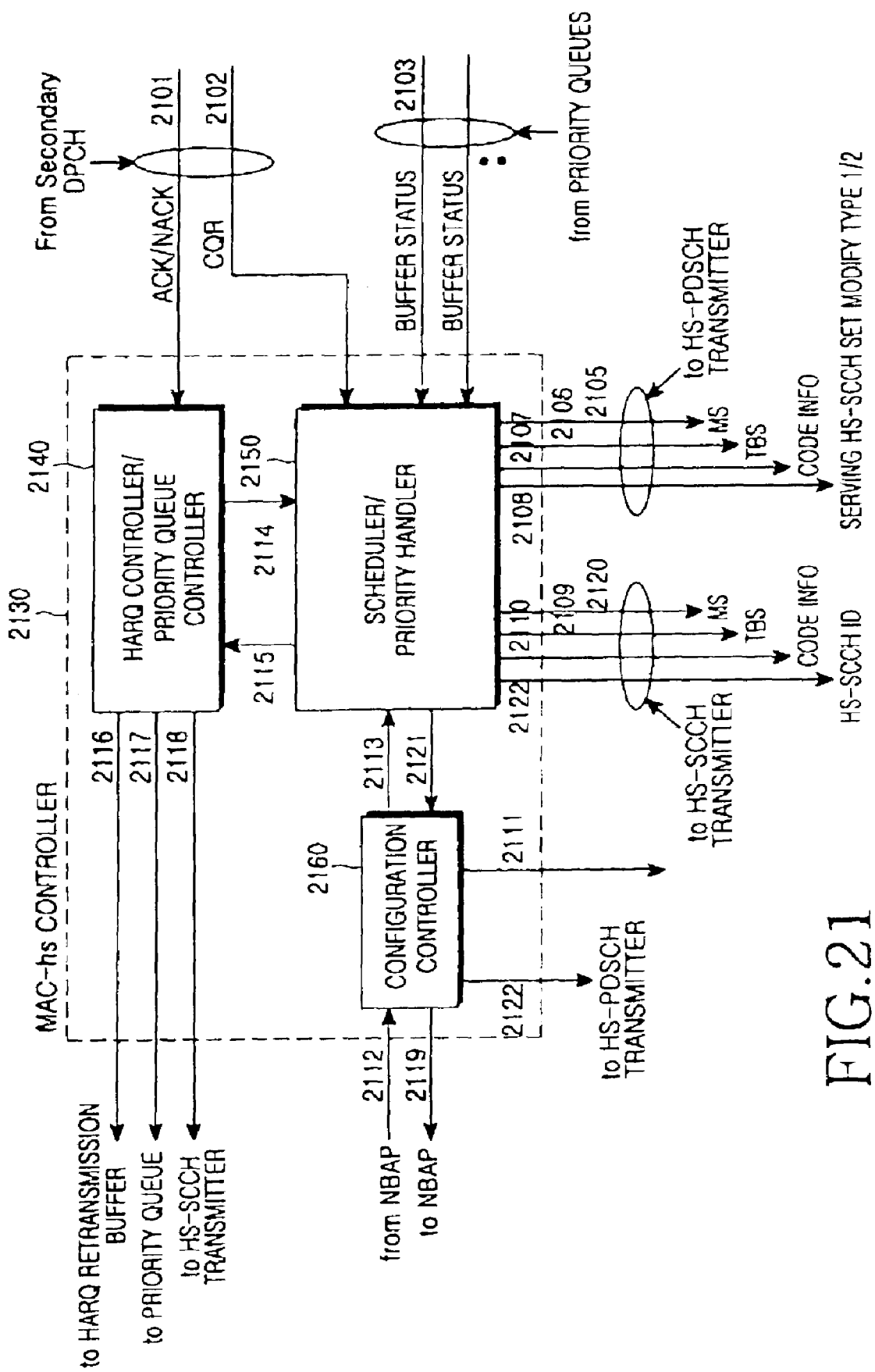
FIG. 21 illustrates a structure of a MAC-hs controller for a Node B according to a second embodiment of the present invention.

FIG. 21 illustrates a structure of a MAC-hs controller for a Node B according to a second embodiment of the present invention. Specifically, FIG. 21 illustrates a structure of a MAC-hs controller for a Node B MAC-hs layer. In an HSDPA communication system, a UE, a Node B and an SRNC have the MAC layer structure described in conjunction with FIG. 7 The MAC-hs controller 2130 is comprised of an HARQ controller/priority queue controller (HPC) 2140, a scheduler/priority handler (SPH) 2150, and a configuration controller (CC) 2160.

Upon receiving an ACK/NACK signal 2101 on a secondary DPCH transmitted by a UE, the HPC 2140 issues a command for refreshing a coded block stored in an HARQ retransmission buffer (not shown). That is, upon receiving an ACK signal for a particular channel x, the HPC 2140 issues a command for refreshing all coded blocks stored in an HARQ retransmission buffer for the channel x (see 2116). However, upon receiving a NACK signal for the channel x, the HPC 2140 provides the SPH 2150 with information indicating a fact that retransmission must be performed on the coded block transmitted over the channel x (see 2114). Further, in reply to an instruction (see 2115) from the SPH 2150, the HPC 2140 instructs the HARQ retransmission buffer or a priority queue to transmit corresponding user data (see 2116 and 2117), and transmits HARQ channel number information, RV information and NDI information, corresponding to the user data retransmitted, to an HS-SCCH transmitter (not shown; see 2118).

The SPH 2150 receives CQR 2102 transmitted over the secondary DPCH and buffer status (see 2103) from priority queues, and determines a priority queue that will transmit data over HS-PDSCH at the next TTI, based on information from the HPC 2140, indicating whether the corresponding user data is retransmitted or not. In addition, the SPH 2150 determines one of the MS to be used for transmission of the HS-PDSCH, the code_info to be used for transmission of the HS-PDSCH, an amount, i.e., TBS, of data to be transmitted over the HS-PDSCH, and the HS-SCCH set, as an HS-SCCH set for HS-SCCH for transmitting control information such as the MS to be used for transmission of the HS-PDSCH, the code_info to be used for transmission of the HS-PDSCH, the TBS indicating an amount of data to be transmitted over the HS-PDSCH. The SPH 2150 delivers the determined MS information, TBS information, code_info, a logical identifier of HS-SCCH, i.e., HS-SCCH ID, to the HS-SCCH transmitter (see 2108, 2109, 2110 and 2120). Further, the SPH 2150 delivers the determined MS information, TBS information, and code_info to an HS-PDSCH transmitter (not shown; see 2105, 2106 and 2107). In addition, the SPH 2150 delivers a priority queue for transmitting data or an identifier of an HARQ retransmission buffer, and TBS to the HPC 2140 (see 2115). Further, the SPH 2150, if it has transmitted a MAC-hs control message, delivers to the CC 2160 information indicating transmission of the MAC-hs control message.

Next, the CC 2160 forms a MAC-hs layer and a physical layer by receiving configuration information from an NBAP (not shown; see 2112). The "configuration information" refers to information necessary for setting of an HARQ processor, assignment of an HARQ retransmission buffer, configuration of a priority queue, and setting of the serving HS-SCCH set. The CC 2160 determines the HS-SCCH set-related information and an identifier (ID) of a serving HS-SCCH set, and delivers the determined serving HS-SCCH set ID to the NBAP (see 2119) and the HS-SCCH transmitter (see 2111). In addition, the CC 2160 delivers a UE identifier in the configuration information received from the NBAP to the HS-SCCH transmitter (see 2111).

Meanwhile, when the Node B has determined to modify a serving HS-SCCH set for a particular UE and to transmit a Serving HS-SCCH Set Modify Type ™1 message, the CC 2160 determines one of the HS-SCCH sets stored therein as a new serving HS-SCCH set for the UE, and delivers the determined new serving HS-SCCH set ID to the HS-PDSCH transmitter (see 2122). From that point on, the HS-PDSCH transmitter applies the new serving HS-SCCH set under the control of the CC 2160. Further, due to resetting of a serving HS-SCCH set for the UE, the CC 2160 delivers as the new HS-SCCH set ID to the SPH 2150 (i) information indicating a fact that a Serving HS-SCCH Set Modify Type ™1 message must be transmitted, and (ii) a SID_MAC_C value 601 and a C_I value 602 in the case of MAC-hs PDU illustrated in FIG. 19, or (iii) a C_F value 608 in the case of MAC-hs PDU illustrated in FIG. 27 (see 2113). The SPH 2150 then delivers the Serving HS-SCCH Set Modify Type ™1 message, the SID_MAC_C value 601 and the C_I value 602, or C_F value 608 to a corresponding HS-PDSCH transmitter at a point of time where there exists no urgent transmission data (see 2120). The HS-PDSCH transmitter then sets the SID_MAC_C field 601 and the C_I field 602 of the MAC-hs PDU as described in conjunction with FIG. 19, or sets the C_F field 608 as described in conjunction with FIG. 27, and transmits the MAC-hs control payload 607 to a corresponding UE along with a serving HS-SCCH set ID. Upon receiving an ACK signal for MAC-hs PDU with the transmitted Serving HS-SCCH Set Modify Type ™1 message from the corresponding UE, the HPC 2140 informs the SPH 2150 of successful transmission of the Serving HS-SCCH Set Modify Type ™1 message (see 2114). Upon receiving information indicating completed transmission of the Serving HS-SCCH Set Modify Type ™1 message from the SPH 2150 (see 2121), the CC 2160 instructs the HS-SCCH transmitter to apply a new serving HS-SCCH set (see 2111).

Meanwhile, when the Node B has determined to modify a serving HS-SCCH set for a particular UE and to transmit a Serving HS-SCCH Set Modify Type ™2 message, the CC 2160 determines OVSF codes for HS-SCCHs to be included in a new serving HS-SCCH set, determines ID of the new serving HS-SCCH set, and delivers the determined information to the HS-PDSCH transmitter (see 2122). The HS-PDSCH transmitter then stores the information delivered from the CC 2160, and thereafter, applies the stored new serving HS-SCCH set if the CC 2160 issues a command for applying the new serving HS-SCCH set. Further, the CC 2160 delivers to the SPH 2150 (i) information indicating a fact that a Serving HS-SCCH Set Modify Type ™2 message must be transmitted, (ii) a Serving HS-SCCH Set Modify type ™2 message, and (iii) a SID_MAC_C value 601 and a C_I value 602 in the case where the Serving HS-SCCH Set Modify Type ™2 message is transmitted in the form of MAC-hs PDU illustrated in FIG. 19, or (iv) a C_F value 608 in the case where the Serving HS-SCCH Set Modify Type ™2 message is transmitted in the form of MAC-hs PDU illustrated in FIG. 27 (see 2113). The SPH 2150 then delivers the Serving HS-SCCH Set Modify Type ™2 message, and the SID_MAC_C value 601 and the C_I value 602, or the C_F value 608 to a corresponding HS-PDSCH transmitter at a point of time where there exists no urgent transmission data (see 2120). The HS-PDSCH transmitter then sets the SID_MAC_C field 601 and the C_I field 602 of the MAC-hs PDU for transmitting the Serving HS-SCCH Set Modify Type ™2 message as described in conjunction with FIG. 19, or sets the C_F field 608 of the MAC-hs PDU as described in conjunction with FIG. 27, and transmits MAC-hs PDU with the Serving HS-SCCH Set Modify Type ™2 message to a corresponding UE. Upon receiving an ACK signal for the transmitted MAC-hs PDU from the corresponding UE, the HPC 2140 informs the SPH 2150 of successful transmission of the Serving HS-SCCH Set Modify Type ™2 message (see 2114). Further, upon receiving information indicating completed transmission of the Serving HS-SCCH Set Modify Type ™2 message from the SPH 2150 (see 2121), the CC 2160 instructs the HS-SCCH transmitter to apply a new serving HS-SCCH set (see 2111).

An operation process of the CC 2160 will now be described with reference to FIG. 30.

Figure 30:
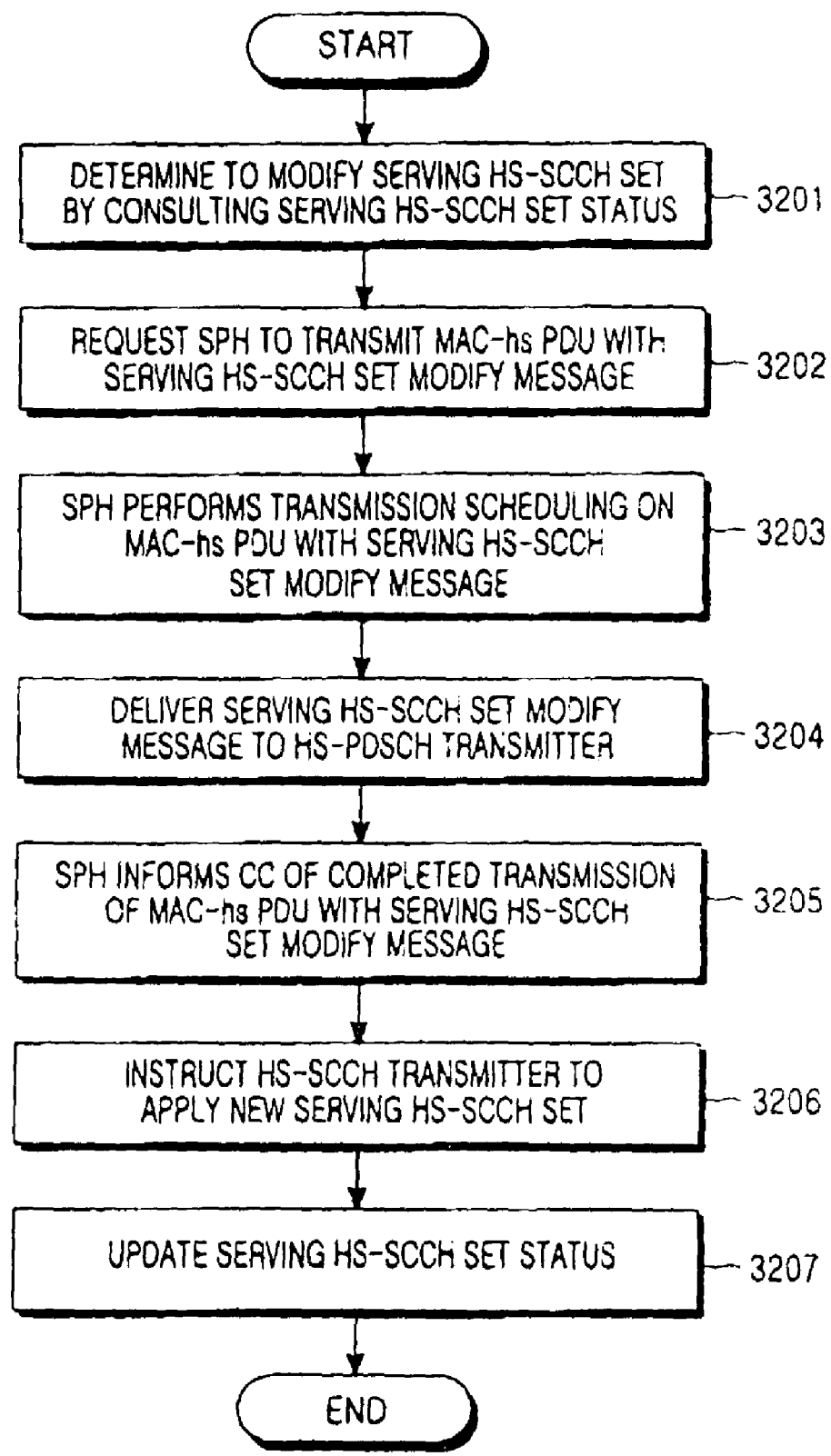
FIG. 30 is a signal flow diagram illustrating an operation process of a CC in FIG. 21.

FIG. 30 is a signal flow diagram illustrating an operation process of a CC 2160 in FIG. 21. A description of FIG. 30 will be made for a case where a Serving HS-SCCH Set Modify message is transmitted using the MAC-hs PDU format illustrated in FIG. 27. Referring to FIG. 30, the CC 2160 determines to modify a serving HS-SCCH set for a particular UE by consulting serving HS-SCCH set status managed therein, in order to efficiently assign resources according to conditions of UEs that use serving HS-SCCH sets of a Node B (Step 3201). After determining to modify a serving HS-SCCH set for a particular UE in this way, the CC 2160 informs the SPH 2150 that it must transmit a Serving HS-SCCH Set Modify message (Sep 3202). The CC 2160 must transmit to the SPH 2150 size information of the Serving HS-SCCH Set Modify message as well. The reason is because the Serving HS-SCCH Set Modify message is transmitted through MAC-hs PDU as described in conjunction with FIGS. 19 and 27.

Upon receiving size information of the Serving HS-SCCH Set Modify message from the CC 2160 along with information indicating that the Serving HS-SCCH Set Modify message must be transmitted, the SPH 2150 performs scheduling considering an amount or priority of the currently transmitted data so as to transmit MAC-hs PDU with the Serving HS-SCCH Set Modify message to a corresponding UE to which the Serving HS-SCCH Set Modify message is to be transmitted, at a proper time point where current transmission of data is not affected, and then delivers the scheduling result to the CC 2160 (Step 3203). The CC 2160 then delivers the Serving HS-SCCH Set Modify message to the HS-PDSCH transmitter at the scheduled time point (Step 3204). The HS-PDSCH transmitter then generates the Serving HS-SCCH Set Modify message in accordance with the MAC-hs PDU format illustrated in FIG. 27, and transmits the generated Serving HS-SCCH Set Modify message to the corresponding UE. If the HS-PDSCH transmitter transmits MAC-hs PDU with the Serving HS-SCCH Set Modify message to a corresponding UE in this way, the corresponding UE transmits an ACK/NACK signal indicating whether the MAC-hs PDU has been normally received, to a Node B through a secondary DPCH. The Node B then analyzes the ACK/NACK signal. As a result of the analysis, if an ACK signal is received, the Node B delivers information indicating receipt of the ACK signal to the HPC 2140. The HPC 2140 then delivers to the SPH 2150 information indicating receipt of an ACK signal for the MAC-hs PDU with the Serving HS-SCCH Set Modify message, and the SPH 2150 informs the CC 2160 of receipt of the ACK signal (Step 3205). The CC 2160 delivers a new serving HS-SCCH set ID to the HS-SCCH transmitter thereby instructing the HS-SCCH transmitter to apply a serving HS-SCCH set corresponding to the new serving HS-SCCH set ID (Step 3206). If time information for a time point where a modified serving HS-SCCH set will be applied is included in the received data including the Serving HS-SCCH Set Modify message, data will be received over a modified HS-SCCH beginning at that time. That is, it is previously agreed in Step 3206 that a Node B and a UE apply a serving HS-SCCH set from the next TTI. Unlike this, however, a Node B may define a message including time information for a time point where an HS-SCCH set to be modified will be applied, while transmitting a message including HS-SCCH set information to be modified to a UE. In this case, the HS-SCCH receiver may receive the message including the time information from a time point corresponding to the time information. Thereafter, the CC 2160 updates the managed serving HS-SCCH set status, completing the serving HS-SCCH set resetting process (Step 3207).

Next, a structure of the HS-SCCH transmitter according to a second embodiment of the present invention will be described with reference to FIG. 22.

Figure 22:
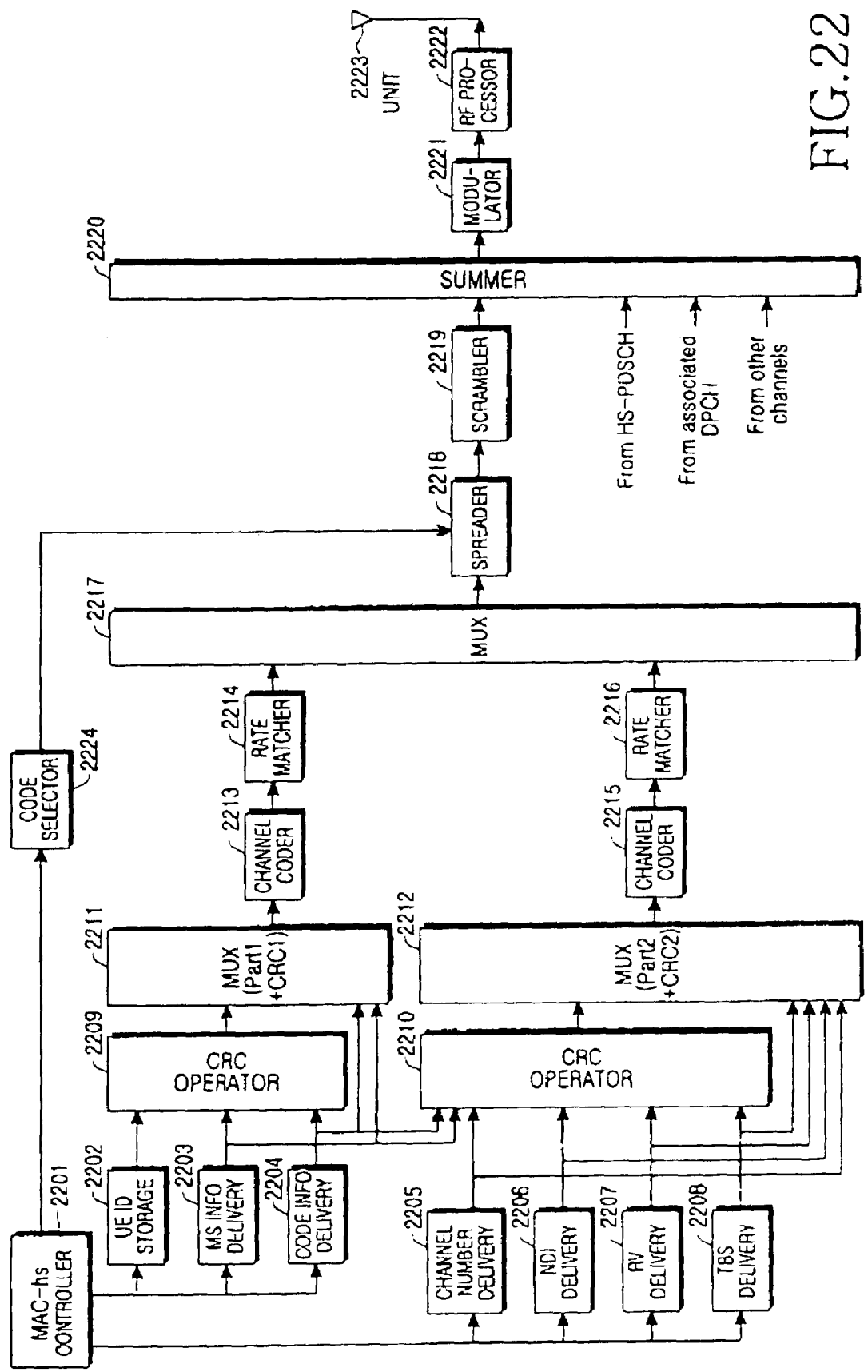
FIG. 22 illustrates a structure of an HS-SCCH transmitter according to a second embodiment of the present invention.

FIG. 22 illustrates a structure of an HS-SCCH transmitter according to a second embodiment of the present invention. Referring to FIG. 22, a MAC-hs controller 2201 (which is identical in structure to the MAC-hs controller 2130 of FIG. 21) provides a UE identifier (UE ID) to a UE ID storage 2202, MS information used for transmission of HS-SCCH to an MS information delivery part 2203, and code_info corresponding to HS-SCCH to a code information delivery part 2204. Further, the MAC-hs controller 2201 provides an HS-SCCH ID to be transmitted to the code selector 2224, HARQ channel number information to the channel number delivery part 2205, NDI information to the NDI delivery part 2206, RV information to the RV delivery part 2207, and TBS information to the TBS delivery part 2208.

The code selector 2224 converts the HS-SCCH identifier into an actual OVSF code, using a serving HS-SCCH set ID and HS-SCCH set-related information previously received from the MAC-hs controller 2201 and stored therein, and provides the OVSF code to a spreader 2218. A process of converting the HS-SCCH identifier to an actual OVSF code by the code selector 2224 is performed in the same way as described in conjunction with FIG. 14, so a detailed description thereof will not be provided.

The UE ID storage 2202 stores a UE ID output from the MAC-hs controller 2201, and delivers a UE ID corresponding to a particular UE to a CRC operator 2209 each time HS-SCCH corresponding to the particular UE is transmitted, for CRC™1 operation on the HS-SCCH. The MS information delivery part 2203 delivers MS information used for HS-SCCH transmission, provided from the MAC-hs controller 2201, to the CRC operator 2209, a CRC operator 2210 and a multiplexer (MUX) 2211. The code information delivery part 2204 delivers code_info provided from the MAC-hs controller 2201 to the CRC operator 2209, the multiplexer 2211, and the CRC operator 2210. The CRC operator 2209 performs a CRC operation on the MS information and the code_info provided from the UE ID storage 2202, the MS information delivery part 2203 and the code information delivery part 2204, and provides the CRC operation result to the multiplexer 2211. The CRC operation result achieved by the CRC operator 2209 is a CRC bit transmitted through the CRC™1 field 413 described in conjunction with FIG. 4. Meanwhile, the multiplexer 2211 multiplexes the CRC operation result, i.e., CRC#1, provided from the CRC operator 2209, the MS information provided from the MS information delivery part 2203, and the code_info provided from the code information delivery part 2204 in accordance with the part™1 field 1211 and the CRC™1 field 1213 of the HS-SCCH slot format, and provides the multiplexed information to a channel coder 2213.

The channel coder 2213 channel-codes a bit stream received from the multiplexer 2211 by a predetermined channel coding method, and provides its output to a rate matcher 2214. It is assumed herein that the channel coder 2213 uses a convolutional coding technique as a channel coding technique. The rate matcher 2214 performs rate matching on a signal output from the channel coder 2213, and provides its output to a multiplexer 2217.

The channel number delivery part 2205 delivers the HARQ channel number provided from the MAC-hs controller 2201 to the CRC operator 2210 and a multiplexer 2212. The NDI delivery part 2206 delivers the NDI information provided from the MAC-hs controller 2201 to the CRC operator 2210 and the multiplexer 2212. The RV delivery part 2207 delivers the RV information provided from the MAC-hs controller 2201 to the CRC operator 2210 and the multiplexer 2212. The TBS delivery part 2208 delivers the TBS information provided from the MAC-hs controller 2201 to the CRC operator 2210 and the multiplexer 2212. The CRC operator 2210 performs a CRC operation on the MS information provided from the MS information delivery part 2203, the code_info provided from the code information delivery part 2204, the HARQ channel number provided from the channel number delivery part 2205, the NDI information provided from the NDI delivery part 2206, the RV information provided from the RV delivery part 2207, and the TBS information provided from the TBS delivery part 2208, and provides the CRC operation result to the multiplexer 2212. The CRC operation result achieved by the CRC operator 2210 is a CRC bit transmitted through the CRC™2 field 417 described in conjunction with FIG. 4. Meanwhile, the multiplexer 2212 multiplexes the CRC operation result, i.e., CRC#2, provided from the CRC operator 2210, the HARQ channel number provided from the channel number delivery part 2205, the NDI information provided from the NDI delivery part 2206, the RV information provided from the RV delivery part 2207, and the TBS information provided from the TBS delivery part 2208 in accordance with the part™2 field 1215 and the CRC™2 field 1217 of the HS-SCCH slot format, and provides the multiplexed information to a channel coder 2215.

The channel coder 2215 channel-codes a bit stream received from the multiplexer 2212 by a predetermined channel coding method, and provides its output to a rate matcher 2216. It is assumed herein that the channel coder 2215 uses a convolutional coding technique as a channel coding technique. The rate matcher 2216 performs rate matching on a signal output from the channel coder 2215, and provides its output to the multiplexer 2217. The multiplexer 2217 multiplexes signals output from the rate matchers 2214 and 2216 in accordance with the HS-SCCH slot format illustrated in FIG. 4, and provides the multiplexed signal to the spreader 2218.

The spreader 2218 spreads an output signal of the multiplexer 2217 with an OVSF code provided from the code selector 2224, and provides the spread signal to a scrambler 2219. The scrambler 2219 scrambles an output signal of the spreader 2218 with a preset scrambling code, and provides the scrambled signal to a summer 2220. The summer 2220 sums up an output signal of the scrambler 2219 and other channel signals such as a HS-PDSCH signal and an associated DPCH signal, and provides its output to a modulator 2221. The modulator 2221 modulates an output signal of the summer 2220 by a preset modulation scheme, and provides its output to an RF processor 2222. The RF processor 2222 up-converts an output signal of the modulator 2221 into an RF band signal, and transmits the RF band signal over the air through an antenna 2223.

Next, a structure of the HS-PDSCH transmitter according to a second embodiment of the present invention will be described with reference to FIG. 23.

Figure 23:
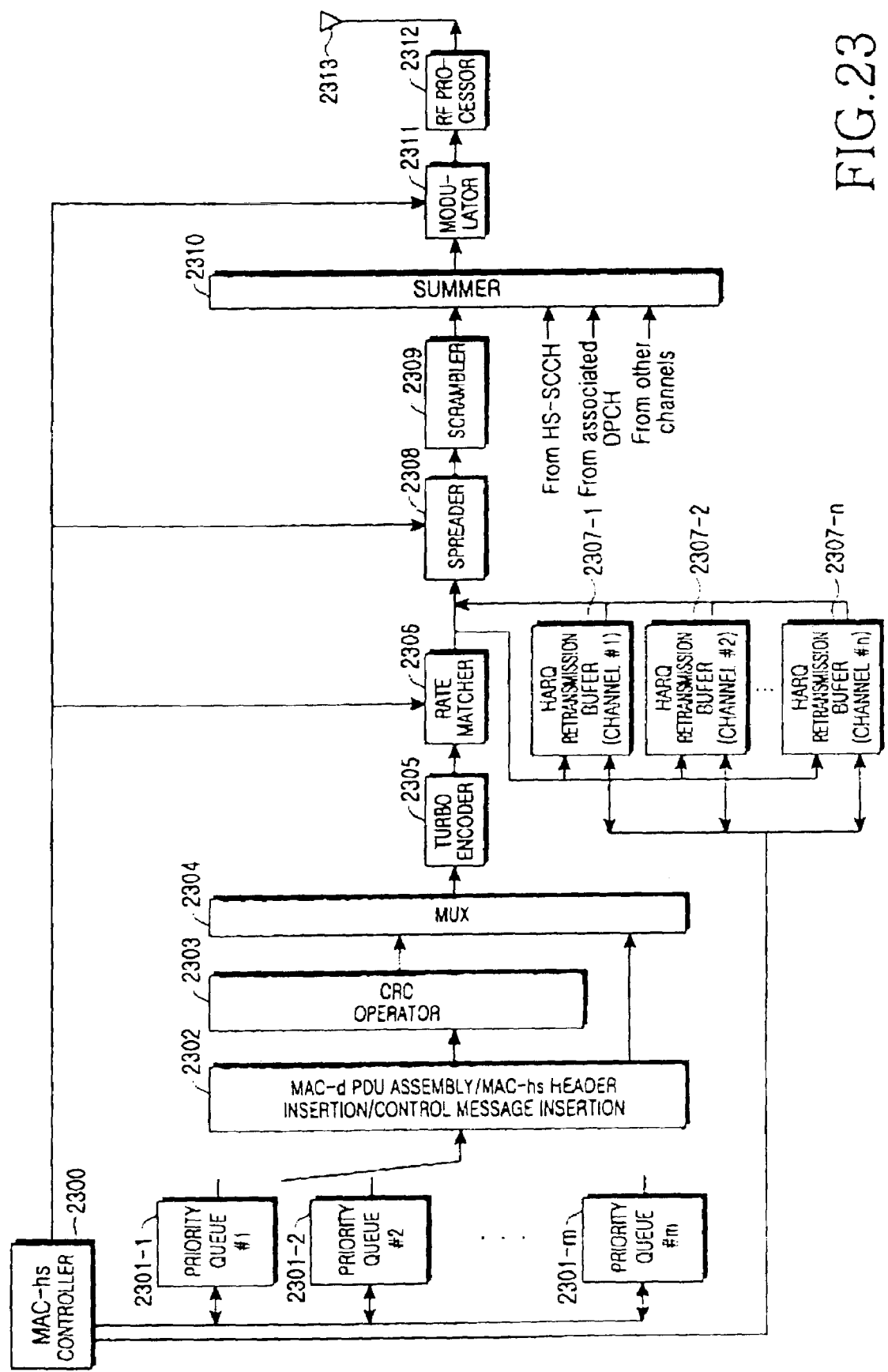
FIG. 23 illustrates a structure of an HS-PDSCH transmitter according to a second embodiment of the present invention.

FIG. 23 illustrates a structure of an HS-PDSCH transmitter according to a second embodiment of the present invention. Referring to FIG. 23, a MAC-hs controller 2300 (which is identical in structure to the MAC-hs controller 2130 of FIG. 21 and the MAC-hs controller 2201 of FIG. 22), as described in conjunction with FIG. 21, determines a priority queue or HARQ retransmission buffer for transmitting data at the next TTI based on CQRs of UEs, received over a secondary DPCH, an amount, i.e., TBS, of data stored in priority queues 2301-1 to 2301-m, and an amount of retransmission data, i.e., a size of HARQ retransmission buffers 2307-1 to 2307-n. After determining a priority queue or HARQ retransmission buffer for transmitting data at the next TTI, the MAC-hs controller 2300 informs the corresponding priority queue or HARQ retransmission buffer of an amount of data to be transmitted for the next TTI. In describing FIG. 23, it will be assumed that the MAC-hs controller 2300 has determined to transmit data stored in a particular priority queue for the next TTI.

The priority queues 2301-1 to 2301-m, informed by the MAC-hs controller 2300 of an amount of data to be transmitted for the next TTI, provide as many MAC-d PDUs as the amount of transmission data to a MAC-hs SDU assembly/MAC-hs header insertion/MAC-hs control message insertion part 2302. Control information provided from the priority queues 2301-1 to 2301-m to the MAC-hs SDU assembly/MAC-hs header insertion/MAC-hs control message insertion part 2302 along with the MAC-d PDUs includes:

(1) priority queue identifier: an identifier of a corresponding priority queue (2) TSN: a sequence number managed in a corresponding priority queue. This is increased by 1 at each transmission.

When concatenating MAC-d PDUs with different sizes into one MAC-hs SDU, a corresponding priority queue generating the MAC-d PDUs provides the following information per MAC-d PDU with the same size to the MAC-hs SDU assembly/MAC-hs header insertion/MAC-hs control message insertion part 2302.

(1) SID: a logical identifier corresponding to a size of MAC-d PDU. When an HSDPA call is set up between a UE and a Node B, a size of a transmittable MAC-d PDU is limited by the type of the set call, and an SID corresponding to the size and type is assigned.

(2) N: the number of MAC-d PDUs

The MAC-hs SDU assembly/MAC-hs header insertion/MAC-hs control message insertion part 2302, receiving the priority queue identifier, TSN, SID and N information from the MAC-hs controller 2300, inserts a MAC-hs header in MAC-hs SDU as described in conjunction with FIG. 6, and then provides its output to a CRC operator 2303 and a multiplexer 2304. Particularly, in the second embodiment of the present invention, the MAC-hs controller 2300 delivers a Serving HS-SCCH Set Modify Type message to the MAC-hs SDU assembly/MAC-hs header insertion/MAC-hs control message insertion part 2302. The MAC-hs SDU assembly/MAC-hs header insertion/MAC-hs control message insertion part 2302 sets an SID_MAC_C field and a C_I field of the Serving HS-SCCH Set Modify Type message as described in conjunction with FIG. 19. Of course, the Serving HS-SCCH Set Modify Type message can be set in accordance with the format described in conjunction with FIG. 27. The CRC operator 2303 performs a CRC operation on an output signal of the MAC-hs SDU assembly/MAC-hs header insertion/MAC-hs control message insertion part 2302, and provides the CRC operation result to the multiplexer 2304. The multiplexer 2304 generates a MAC-hs PDU by multiplexing the CRC operation result value output from the CRC operator 2303 and the MAC-hs header-inserted MAC-hs SDU output from the MAC-hs SDU assembly/MAC-hs header insertion/MAC-hs control message insertion part 2302, and provides the generated MAC-hs PDU to a turbo encoder 2305. The turbo encoder 2305 turbo-encodes the MAC-hs PDU output from the multiplexer 2304, and provides its output to a rate matcher 2306. The rate matcher 2306 performs rate matching on an output signal, i.e., a coded block, of the turbo encoder 2305 based on TBS information provided from the MAC-hs controller 2300, and provides the rate-matched signal to a spreader 2308 and an HARQ retransmission buffer corresponding to an HARQ channel number indicated by the MAC-hs controller 2300. For example, if an HARQ channel number indicated by the MAC-hs controller 2300 is 1, the rate matcher 2306 provides the rate-matched signal to an HARQ retransmission buffer 2307-1.

The spreader 2308 spreads an output signal of the rate matcher 2306 or the corresponding HARQ retransmission buffer depending on code_info provided from the MAC-hs controller 2300, and provides its output to a scrambler 2309. If the code_info output from the MAC-hs controller 2300 uses a plurality of OVSF codes, the spreader 2308 further has a function of segmenting an output signal of the rate matcher 2306 or the corresponding HARQ retransmission buffer in a size corresponding to a one-OVSF code length. The scrambler 2309 scrambles an outputs signal of the spreader 2308 with a preset scrambling code, and provides the scrambled signal to a summer 2310. The summer 2310 sums up an output signal of the scrambler 2309 and other channel signals such as an HS-SCCH signal and an associated DPCH signal, and provides its output to a modulator 2311. The modulator 2311 modulates an output signal of the summer 2310 by a preset modulation scheme, and provides the modulated signal to an RF processor 2312. The RF processor 2312 up-converts an output signal of the modulator 2311 into an RF band signal, and transmits the RF band signal over the air through an antenna 2313.

In FIG. 23, upon receiving an ACK signal for a corresponding HARQ channel, the HARQ retransmission buffers 2307-1 to 2307-n refresh coded blocks stored therein in response to an instruction from the MAC-hs controller 2300. However, upon receiving a NACK signal for a corresponding HARQ channel, the HARQ retransmission buffers 2307-1 to 2307-n retransmit coded blocks stored therein in response to an instruction from the MAC-hs controller 2300. The retransmitted coded blocks are transmitted over the air through the same process as performed at initial transmission by the priority queues 2301-1 to 2301-m.

Next, a structure of a UE MAC-hs controller according to a second embodiment of the present invention will be described with reference to FIG. 24.

Figure 24:
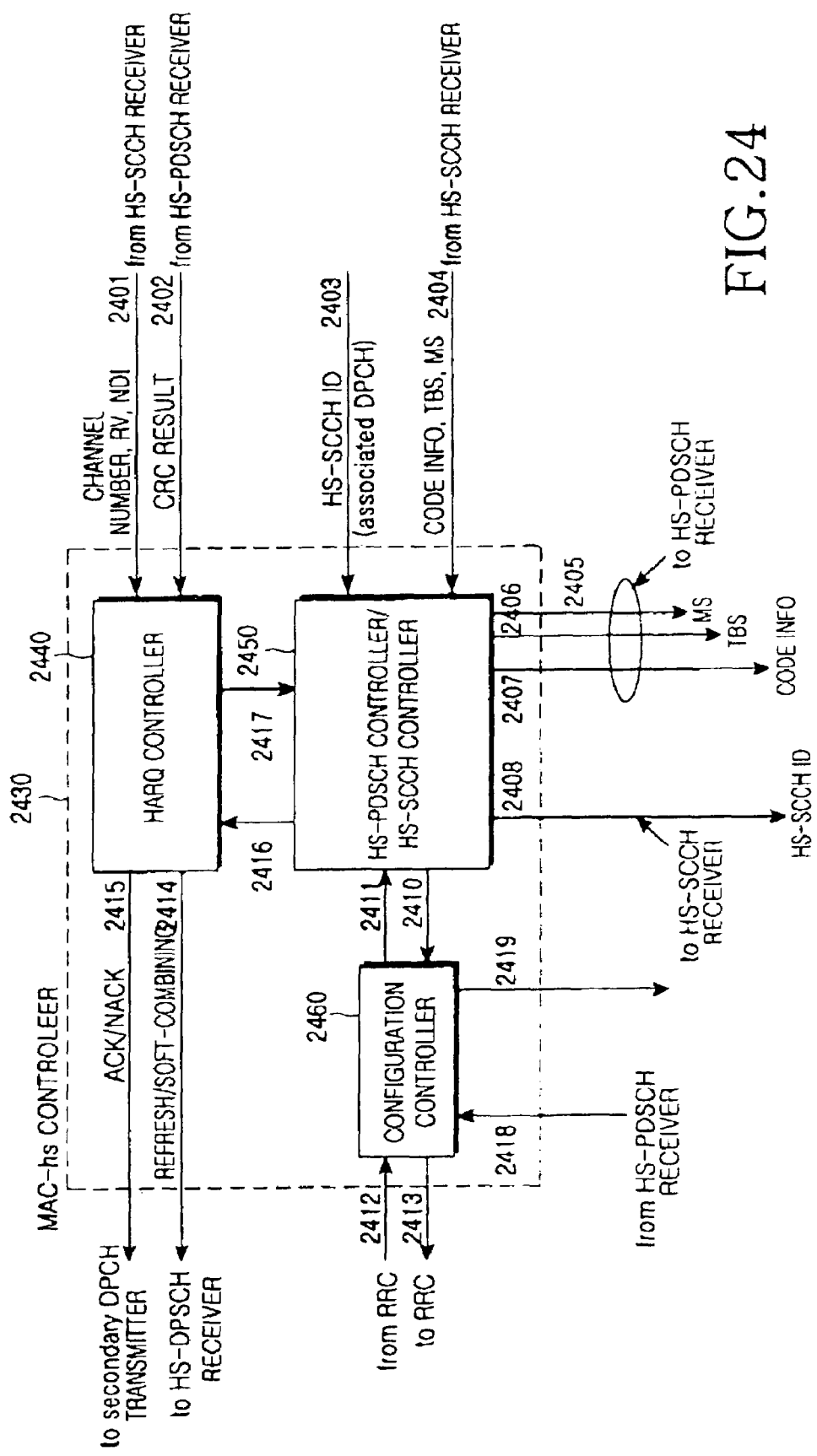
FIG. 24 illustrates a structure of a MAC-hs controller for a UE according to a second embodiment of the present invention.

FIG. 24 illustrates a structure of a MAC-hs controller for a UE according to a second embodiment of the present invention. Referring to FIG. 24, a UE MAC-hs controller 2430 is comprised of an HARQ controller (HC) 2440, an HS-PDSCH controller/HS-SCCH controller (DS/SC) 2450, and a configuration controller (CC) 2460. An operation of-the HS 2440 is performed in the same method as described in conjunction with FIG. 16, so a detailed description thereof will not be provided.

The DS/SC 2450 receives code_info, TBS information, and MS information from an HS-SCCH receiver (see 2404), and controls transmission of HS-PDSCH based on the code_info, TBS information, and MS information received from the HS-SCCH receiver. That is, the DS/SC 2450 delivers the code_info to a despreader (not shown) of the HS-PDSCH receiver (see 2407) so that the despreader performs despreading on a received HS-PDSCH signal; delivers the TBS information to a rate matcher (now shown)

of the HS-PDSCH receiver (see 2406) so that the rate matcher performs rate matching on a received HS-PDSCH signal; and delivers the MS information to a demodulator (now shown) of the HS-PDSCH receiver (see 2405) so that the demodulator performs demodulation on a received HS-PDSCH signal. In addition, the DS/SC 2450 receives CRC™1 and CRC™2 operation result values from the HS-SCCH receiver and determines whether a corresponding HS-PDSCH signal is received. If it is determined that any one of the CRC™1 or CRC™2 has an error, the HS-PDSCH receiver may not receive an HS-PDSCH signal although it has received HI. The DS/SC 2450 controls reception of HS-SCCH based on an HS-SCCH identifier (ID) delivered from the associated DPCH receiver. That is, the DS/SC 2450 delivers to the HS-SCCH receiver a value, i.e., OVSF code, determined by matching an HI value received from the associated DPCH receiver to the HS-SCCH identifier so that the HS-SCCH receiver designates an OVSF code for HS-SCCH to be despread (see 2408).

The CC 2460 forms a MAC-hs layer and a physical layer based on configuration information delivered by an RRC layer. Forming the MAC-hs layer and the physical layer includes establishing an HARQ processor (see 2412), assigning an HARQ retransmission buffer, and forming a priority queue, by way of example. Further, the CC 2460 controls establishment of a serving HS-SCCH set, and upon receiving HS-SCCH set-related information and an identifier of a serving HS-SCCH set from the RRC layer (see 2412), the CC 2460 delivers the received information to the HS-SCCH receiver (see 2419). The HS-SCCH receiver then stores the HS-SCCH set-related information and the identifier information of the serving HS-SCCH set, delivered from the CC 2460, and thereafter, despreads HS-SCCH using the HS-SCCH ID delivered from the DS/SC 2450 and an OVSF code corresponding to the stored ID of the serving HS-SCCH set.

If a Node B has determined to reset a serving HS-SCCH set for a particular UE and transmitted MAC-hs PDU with the Serving HS-SCCH Set Modify message to the UE, the HS-PDSCH receiver delivers a MAC-hs control message to the CC 2460 (see 2418), and the CC 2460 analyzes a Type field 604 of the received MAC-hs control message illustrated in conjunction with FIG. 19, thereby perceiving that the MAC-hs control message is a Serving HS-SCCH Set Modify Type ™1 message. The CC 2460 stores a serving HS-SCCH set ID on a MAC-hs control payload of the MAC-hs control message as a new serving HS-SCCH set, and delivers the new serving HS-SCCH set to the HS-SCCH receiver (see 2419). If the Node B has determined to modify a serving HS-SCCH set of a particular UE and transmitted a Serving HS-SCCH Set Modify Type ™2 message, the HS-PDSCH receiver delivers a MAC-hs control message to the CC 2460 (see 2418), and the CC 2460 can perceive that the MAC-hs control message is a Serving HS-SCCH Set Modify Type ™2 message, by analyzing the Type field 604. The CC 2460 stores a new serving HS-SCCH set ID and OVSF codes based on a MAC-hs control payload part of the MAC-hs control message, and delivers this information to the HS-SCCH receiver (see 2419), thereby newly setting a serving HS-SCCH set.

Next, an operation process of the CC 2460 will be described with reference to FIG. 31.

Figure 31:
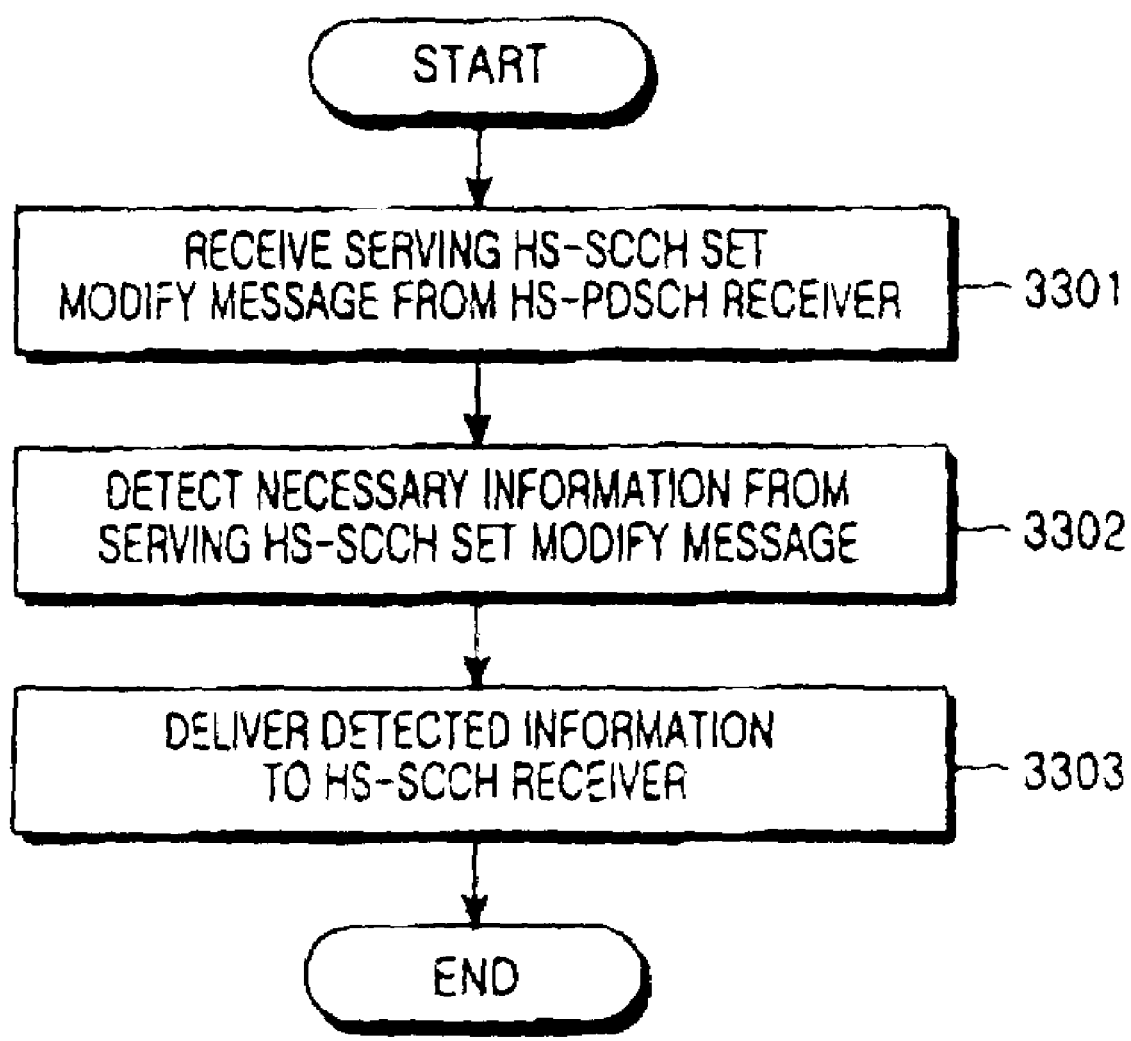
FIG. 31 is a signal flow diagram illustrating an operation process of a CC in FIG. 24.

FIG. 31 is a signal flow diagram illustrating an operation process of a CC 2460 in FIG. 24. Referring to FIG. 31, an HS-PDSCH receiver delivers a MAC-hs control message of a received MAC-hs PDU to the CC 2460 (Step 3301). The CC 2460 analyzes information included in a Type field of a MAC-hs control message delivered from the HS-PDSCH receiver, and determines a type of the MAC-hs control message and the corresponding information (Step 3302). If a type of the MAC-hs control message is Serving HS-SCCH Set Modify Type #1, a Serving HS-SCCH Set Modify message included in a MAC-hs control payload of the MAC-hs control message includes ID of a newly set serving HS-SCCH set. If a type of the MAC-hs control message is Serving HS-SCCH Set Modify Type #2, a Serving HS-SCCH Set Modify message included in a MAC-hs control payload of the MAC-hs control message includes ID of a newly set serving HS-SCCH set and information on actual OVSF codes included in the newly set serving HS-SCCH set. The CC 2460 delivers information included in the Serving HS-SCCH Set Modify message to an HS-SCCH receiver so that the HS-SCCH receiver receives a signal by applying the new serving HS-SCCH set (Step 3303).

Next, a structure of the HS-SCCH receiver according to a second embodiment of the present invention will be described with reference to FIG. 25.

Figure 25:
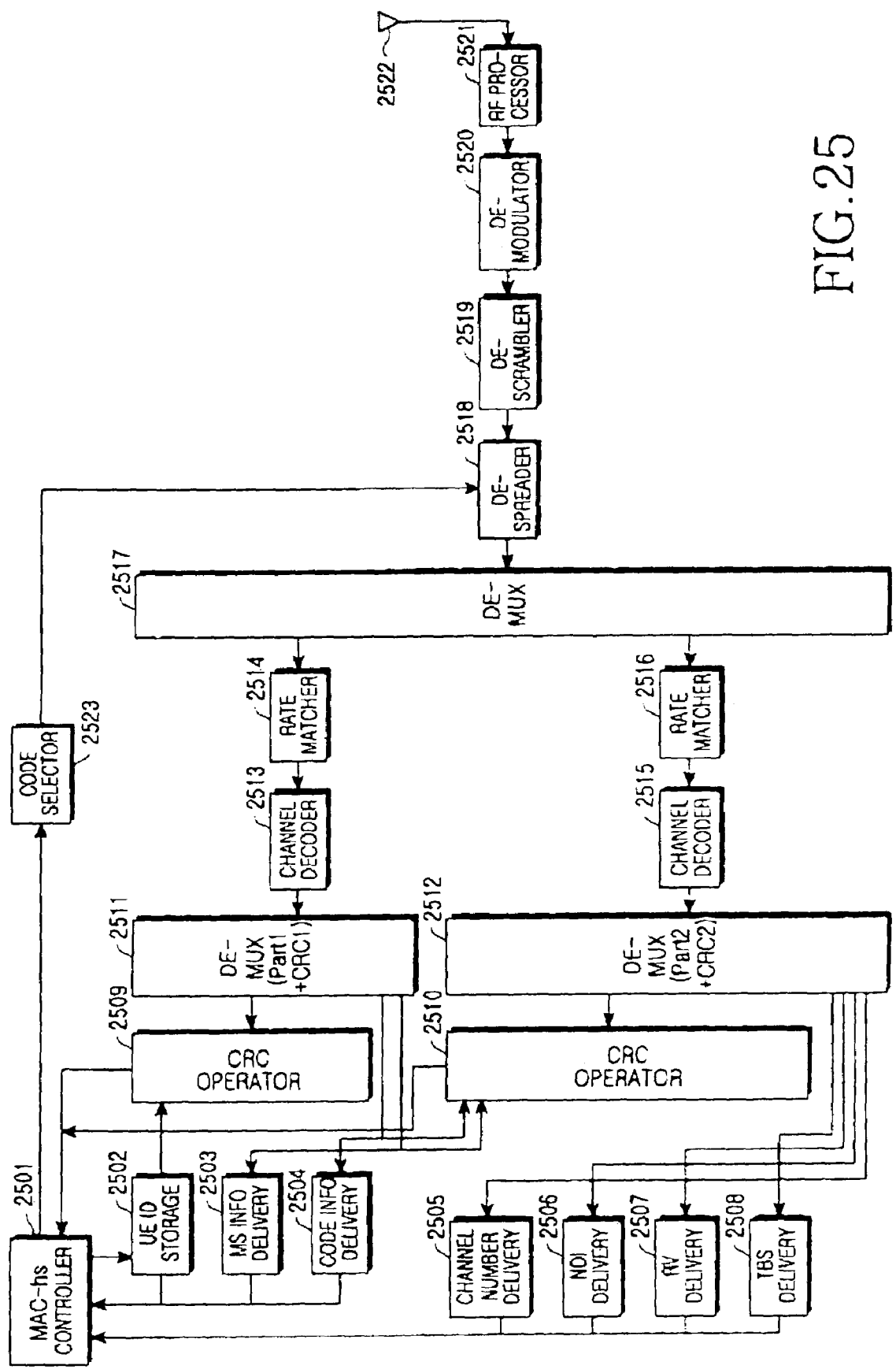
FIG. 25 illustrates a structure of an HS-SCCH receiver according to a second embodiment of the present invention.

FIG. 25 illustrates a structure of an HS-SCCH receiver according to a second embodiment of the present invention. Referring to FIG. 25, an RF band signal received over the air through an antenna 2522 is delivered to an RF processor 2521, and the RF processor 2521 down-converts the RF band signal delivered from the antenna 2522 into a baseband signal, and provides the baseband signal to a demodulator 2520. The demodulator 2520 demodulates an output signal of the RF processor 2521 by a demodulation scheme corresponding to the modulation scheme used in a transmitter, or a Node B, and provides its output to a descrambler 2519. The descrambler 2519 descrambles an output signal of the demodulator 2520 with the same scrambling code as the scrambling code used in the Node B, and provides its output to a despreader 2518. The despreader 2518 despreads an output signal of the descrambler 2519 with the same spreading code as the spreading code used in the Node B, and provides its output to a demultiplexer (DEMUX) 2517. The despreader 2518 performs despreading with an OVSF code corresponding to a spreading code indicated by a code selector 2523. The code selector 2523 previously stores HS-SCCH set-related information delivered by a MAC-hs controller 2501 (which is identical in structure to the MAC-hs controller 2430 of FIG. 24) in an HSDPA call setup process, and upon acquiring an HI value received over an associated DPCH, detects an OVSF code for HS-SCCH corresponding to the HI from a serving HS-SCCH set and delivers the detected OVSF code to the despreader 2518.

The demultiplexer 2517 demultiplexes an output signal of the despreader 2518 into a part™1 field, a CRC™1 field, a part™2 field and a CRC™2 field, and provides the part™1 field and CRC™1 field signals to a rate matcher 2514 and the part™2 field and CRC™2 field signals to a rate matcher 2516. The rate matcher 2514 rate-matches the part™1 field and CRC™1 field signals provided from the demultiplexer 2517, and provides its output to a channel decoder 2513. The channel decoder 2513 channel-decodes an output signal of the rate matcher 2514 by a channel decoding scheme corresponding to the channel coding scheme used in the Node B, and provides its output to a demultiplexer 2511. The demultiplexer 2511 demultiplexes an output signal of the channel decoder 2513 into the part™1 field and CRC™1 field, and provides the part™1 field and CRC™1 field to a CRC operator 2509, MS information on the part™1 field to an MS information delivery part 2503 and a CRC operator 2510, and code_info on the part™1 field to a code information delivery part 2504 and the CRC operator 2510. The MS information delivery part 2503 delivers the MS information provided from the demultiplexer 2511 to the MAC-hs controller 2501, and the code information delivery part 2504 delivers the code_info provided from the demultiplexer 2511 to the MAC-hs controller 2501. A UE ID storage 2502 stores a UE identifier (UE ID) delivered from the MAC-hs controller 2501, and provides the stored UE identifier to the CRC operator 2509 each time the CRC operator 2509 performs a CRC operation so that the UE identifier is used for the CRC™1 operation.

Meanwhile, the rate matcher 2516 rate-matches the part™2 field and CRC™2 field signals provided from the demultiplexer 2517, and provides its output to a channel decoder 2515. The channel decoder 2515 channel-decodes an output signal of the rate matcher 2516 by a channel decoding scheme corresponding to the channel coding scheme used in the Node B, and provides its output to a demultiplexer 2512. The demultiplexer 2512 demultiplexes an output signal of the channel decoder 2515 into the part™2 field and CRC™2 field signals, and provides the part™2 field and CRC™2 field signals to the CRC operator 2510, an HARQ channel number of the part™2 field signal to a channel number delivery part 2505, NDI information of the part™2 field signal to an NDI delivery part 2506, RV information of the part™2 field signal to an RV delivery part 2507, and TBS information of the part™2 field signal to a TBS delivery part 2508. The CRC operator 2510 performs a CRC™2 operation, using the part™2 field and CRC™2 field signals, the MS information provided from the MS information delivery part 2503, and the code_info provided from the code information delivery part 2504, and provides the CRC™2 operation result to the MAC-hs controller 2501. The channel number delivery part 2505 delivers the HARQ channel number provided from the demultiplexer 2512 to the MAC-hs controller 2501, and the RV delivery part 2507 delivers the RV information provided from the demultiplexer 2512 to the MAC-hs controller 2501. The NDI delivery part 2506 delivers the NDI information provided from the demultiplexer 2512 to the MAC-hs controller 2501, and the TBS delivery part 2508 delivers the TBS information provided from the demultiplexer 2512 to the MAC-hs controller 2501.

Next, a structure of the HS-PDSCH receiver according to a second embodiment of the present invention will be described with reference to FIG. 26.

Figure 26:
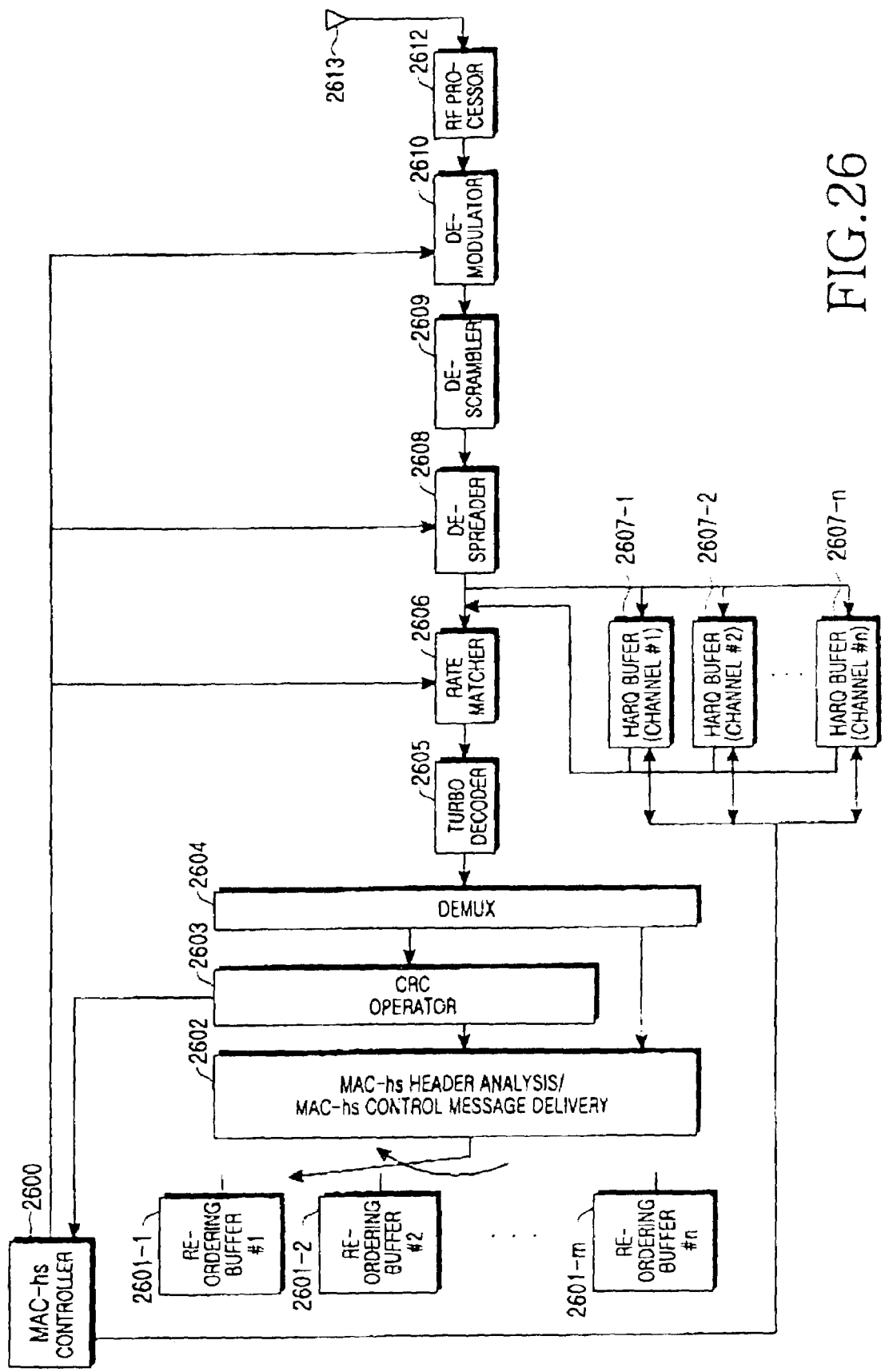
FIG. 26 illustrates a structure of an HS-PDSCH receiver according to a second embodiment of the present invention.

FIG. 26 illustrates a structure of an HS-PDSCH receiver according to a second embodiment of the present invention. Referring to FIG. 26, an RF band signal received over the air through an antenna 2613 is delivered to an RF processor 2612, and the RF processor 2612 down-converts the RF band signal delivered from the antenna 2613 into a baseband signal, and provides the baseband signal to a demodulator 2610. The demodulator 2610 demodulates an output signal of the RF processor 2612 by a demodulation scheme corresponding to the modulation scheme used in a transmitter, or a Node B, and provides its output to a descrambler 2609. The descrambler 2609 descrambles an output signal of the demodulator 2610 with the same scrambling code as the scrambling code used in the Node B, and provides its output to a despreader 2608. The despreader 2608 despreads an output signal of the descrambler 2609 with the same spreading code as the spreading code used in the Node B. The demodulation scheme applied to the demodulator 2610 and the spreading code for despreading performed by the despreader 2608 are determined by a MAC-hs controller 2600 (which is identical in structure to the MAC-hs controller 2430 of FIG. 24 and the MAC-hs controller 2501 of FIG. 25).

The despreader 2608 provides the despread signal to a corresponding HARQ buffer among HARQ buffers 2607-1 to 2607-n, and a rate matcher 2606. The rate matcher 2606 rate-matches an output signal of the despreader 2608 based on TBS information provided from the MAC-hs controller 2600, and provides its output to a turbo decoder 2605. If an output signal of the despreader 2608 is a retransmitted coded block, a corresponding HARQ buffer among the HARQ buffers 2607-1 to 2607-n soft-combines the retransmitted coded block with a previously stored coded block under the control of the MAC-hs controller 2600, and provides its output to the rate matcher 2606. The turbo decoder 2605 turbo-decodes an output signal of the rate matcher 2606, and provides its output to a demultiplexer 2604. The demultiplexer 2604 demultiplexes an output signal of the turbo decoder 2605, and provides its output to a CRC operator 2603 and a MAC-hs header analysis/MAC-hs control message delivery part 2602.

The CRC operator 2603 performs a CRC operation on an output signal of the demultiplexer 2604, and provides the CRC operation result to the MAC-hs header analysis/MAC-hs control message delivery part 2602 and the MAC-hs controller 2600. If the CRC operation result from the CRC operator 2603 indicates that an error has occurred in the currently received coded block, the MAC-hs controller 2600 transmits a NACK signal to a Node B over a secondary DPCH, and then refreshes the currently received coded block. However, as a result of the CRC operation, if no error has occurred in the currently received coded block, the MAC-hs controller 2600 transmits an ACK signal to the Node B over the secondary DPCH, and then instructs a corresponding HARQ buffer to refresh a coded block stored therein. Further, the MAC-hs controller 2600 provides the received coded block to a corresponding reordering buffer among reordering buffers 2601-1 to 2601-m according to information on a priority field in a MAC-hs header of the received signal. Particularly, in the second embodiment of the present invention, upon receiving a Serving HS-SCCH Set Modify message, the MAC-hs header analysis/MAC-hs control message delivery part 2602 delivers a corresponding MAC-hs control message to the MAC-hs controller 2600, and the MAC-hs controller 2600 stores serving HS-SCCH set-related information included in the Serving HS-SCCH Set Modify message. The new serving HS-SCCH set information is in principle applied beginning at a point of time when the ACK signal is transmitted. In addition, when receiving the serving HS-SCCH set information, a corresponding Node B can also apply a new serving HS-SCCH set beginning at a point of time when a corresponding ACK signal is received. However, if a delay time is previously defined between a Node B and a UE, the new serving HS-SCCH set is applied after a lapse of the defined delay time. The reordering buffers 2601-1 to 2601-m reorder the stored MAC-hs SDUs based on TSN in the MAC-hs header of the received MAC-hs PDU. The reordered MAC-hs SDUs are segmented into MAC-d PDUs according to SID and N values of each header, and then delivered to an upper layer.

Next, a third embodiment of the present invention for managing a reordering buffer using a MAC-hs control message will be described below.

Figure 32A:
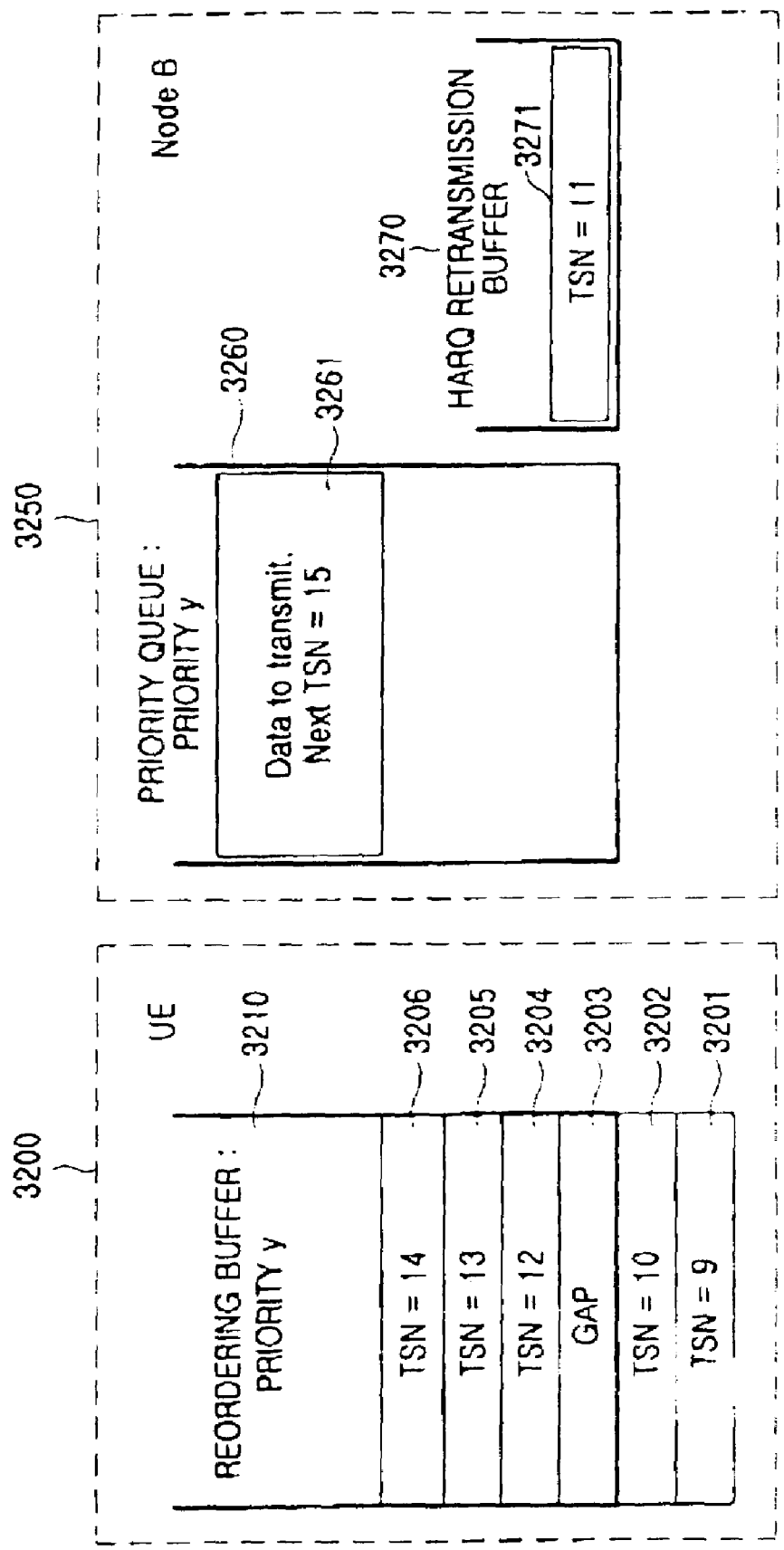
FIG. 32A schematically illustrates a Node B priority queue, a Node B HARQ retransmission buffer, and a UE reordering buffer according to a third embodiment of the present invention.

FIG. 32A schematically illustrates a Node B priority queue, a Node B HARQ retransmission buffer, and a UE reordering buffer according to a third embodiment of the present invention. Referring to FIG. 32A, it will be assumed that a Node B 3250 has started transmission of HADPA data to a particular UE 3200, and TSN starts from 9, for a priority queue with priority y. The TSN is managed according to priority queue. Since the Node B 3250 has successfully transmitted MAC-hs PDU 3201 with TSN=9 (hereinafter, MAC-hs PDU with TSN=n will be referred to as "TSN=n MAC-hs PDU") and TSN=10 MAC-hs PDU 3202, and the UE 3200 has normally sequentially received the TSN=9 MAC-hs PDU 3201 and the TSN=10 MAC-hs PDU 3202, the reordering buffer instantly delivers the received MAC-hs PDUs to an upper layer. Thereafter, it is assumed that since an en-or has occurred in TSN=11 MAC-hs PDU 3271 transmitted from the Node B 3250, the TSN=11 MAC-hs PDU 3271 is stored in an HARQ buffer (not shown) of the UE 3200 and also stored in an HARQ retransmission buffer 3270 of the Node B 3250. Thereafter, if TSN=12 MAC-hs PDU has been successfully received, a TSN Gap occurs in the reordering buffer 3210 because TSN=12 MAC-hs PDU is received although TSN=11 MAC-hs PDU must be received. The term "Gap" means that there exits a non-sequential TSN among TSNs of MAC-hs PDUs previously transmitted to an upper layer. Thereafter, even though TSN=13 MAC-hs PDU 3205 and TSN=14 MAC-hs PDU 3206 have been successfully transmitted, the TSN=12 MAC-hs PDU, TSN=13 MAC-hs PDU and TSN=14 MAC-hs PDU cannot be transmitted to the upper layer unless the Gap caused by abnormal transmission/reception of the TSN=11 MAC-hs PDU is not properly handled, i.e., unless the TSN=11 MAC-hs PDU is successfully retransmitted. That is, as illustrated in FIG. 32A, the MAC-hs PDU causing the Gap is identical in TSN to the MAC-hs PDU stored in the HARQ retransmission buffer 3270.

Of course, a situation different from the above-stated situation may occur. For example, although the UE 3200 has transmitted a NACK signal to the Node B 3250 due to an error that occurred in a process of initially receiving TSN=11 MAC-hs PDU, the Node B 3250 may mistake the NACK signal for an ACK signal. In this case, the TSN=11 MAC-hs PDU will be deleted (or refreshed) from the HARQ retransmission buffer 3270. The UE 3200 then waits for TSN=11 MAC-hs PDU to be retransmitted, but the Node B 3250 does not retransmit the TSN=11 MAC-hs PDU since it perceives that the UE 3200 has normally received the TSN=11 MAC-hs PDU. A probability that a NACK signal will be mistaken for an ACK signal or an ACK signal will be mistaken for a NACK signal as stated above can be determined according to reliability of an uplink secondary DPCH, and in the HSDPA standard specification, the probability is typically set to a maximum of 1 to 0.1%. When a NACK signal is mistaken for an ACK signal or an ACK signal is mistaken for a NACK signal as stated above, the HARQ retransmission buffer 3270 stores data unnecessarily. Therefore, in order to prevent the HARQ retransmission buffer 3270 from unnecessarily storing data, the Node B 3250 transmits current priority, queue status, or Buffer Status, to the UE 3200 along with the MAC-hs control message. A Buffer Status transmission point is determined by the Node B 3250, and the Node B 3250 transmits the Buffer Status in the following case. If the Node B 3250 has not transmitted Buffer Status while transmitting a predetermined amount of data for a particular priority queue, the Node B 3250 transmits the Buffer Status indicating that the MAC-hs PUD transmitted from the particular priority queue is waited to be retransmitted from the HARQ retransmission buffer. That is, when a Gap occurs in the reordering buffer 3210, the Node B 3250 transmits the Buffer Status along with a MAC-hs control message.

A MAC-hs control payload format of a MAC-hs control message, for transmitting the Buffer Status will now be described with reference to FIG. 32B.

Figure 32B:
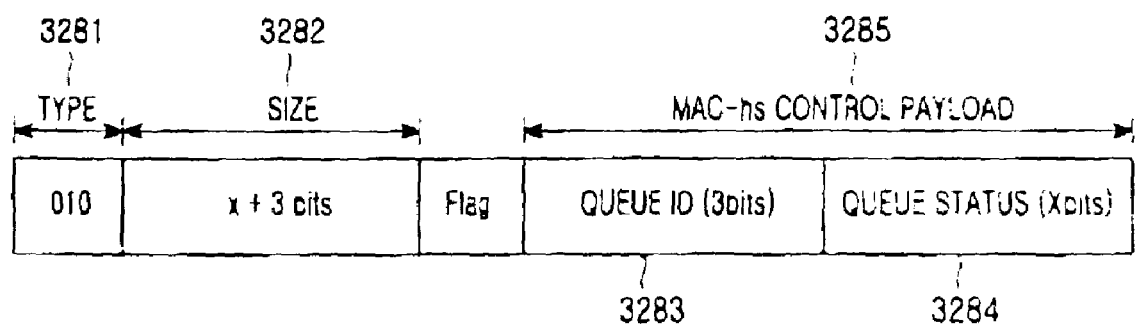
FIG. 32B illustrates a MAC-hs control payload format according to a third embodiment of the present invention.

FIG. 32B illustrates a MAC-hs control payload format according to a third embodiment of the present invention. Referring to FIG. 32B, a Type field 3281 is set to a particular value, e.g., "010," and a Size field 3282 includes size information of a MAC-hs control payload 3285. In FIG. 32B, since a Queue ID field 3282 has 3 bits and a Queue Status field 3284 has X bits, a size of the MAC-hs control payload 3285 becomes (X+3) bits. The MAC-hs control payload field 3285, as illustrated, is comprised of the Queue ID field 3282 and the Queue Status field 3284, and the Queue ID field 3283 represents ID of a priority queue represented by the Queue Status field 3284. The Queue Status field 3284 is transmitted at TSN (Next TSN) of MAC-hs PDU to be transmitted next and a corresponding priority queue, and includes TSNs of MAC-hs PDUs stored in the HARQ retransmission buffer (hereinafter, TSN of MAC-hs PDU transmitted from a priority queue and stored in an HARQ retransmission buffer will be referred to as "RTX TSN"). For example, in the Queue Status field 3284 of FIG. 32B, Next TSN is set to 15 and RTX TSN is set to 11. In the MAC-hs control payload, information transmitted through the Queue ID field 3283 and the Queue Status field 3284 becomes the Buffer Status information.

A UE then receives a MAC-hs control message with the Buffer Status and performs the following operation.

First, the UE compares the received Next TSN value with a maximum TSN value among TSNs of MAC-hs PDUs stored in the reordering buffer. As a result of the comparison, (1) if the received Next TSN value is smaller than the maximum TSN value among TSNs of MAC-hs PDUs stored in the reordering buffer, the UE delivers all MAC-hs PDUs stored in the reordering buffer to the upper layer and stores a value smaller by 1 than the Next TSN in a parameter "Highest_TSN," determining that an error has occurred in managing the reordering buffer (Highest_TSN=Next TSN−1). The parameter Highest_TSN is a parameter for storing TSN of the last received MAC-hs PUD among MAC-hs PDUs stored in a corresponding reordering buffer at corresponding time. However, (2) if the received Next TSN value is greater than or equal to the maximum TSN value among TSNs of MAC-hs PDUs stored in the reordering buffer, the UE stores the received Next TSN in a parameter "TSN_GAP," determining that a Gap has occurred in the reordering buffer (TSN_GAP=Next TSN). The parameter TSN_GAP is managed by the reordering buffer, and is a parameter for storing TSN corresponding to a Gap generated in the reordering buffer when generation of the Gap is detected.

Second, the UE compares the RTX TSN values with TSN_GAP values as follows:

(1) for the Gaps corresponding to TSNs existing in all of the RTX TSN values and the TSN_GAP values, the UE expects that the Gaps would be deleted through retransmission.

(2) for the TSNs that exist in the TSN_GAP but does not exist in the RTX_TSN, the UE performs a next operation, determining that a corresponding GAP is deleted. That is, the UE delivers the GAP-deleted MAC-hs PDUs to an upper layer.

(3) for the TSNs that exists in the RTX_TSN but does not exist in the TSN_GAP, the UE delivers all data stored in the reordering buffer to the upper layer, determining that an error has occurred in managing the reordering buffer. The TSN has an integer between 0 and 63, and a particular TSN is increased one by one up to 63 and then reset to 0.

Next, a structure of a Node B MAC-hs controller according to a third embodiment of the present invention will be described with reference to FIG. 33.

Figure 33:
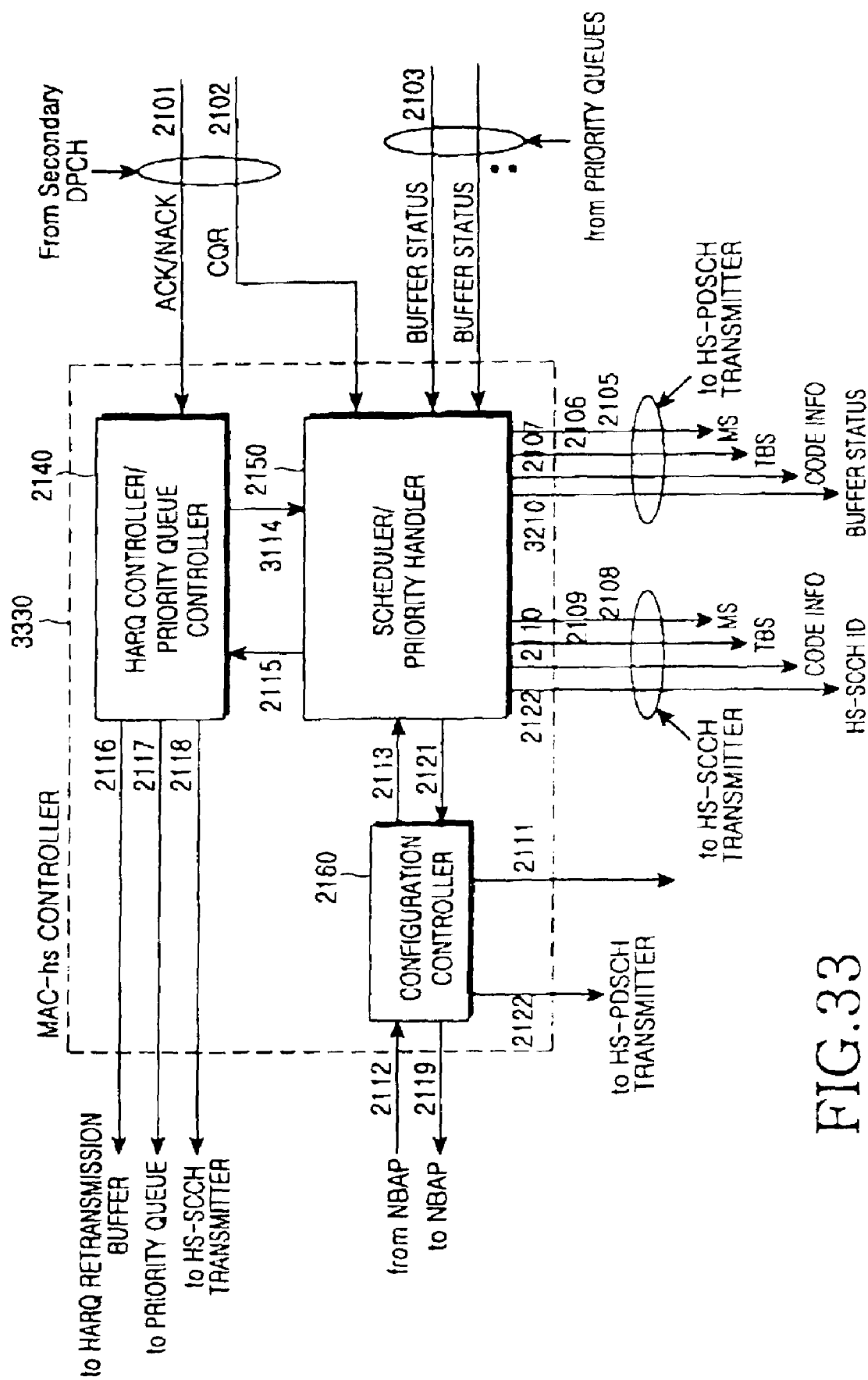
FIG. 33 illustrates a structure of a MAC-hs controller for a Node B according to a third embodiment of the present invention.

FIG. 33 illustrates a structure of a MAC-hs controller for a Node B according to a third embodiment of the present invention. In describing FIG. 33, it should be noted that a MAC-hs controller 3330 supporting a third embodiment of the present invention is identical in operation to the MAC-hs controller 2130 supporting the second embodiment of the present invention, except that information transmitted through a MAC-hs control payload is Buffer Status. Therefore, in describing the MAC-hs controller 3330, like reference numerals represent like operations of the MAC-hs controller 2130 throughout FIGS. 21 and 33, so the operations will not be described separately.

An HPC 2140 is provided with status information of priority queues from an SPH 2150 (see 2115). The status information of the priority queues includes Next TSN values of the priority queues. The HPC 2140 continuously updates the Next TSN values in a parameter Next_TSN of a parameter Buffer_Status, which is managed according to the priority queues. Further, the HPC 2140 controls an HARQ retransmission buffer according to an ACK/NACK signal transmitted by a UE (see 2101). That is, the HPC 2140 instructs an HARQ retransmission buffer, for which an ACK signal is received from the UE, to refresh MAC-hs PDU stored therein, and instructs an HARQ retransmission buffer, for which a NACK signal is received from the UE, to continuously store the stored MAC-hs PDU. Thereafter, the HPC 2140 stores TSN of corresponding MAC-hs PDU in a parameter RTX_TSN of a corresponding priority queue parameter Buffer_Status. Thereafter, when it becomes transmission time of Buffer Status information, the HPC 2140 generates a MAC-hs control message using information stored in the parameter Buffer_Status and delivers the generated MAC-hs control message to the SPH 2150 (see 3114).

The SPH 2150 delivers the MAC-hs control message with the Buffer Status information to an HS-PDSCH transmitter (see 3210), and the HS-PDSCH transmitter transmits the MAC-hs control message along with MAC-hs PDU in the same way as described in conjunction with the second embodiment of the present invention.

Next, a structure of a UE MAC-hs controller 3430 supporting the third embodiment of the present invention will be described with reference to FIG. 34.

Figure 34:
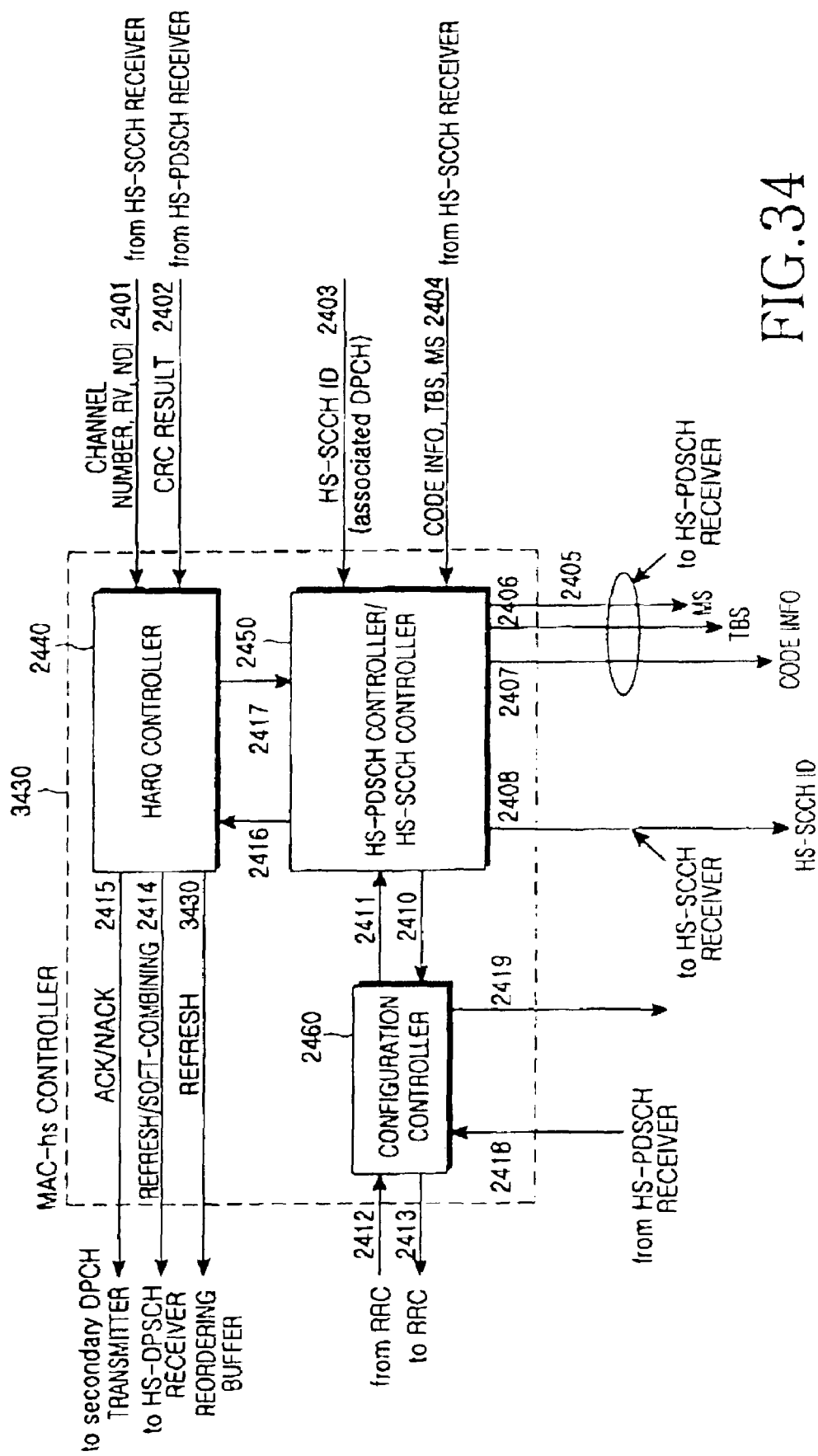
FIG. 34 illustrates a structure of a UE MAC-hs controller according to a third embodiment of the present invention.

FIG. 34 illustrates a structure of a UE MAC-hs controller according to a third embodiment of the present invention. In describing FIG. 34, it should be noted that a MAC-hs controller 3430 supporting a third embodiment of the present invention is identical in operation to the MAC-hs controller 2430 of FIG. 24 for supporting the second embodiment of the present invention, except that information transmitted through a MAC-hs control payload is Buffer Status. Therefore, in describing the MAC-hs controller 3430, like reference numerals represent like operations of the MAC-hs controller 2430 throughout FIGS. 24 and 34, so the operations will not be described separately.

If a received MAC-hs PDU includes Buffer Status information, an HS-PDSCH receiver delivers the Buffer Status information to an HARQ controller 2440 (see 3401). The HARQ transmitter 2440 manages a parameter TSN_GAP and a parameter Highest_TSN according to reordering buffers. The TSN_GAP is a parameter in which TSN values constituting a corresponding Gap is stored each time the Gap is generated in a corresponding reordering buffer, and the Highest_TSN is a parameter in which TSN of the last received MAC-hs PDU among MAC-hs PDUs stored in a corresponding reordering buffer at corresponding time. The HARQ controller 2440, when provided with the Buffer Status information, performs a predetermined operation by using TSN values stored in the parameter TSN_GAP corresponding to a Queue ID of the Buffer Status information and TSN values stored in the parameter Highest_TSN. An operation performed after receipt of the Buffer Status information is performed in the same manner as described above, so a detailed description will not be provided. If an initial Gap generated in the reordering buffer is deleted as the Buffer Status information-based operation is performed, the HARQ controller 2440 delivers a refresh command to a corresponding reordering buffer in order to deliver MAC-hs PDUs before up to a second Gap to an upper layer (see 3430).

Next, an operation process of the CC 2160 of FIG. 33 will be described with reference to FIG. 35.

Figure 35:
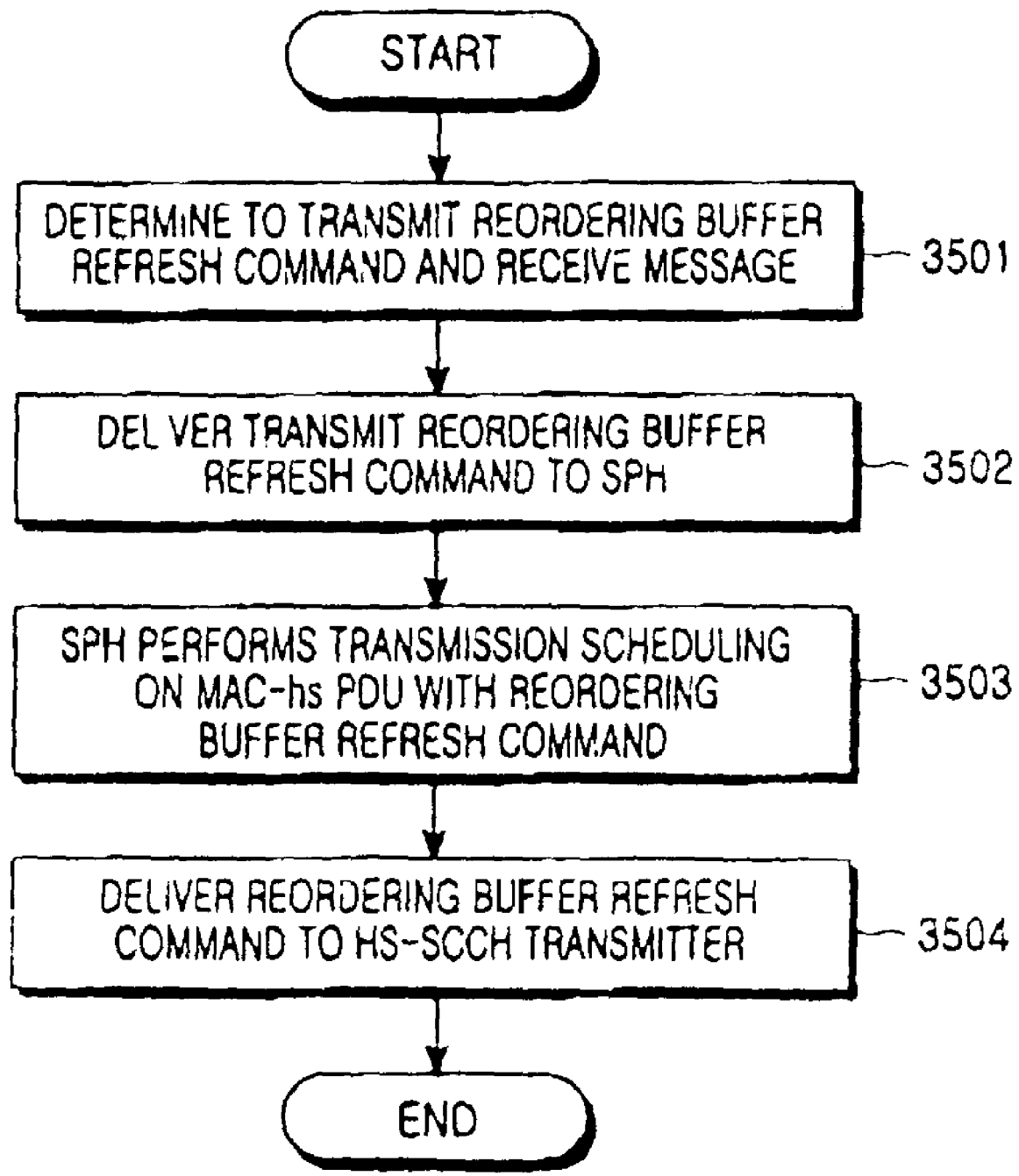
FIG. 35 is a signal flow diagram illustrating an operation process of a CC illustrated in FIG. 33.

FIG. 35 is a signal flow diagram illustrating an operation process of a CC illustrated in FIG. 33. Referring to FIG. 35, the CC 2160 determines to transmit a refresh command for reordering buffers (Step 3501). Thereafter, the CC 2160 delivers a reordering buffer refresh command to the SPH 2150 (Step 3502). The SPH 2150 then performs transmission scheduling on MAC-hs PDU with the reordering buffer refresh command (Step 3503). Thereafter, the CC 2160 delivers MAC-hs PDU with the reordering buffer refresh command to the HS-PDSCH and then ends the process (Step 3504).

Next, an operation process of the CC 2460 will be described with reference to FIG. 36.

Figure 36:
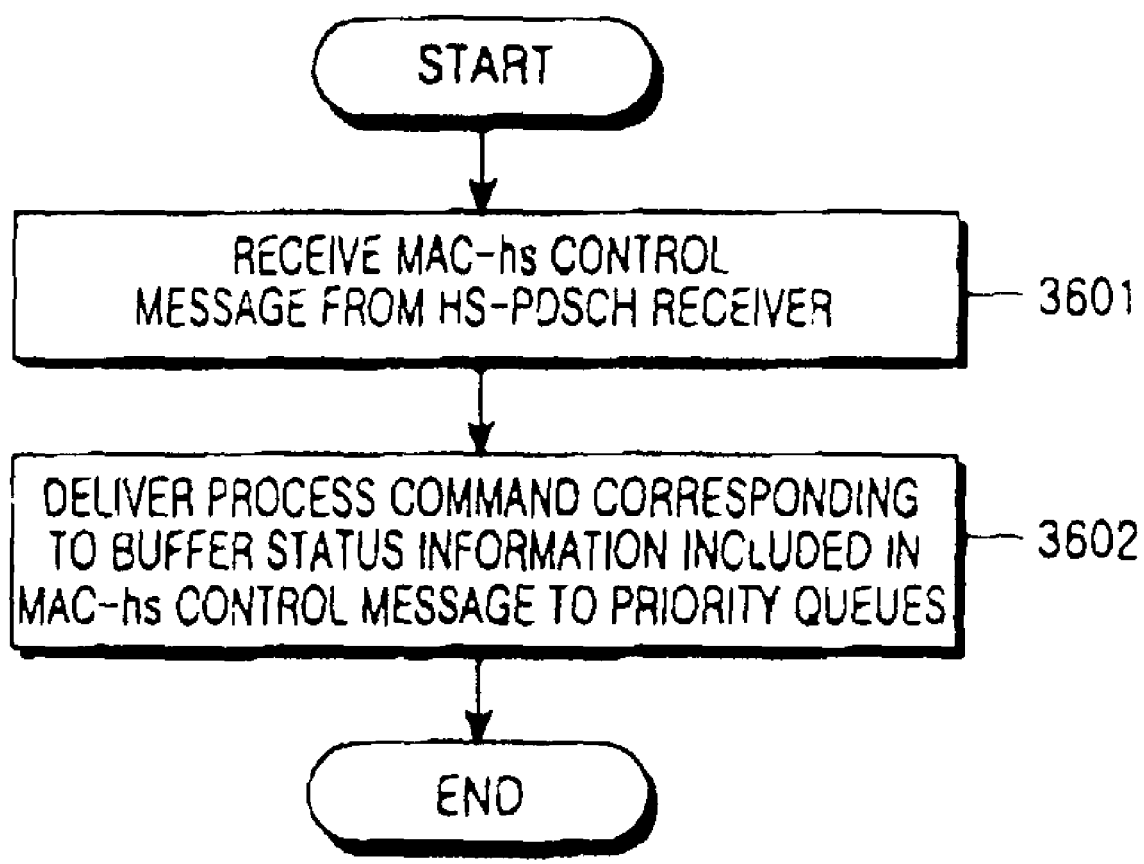
FIG. 36 is a signal flow diagram illustrating an operation process of a CC illustrated in FIG. 34.

FIG. 36 is a signal flow diagram illustrating an operation process of a CC illustrated in FIG. 34. Referring to FIG. 36, the HS-PDSCH receiver delivers a MAC-hs control message of a received MAC-hs PDU to the CC 2460 (Step 3601). The CC 2460 analyzes Buffer Status information included in the MAC-hs control message delivered from the HS-PDSCH receiver, and delivers a process command corresponding to the Buffer Status information to corresponding priority queues and then ends the process (Step 3602).

As described above, the present invention enables direct transmission of HS-SCCH related information, such as a serving HS-SCCH set assigned to a particular UE, between a Node B and a UE in an HSDPA communication system. In addition, through the direct transmission of HS-SCCH related information between a Node B and a UE, it is possible to reduce signal delay between a Node B and a UE and reduce Iub transmission resources, thereby contributing to an improvement of system performance. Furthermore, by directly transmitting status information of queues for transmitting or retransmitting user data, it is possible to prevent unnecessary retransmission and transmission delay caused by the unnecessary retransmission.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting control channel set information in a communication system having a shared channel occupied by a plurality of user equipments (UEs) and spread with a plurality of channelization codes to transmit user data, and having a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the method comprising the steps of:
 determining modification of a control channel set information assigned into the UE to a new control channel set at a predetermined point of time; and
 transmitting to the UE over a downlink an indicator indicating expected modification of the control channel set and information on the control channel set to be modified.

2. The method of claim 1, wherein the predetermined point of time represents a next transmission time interval (TTI) following a current TTI.

3. An apparatus for transmitting control channel set information in a communication system having a shared channel occupied by a plurality of user equipments (UEs) and spread with a plurality of channelization codes to transmit user data, and having a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the apparatus comprising:
 a controller for determining to modify a control channel set assigned into the UE to a new control channel set at a predetermined point of time upon detecting necessity to modify a control channel set to be assigned to a particular UE among the UEs; and
 a transmitter for transmitting to the UE over a downlink under the control of the controller an indicator indicating expected modification of the control channel set and information on the control channel set to be modified.

4. The apparatus of claim 3, wherein the predetermined point of time represents a next transmission time interval (TTI) following a current TTI.

5. A method for receiving control channel set information in a communication system having a shared channel occupied by a plurality of user equipments (UEs) and spread with a plurality of channelization codes to transmit user data, and having a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the method comprising the steps of:
 receiving over a downlink an indicator indicating that currently assigned control channel set information is to be modified into a new control channel set information, and receiving over a downlink a control channel set information including the new control channel set information; and
 monitoring a control channel set by applying the new control channel set information at a predetermined point of time following a point of time where the control channel set information is detected.

6. An apparatus for receiving control channel set information in a communication system having a shared channel occupied by a plurality of user equipments (UEs) and spread with a plurality of channelization codes to transmit user data, and a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the apparatus comprising:
 a receiver for receiving over a downlink an indicator indicating that currently assigned control channel set information is to be modified into new control channel set information, and receiving over a downlink a control channel set information including the new control channel set information; and
 a controller for monitoring a control channel set by applying the new control channel set information at a predetermined point of time following a point of time where the control channel set information is detected.

7. A method for transmitting control channel set information in a communication system having a shared channel occupied by a plurality of user equipments (UEs) and spread with a plurality of channelization codes to transmit user data, and a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the method comprising the steps of:
 determining modification of a control channel set assigned to the UE into a new control channel set at a predetermined point of time; and
 transmitting to the UE over a particular control channel in a currently assigned control channel set an indicator indicating expected modification of the control channel set and information on the control channel set to be modified.

8. The method of claim 7, wherein the control channel comprises a first field including the channelization code information and a second field including transport block size (TBS) and retransmission-related control information, wherein the indicator is transmitted through the first field and the modified control channel set information is transmitted through the second field.

9. The method of claim 8, wherein the indicator is represented by a currently unused logical identifier among a plurality of logical identifiers assigned to represent the channelization code information.

10. An apparatus for transmitting control channel set information in a communication system having a shared channel occupied by a plurality of user equipments (UEs) and spread with a plurality of channelization codes to transmit user data, and having a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the apparatus comprising:

a controller for determining to modify a control channel set assigned to the UE into a new control channel set at a predetermined point of time upon detecting necessity to modify a control channel set to be assigned to a particular UE among the UEs; and a control channel transmitter for transmitting to the UE over a particular control channel in a currently assigned control channel set, after determining to modify the control channel set, an indicator indicating expected modification of the control channel set and information on the control channel set to be modified.

11. The apparatus of claim 10, wherein the control channel comprises a first field including the channelization code information and a second field including transport block size (TBS) and retransmission-related control information, wherein the indicator is transmitted through the first field and the modified control channel set information is transmitted through the second field.

12. The apparatus of claim 11, wherein the indicator is represented by a currently unused logical identifier among a plurality of logical identifiers assigned to represent the channelization code information.

13. A method for receiving control channel set information in a communication system having a shared channel occupied by a plurality of user equipments (UEs) and spread with a plurality of channelization codes to transmit user data, and having a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the method comprising the steps of:

receiving over a particular control channel in a currently assigned control channel set an indicator indicating that currently assigned control channel set information is to be modified into new control channel set information, and receiving over a particular control channel in a currently assigned control channel set control channel set information including the new control channel set information; and monitoring a control channel set by applying the new control channel set information at a predetermined point of time following a point of time where the control channel set information is detected.

14. The method of claim 13, wherein the control channel comprises a first field including the channelization code information and a second field including transport block size (TBS) and retransmission-related control information, wherein the indicator is transmitted through the first field and the modified control channel set information is transmitted through the second field.

15. The method of claim 14, wherein the indicator is represented by a currently unused logical identifier among a plurality of logical identifiers assigned to represent the channelization code information.

16. An apparatus for receiving control channel set information in a communication system having a shared channel occupied by a plurality of user equipments (UEs) and spread with a plurality of channelization codes to transmit user data, and having a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the apparatus comprising:

a receiver for receiving over a particular control channel in a currently assigned control channel set an indicator indicating that currently assigned control channel set information is to be modified into new control channel set information, and receiving over a particular control channel in a currently assigned control channel set a control channel set information including the new control channel set information; and a controller for monitoring a control channel set by applying the new control channel set information at a predetermined point of time following a point of time where the control channel set information is detected.

17. The method of claim 16, wherein the control channel comprises a first field including the channelization code information and a second field including transport block size (TBS) and retransmission-related control information, wherein the indicator is transmitted through the first field and the modified control channel set information is transmitted through the second field.

18. The method of claim 17, wherein the indicator is represented by a currently unused logical identifier among a plurality of logical identifiers assigned to represent the channelization code information.

19. A method for transmitting control channel set information in a communication system having a medium access control-high speed (MAC-hs) layer entity for high-speed transmission or retransmission of user data to a user equipment (UE), having a shared channel occupied by a plurality of user equipments (UEs) and spread with a plurality of channelization codes to transmit user data, and having a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the method comprising the steps of:

determining modification of a control channel set assigned to the UE into a new control channel set at a predetermined point of time; and transmitting to a MAC-hs layer entity of the UE an indicator indicating expected modification of the control channel set and a MAC-hs control message including information on the control channel set to be modified.

20. The method of claim 19, wherein the MAC-hs control message includes a header having the indicator and a control payload having the control channel set information.

21. The method of claim 19, further comprising the steps of:

upon detecting necessity to modify information on the generated control channel sets, determining to modify each of the control channel sets assigned to the UEs into a new control channel set at a predetermined point of time; and after determining to modify the control channel set, transmitting to a MAC-hs layer entity of the UE an indicator indicating expected modification of the control channel set, information on the new control channel set, and a MAC-hs control message including information on the control channel sets to be modified.

22. The method of claim 21, wherein the MAC-hs control message includes a header having the indicator and a control payload having the information on the new control channel set and information on the control channel sets to be modified.

23. An apparatus for transmitting control channel set information in a communication system having a medium access control-high speed (MAC-hs) layer entity for high-speed transmission or retransmission of user data to a user equipment (UE), having a shared channel occupied by a plurality of user equipments (UEs) and spread with a plurality of channelization codes to transmit user data, and having a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the apparatus comprising:
   a controller for determining to modify a control channel set assigned to the UE into a new control channel set at a predetermined point of time upon detecting necessity to modify a control channel set to be assigned to a particular UE among the UEs; and
   a transmitter for transmitting to a MAC-hs layer entity of the UE, under the control of the controller an indicator indicating expected modification of the control channel set and a MAC-hs control message including information on the control channel set to be modified.

24. The apparatus of claim 23, wherein the MAC-hs control message includes a header having the indicator and a control payload having the control channel set information.

25. The apparatus of claim 23, wherein the controller determines, upon detecting necessity to modify information on the generated control channel sets, to modify each of the control channel sets assigned to the UEs into a new control channel set at a predetermined point of time to come; and after determining to modify the control channel set, transmits to a MAC-hs layer entity of the UE an indicator indicating expected modification of the control channel set, information on the new control channel set, and a MAC-hs control message including information on the control channel sets to be modified.

26. The apparatus of claim 25, wherein the MAC-hs control message includes a header having the indicator and a control payload having the information on the new control channel set and information on the control channel sets to be modified.

27. A method for receiving control channel set information in a communication system having a medium access control-high speed (MAC-hs) layer entity for high-speed transmission or retransmission of user data to a user equipment (UE), having a shared channel occupied by a plurality of user equipments (UEs) and spread with a plurality of channelization codes to transmit user data, and having a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the method comprising the steps of:
   receiving over a particular control channel in a currently assigned control channel set an indicator indicating that currently assigned control channel set information is to be modified into new control channel set information, and receiving over a particular control channel in a currently assigned control channel set a MAC-hs control message including the new control channel set information; and
   monitoring a control channel set by applying the new control channel set information at a predetermined point of time following a point of time where the control channel set information is detected.

28. The method of claim 27, wherein the MAC-hs control message includes a header having the indicator and a control payload having the control channel set information.

29. An apparatus for receiving control channel set information in a communication system having a medium access control-high speed (MAC-hs) layer entity for high-speed transmission or retransmission of user data to a user equipment (UE), having a shared channel occupied by a plurality of user equipments (UEs) and spread with a plurality of channelization codes to transmit user data, and having a plurality of control channels for transmitting control information related to the shared channel in order to enable the UEs to receive the shared channel signal, the system generating a plurality of control channel sets by classifying the control channels into a predetermined number of control channels, and assigning the control channel sets so that each of the UEs monitors a particular control channel set among the control channel sets, the apparatus comprising:
   a receiver for receiving over a particular control channel in a currently assigned control channel set an indicator indicating that currently assigned control channel set information is to be modified into new control channel set information, and receiving over a particular control channel in a currently assigned control channel set a MAC-hs control message including the new control channel set information; and
   a controller for monitoring a control channel set by applying the new control channel set information at a predetermined point of time following a point of time where the control channel set information is detected.

30. The apparatus of claim 29, wherein the MAC-hs control message includes a header having the indicator and a control payload having the control channel set information.

31. A method for transmitting status information of a first buffer and a second buffer in a communication system in which a Node B assigns a sequence number to user data in transmission order and includes the first buffer for storing the transmitted user data in transmission order and the second buffer for storing data to be retransmitted out of the transmitted user data, and a user equipment (UE) includes a third buffer for storing user data received from the Node B according to a sequence number of the received user data, the method comprising the steps of:
   (a) transmitting by the Node B the status information of a sequence number of user data to be transmitted from the first buffer and a sequence number of user data to be transmitted from the second buffer, for a transmission time interval (TTI) following a current point of time; and
   (b) receiving by the UE the status information and comparing a sequence number of user data to be transmitted from the first buffer with a sequence number of user data stored in the third buffer, and processing the user data stored in the third buffer according to the comparison result.

32. The method of claim 31, wherein the step (b) further comprises the step of delivering the user data stored in the third buffer to an upper layer upon determining that an error has occurred in the third buffer if a sequence number of user data to be transmitted from the first buffer is less than or equal to a sequence number of user data stored in the third buffer.

33. The method of claim 31, wherein the step (b) further comprises the step of waiting retransmission of corresponding user data upon determining that the third buffer has user data to be transmitted if a sequence number of user data to be transmitted from the first buffer is greater by a predetermined value or over than a sequence number of user data stored in the third buffer.

34. The method of claim 31, further comprising the step of comparing, by the UE receiving the status information, a sequence number of user data to be retransmitted from the second buffer with a sequence number stored in the third buffer and processing user data stored in the third buffer according to the comparison result, if a sequence number of user data to be transmitted from the first buffer is grater by a predetermined value or over than the sequence number stored in the third buffer.

35. The method of claim 34, wherein the UE delivers the user data stored in the third buffer to an upper layer upon determining that an error has occurred in the third buffer, if there exists a sequence number which belongs to sequence numbers of user data to be transmitted from the second buffer but does not belong to sequence numbers stored in the third buffer.

36. The method of claim 34, wherein the UE delivers the user data stored in the third buffer to an upper layer, if there exists a sequence number which does not belong to sequence numbers of user data to be transmitted from the second buffer but belongs to sequence numbers stored in the third buffer.

37. An apparatus for transmitting status information of a first buffer and a second buffer in a communication system in which a Node B assigns a sequence number to user data in transmission order and includes the first buffer for storing the transmitted user data in transmission order and the second buffer for storing data to be retransmitted out of the transmitted user data, and a user equipment (UE) includes a third buffer for storing user data received from the Node B according to a sequence number of the received user data, the apparatus comprising:

a Node B transmitter for transmitting the status information of a sequence number of user data to be transmitted from the first buffer and a sequence number of user data to be transmitted from the second buffer, for a transmission time interval (TTI) following a current point of time; and a UE receiver for receiving the status information and comparing a sequence number of user data to be transmitted from the first buffer with a sequence number of user data stored in the third buffer, and processing the user data stored in the third buffer according to the comparison result.

38. The method of claim 37, wherein the UE receiver delivers the user data stored in the third buffer to an upper layer upon determining that an error has occurred in the third buffer if a sequence number of user data to be transmitted from the first buffer is less than or equal to a sequence number of user data stored in the third buffer.

39. The method of claim 37, wherein the UE receiver waits retransmission of corresponding user data upon determining that the third buffer has user data to be transmitted if a sequence number of user data to be transmitted from the first buffer is greater by a predetermined value or over than a sequence number of user data stored in the third buffer.

* * * * *